US008639569B2

(12) United States Patent  
Matsushita et al.

(10) Patent No.: US 8,639,569 B2  
(45) Date of Patent: Jan. 28, 2014

(54) INFORMATION PROCESSING USING A POINT SYSTEM BASED ON USAGE HISTORY AND ASSOCIATED DATA CREATION

(75) Inventors: Konosuke Matsushita, Kawasaki (JP); Ichiro Shishido, Zushi (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 0 days.

(21) Appl. No.: 13/277,824

(22) Filed: Oct. 20, 2011

(65) Prior Publication Data

US 2012/0101890 A1    Apr. 26, 2012

(30) Foreign Application Priority Data

Oct. 21, 2010    (JP) ................. P2010-236299  
Feb. 22, 2011    (JP) ................. P2011-035615

(51) Int. Cl.  
*G06Q 30/00*    (2012.01)

(52) U.S. Cl.  
USPC ....................... 705/14.25; 705/14.1

(58) Field of Classification Search  
USPC ........................................ 705/14.25  
See application file for complete search history.

(56) References Cited

U.S. PATENT DOCUMENTS

2006/0143066 A1*    6/2006    Calabria ................ 705/10

FOREIGN PATENT DOCUMENTS

JP    2002-288503 A    10/2002  
JP    2007-200099 A    8/2007

OTHER PUBLICATIONS

Bogardus, "Measuring Social Distances", J. Applied Sociology, No. 9, 1925, pp. 299-308.*  
PR Newswire, "TheFind.com Launches 'Find Similar Items' Tool That Allows Shoppers to Organize Millions of Products Into Custom Catalogs", PR Newswire, Feb. 28, 2007, found on line at www.prnewswire.com/news-releases/thefindcom-launches-find-similar-items-tool-that-allows-shoppers-to-organize-millions-of-products-into-custom-catalogs-58134787.html.*

* cited by examiner

*Primary Examiner* — John G Weiss  
*Assistant Examiner* — Scott C Anderson  
(74) *Attorney, Agent, or Firm* — Nath, Goldberg & Meyer; Jerald L. Meyer; Stanley N. Protigal

(57) ABSTRACT

A use history that at least associates a use subject identifier for identifying a user or a terminal device a user has used with a used item identifier, which is an item identifier for identifying an item used by a user, based on use information is stored in a use history storage section. Based on the use history, a degree of similarity between two item identifiers is calculated and using the degree of similarity, associated data causing a base item identifier, which is an item identifier of a base item, and an associated item identifier, which is an item identifier of an associated item similar to the base item to correspond to each other is created. A change value to change a point value managed for each use subject identifier is calculated.

34 Claims, 52 Drawing Sheets

| user_id | user_info |
|---|---|
| u1 | USER'S NAME : A<br>SEX : FEMALE<br>AGE : 22<br>ADDRESS : TOKYO<br>DATE OF MEMBERSHIP REGISTRATION : NOVEMBER 29, 2006 |
| ⋮ | ⋮ |

FIG. 5

| item_id | item_info |
|---------|-----------|
| i1 | NAME : BOOK C<br>PUBLISHER : F PUBLISHING COMPANY<br>YEAR OF PUBLISHING : 2008<br>GENRE : FICTION<br>PRICE : 3,800 YEN |
| ⋮ | ⋮ |

FIG. 6A

| user_id | item_id | date |
|---|---|---|
| u1 | i3 | AUGUST 16, 2008 |
| u1 | i23 | MARCH 12, 2009 |
| ... | ... | ... |
| u2 | i4 | NOVEMBER 16, 2008 |
| u2 | i17 | NOVEMBER 29, 2007 |
| ... | ... | ... |

FIG. 6B

| user_id | item_id | date | count |
|---|---|---|---|
| u1 | i3 | AUGUST 16, 2008 | 2 |
| u1 | i23 | MARCH 12, 2009 | 1 |
| ... | ... | ... | ... |
| u2 | i4 | NOVEMBER 16, 2008 | 1 |
| u2 | i17 | NOVEMBER 29, 2007 | 6 |
| ... | ... | ... | ... |

FIG. 6C

| user_id | item_id | date | value |
|---|---|---|---|
| u1 | i3 | AUGUST 16, 2008 | 5 |
| u1 | i23 | MARCH 12, 2009 | 3 |
| ... | ... | ... | ... |
| u2 | i4 | NOVEMBER 16, 2008 | 4 |
| u2 | i17 | NOVEMBER 29, 2007 | 5 |
| ... | ... | ... | ... |

FIG. 6D

| user_id | item_id | date | amount |
|---|---|---|---|
| u1 | i3 | AUGUST 16, 2008 | 2100 |
| u1 | i23 | MARCH 12, 2009 | 1200 |
| ... | ... | ... | ... |
| u2 | i4 | NOVEMBER 16, 2008 | 3600 |
| u2 | i17 | NOVEMBER 29, 2007 | 900 |
| ... | ... | ... | ... |

| base_item_id | sim_item_id | value |
|---|---|---|
| i1 | i21 | 0.38 |
| i1 | i35 | 1.29 |
| ⋮ | ⋮ | ⋮ |
| i2 | i12 | 3.98 |
| i2 | i42 | 1.36 |
| ⋮ | ⋮ | ⋮ |

FIG. 12

| item_id | user_id | p_value |
|---|---|---|
| i1 | u2 | 5 |
| i1 | u14 | 3 |
| ⋮ | ⋮ | ⋮ |
| i2 | u9 | 4 |
| i2 | u32 | 5 |
| ⋮ | ⋮ | ⋮ |

FIG. 13

| base_item_id | sim_item_id | user_id | rate |
|---|---|---|---|
| i1 | i31 | u8 | 0.67 |
| i1 | i31 | u10 | 0.33 |
| i1 | i45 | u12 | 0.29 |
| i1 | i45 | u33 | 0.14 |
| ⋮ | ⋮ | ⋮ | ⋮ |
| i2 | i24 | u5 | 0.14 |
| i2 | i24 | u24 | 0.16 |
| ⋮ | ⋮ | ⋮ | ⋮ |

FIG. 14

| user_id | point |
|---|---|
| u1 | 10.01 |
| u2 | 21.32 |
| ⋮ | ⋮ |

FIG. 20

| BASE PRODUCT | SIMILAR PRODUCT | ASSOCIATED MEMBER | DISTRIBUTION RATE |
|---|---|---|---|
| PRODUCT a | PRODUCT b | MEMBER A | 0.33 |
| PRODUCT a | PRODUCT b | MEMBER E | 0.33 |
| PRODUCT a | PRODUCT b | MEMBER F | 0.33 |
| PRODUCT a | PRODUCT e | MEMBER D | 0.33 |
| PRODUCT a | PRODUCT e | MEMBER E | 0.33 |
| PRODUCT a | PRODUCT e | MEMBER F | 0.33 |
| PRODUCT a | PRODUCT f | MEMBER C | 0.25 |
| PRODUCT a | PRODUCT f | MEMBER D | 0.25 |
| PRODUCT a | PRODUCT f | MEMBER E | 0.25 |
| PRODUCT a | PRODUCT f | MEMBER F | 0.25 |

FIG. 22

| user_id | item_id | point |
|---------|---------|-------|
| u1 | i1 | 1.12 |
| u1 | i3 | 3.31 |
| ⋮ | ⋮ | ⋮ |
| u2 | i2 | 1.77 |
| u2 | i7 | 8.12 |
| ⋮ | ⋮ | ⋮ |

FIG. 24

| user_id | base_item_id | sim_item_id | point |
|---------|--------------|-------------|-------|
| u1 | i3 | i1 | 0.41 |
| u1 | i5 | i1 | 0.15 |
| ⋮ | ⋮ | ⋮ | ⋮ |
| u1 | i1 | i3 | 1.03 |
| u1 | i6 | i3 | 0.96 |
| ⋮ | ⋮ | ⋮ | ⋮ |
| u2 | i3 | i2 | 0.34 |
| ⋮ | ⋮ | ⋮ | ⋮ |

FIG. 32

| base_user_id | base_item_id | sim_item_id | user_id | rate |
|---|---|---|---|---|
| u1 | i1 | i31 | u8 | 0.54 |
| u1 | i1 | i31 | u10 | 0.46 |
| u1 | i1 | i45 | u12 | 0.32 |
| u1 | i1 | i45 | u33 | 0.15 |
| ⋮ | ⋮ | ⋮ | ⋮ | ⋮ |
| u1 | i2 | i24 | u5 | 0.23 |
| u1 | i2 | i24 | u24 | 0.09 |
| ⋮ | ⋮ | ⋮ | ⋮ | ⋮ |
| u2 | i1 | i31 | u8 | 0.71 |
| u2 | i1 | i31 | u10 | 0.29 |
| ⋮ | ⋮ | ⋮ | ⋮ | ⋮ |

| user_id | user_info |
|---------|-----------|
| u1 | USER'S NAME : A<br>SEX : FEMALE<br>AGE : 22<br>ADDRESS : TOKYO<br>DATE OF MEMBERSHIP REGISTRATION : NOVEMBER 29, 2006 |
| ⋮ | ⋮ |

FIG. 37A

| item_id | item_name |
|---|---|
| i1 | BOOK C |
| i2 | NOVEL A |
| ⋮ | ⋮ |

FIG. 37B

| type_id | type_name |
|---|---|
| ta | CREATOR |
| tb | GENRE |
| ⋮ | ⋮ |

FIG. 37C

| type_id | attr_id | attr_name |
|---|---|---|
| ta | ta1 | CREATOR A |
| ta | ta2 | CREATOR B |
| ⋮ | ⋮ | ⋮ |
| tb | tb1 | FICTION |
| tb | tb2 | COOKING |
| ⋮ | ⋮ | ⋮ |

FIG. 37D

| item_id | type_id | attr_id |
|---|---|---|
| i1 | ta | ta1 |
| i1 | tb | tb1 |
| ⋮ | ⋮ | ⋮ |
| i2 | tb | tb1 |
| i2 | tb | tb4 |
| ⋮ | ⋮ | ⋮ |

FIG. 38A

| user_id | item_id | date |
|---|---|---|
| u1 | i3 | AUGUST 16, 2008 |
| u1 | i23 | MARCH 12, 2009 |
| ... | ... | ... |
| u2 | i4 | NOVEMBER 16, 2008 |
| u2 | i17 | NOVEMBER 29, 2007 |
| ... | ... | ... |

FIG. 38B

| user_id | item_id | date | count |
|---|---|---|---|
| u1 | i3 | AUGUST 16, 2008 | 2 |
| u1 | i23 | MARCH 12, 2009 | 1 |
| ... | ... | ... | ... |
| u2 | i4 | NOVEMBER 16, 2008 | 1 |
| u2 | i17 | NOVEMBER 29, 2007 | 6 |
| ... | ... | ... | ... |

FIG. 38C

| user_id | item_id | date |
|---|---|---|
| u1 | i3 | AUGUST 16, 2008 |
| u1 | i23 | MARCH 12, 2009 |
| ... | ... | ... |
| u2 | i4 | NOVEMBER 16, 2008 |
| u2 | i17 | NOVEMBER 29, 2007 |
| ... | ... | ... |

FIG. 38D

| user_id | item_id | date |
|---|---|---|
| u1 | i3 | AUGUST 16, 2008 |
| u1 | i23 | MARCH 12, 2009 |
| ... | ... | ... |
| u2 | i4 | NOVEMBER 16, 2008 |
| u2 | i17 | NOVEMBER 29, 2007 |
| ... | ... | ... |

| item_id | type_id | attr_id | value |
|---|---|---|---|
| i1 | ta | ta4 | 0.38 |
| i1 | ta | ta7 | 1.29 |
| ⋮ | ⋮ | ⋮ | ⋮ |
| i2 | ta | ta6 | 3.98 |
| i2 | tb | tb3 | 1.36 |
| ... | ... | ... | ... |

FIG. 44

| user_id | item_id | ip_value |
|---------|---------|----------|
| i1 | u2 | 5 |
| i1 | u14 | 3 |
| ⋮ | ⋮ | ⋮ |
| i2 | u9 | 4 |
| i2 | u32 | 5 |
| ⋮ | ⋮ | ⋮ |

FIG. 45

| user_id | type_id | attr_id | ap_value |
|---------|---------|---------|----------|
| u1 | ta | ta3 | 5 |
| u1 | ta | ta4 | 3 |
| ⋮ | ⋮ | ⋮ | ⋮ |
| u2 | ta | ta6 | 4 |
| u2 | tb | tb2 | 5 |
| ⋮ | ⋮ | ⋮ | ⋮ |

FIG. 46

| item_id | type_id | attr_id | user_id | rate |
|---|---|---|---|---|
| i1 | ta | ta6 | u8 | 0.67 |
| i1 | ta | ta6 | u10 | 0.33 |
| i1 | tb | tb7 | u12 | 0.29 |
| i1 | tb | tb7 | u33 | 0.14 |
| ⋮ | ⋮ | ⋮ | ⋮ | ⋮ |
| i2 | ta | ta5 | u5 | 0.14 |
| i2 | ta | ta5 | u24 | 0.16 |
| ⋮ | ⋮ | ⋮ | ⋮ | ⋮ |

FIG. 47

| user_id | point |
|---|---|
| u1 | 10.01 |
| u2 | 21.32 |
| ⋮ | ⋮ |

FIG. 54

| PRODUCT | ASSOCIATED CREATOR | DISTRIBUTION MEMBER | DISTRIBUTION RATE |
|---|---|---|---|
| PRODUCT a | CREATOR 2 | MEMBER D | 0.50 |
| PRODUCT a | CREATOR 2 | MEMBER F | 0.50 |
| PRODUCT a | CREATOR 4 | MEMBER A | 0.33 |
| PRODUCT a | CREATOR 4 | MEMBER D | 0.33 |
| PRODUCT a | CREATOR 4 | MEMBER F | 0.33 |

FIG. 56

| user_id | type_id | attr_id | point |
|---|---|---|---|
| u1 | ta | ta9 | 1.12 |
| u1 | ta | ta23 | 3.31 |
| ⋮ | ⋮ | ⋮ | ⋮ |
| u2 | ta | ta13 | 1.77 |
| u2 | tb | tb6 | 8.12 |
| ⋮ | ⋮ | ⋮ | ⋮ |

FIG. 57

A (USER'S NAME)
TOTAL USE POINT: 10.01

KEYWORD
[COOKING]    [SEARCH]

USE HISTORY

NAME : NOVEL A
PUBLISHER : X PUBLISHING COMPANY
YEAR OF PUBLISHING : 2001
GENRE : FICTION
PRICE : 2,000 YEN
.
.
.

SEARCH RESULT

NAME : COOKING BOOK E
PUBLISHER : Y PUBLISHING COMPANY
YEAR OF PUBLISHING : 2001
GENRE : COOKING
PRICE : 1,000 YEN
.
.
.

THANK YOU FOR USING OUR SITE.

POINTS WERE GIVEN TO "17" USERS
BY PURCHASE OF "BOOK D".

ASSOCIATE

ATTRIBUTE TYPE : CREATOR
ATTRIBUTE VALUE : CREATOR B

ATTRIBUTE TYPE : CREATOR
ATTRIBUTE VALUE : CREATOR Y
.
.
.

NAME : BOOK D
CREATOR : CREATOR B
YEAR OF PUBLISHING : 2008
GENRE : FICTION
PRICE : 3,800 YEN
.
.
.

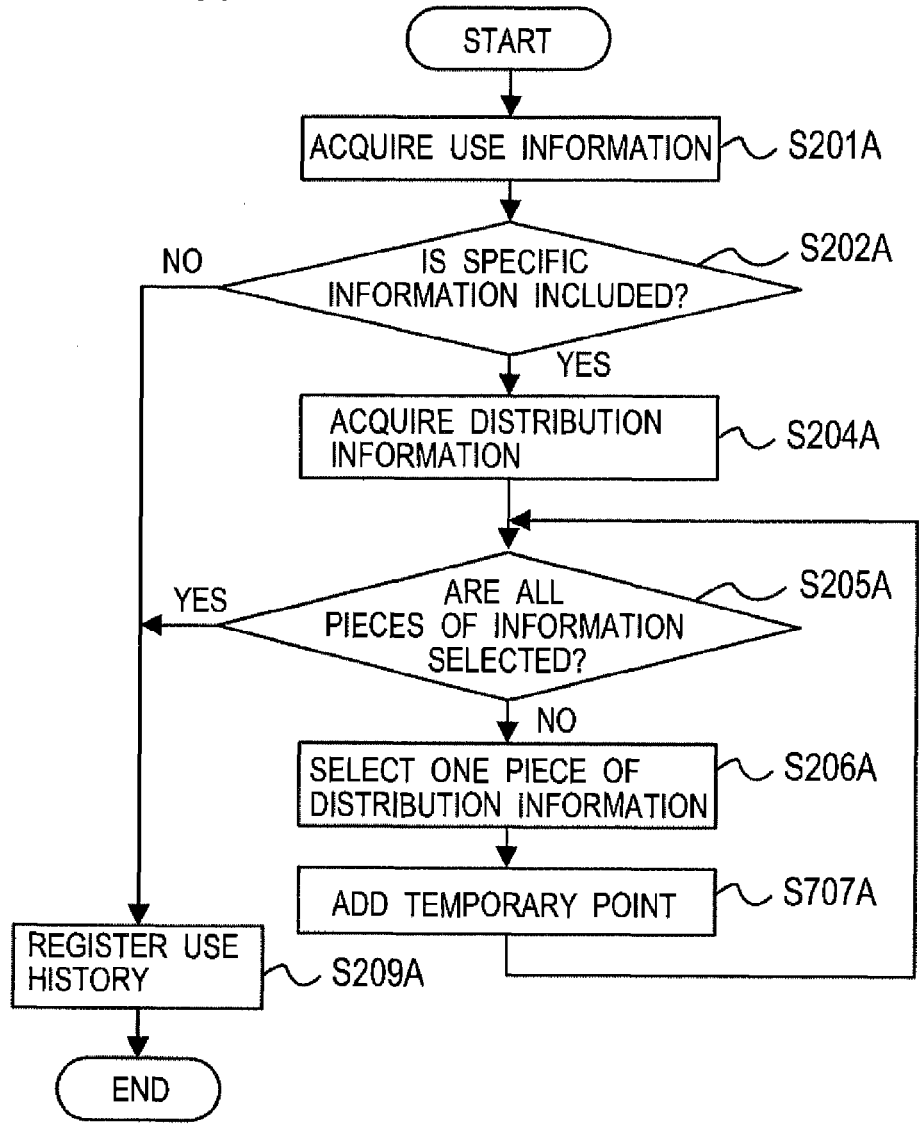

FIG. 64

| base_user_id | item_id | type_id | attr_id | user_id | rate |
|---|---|---|---|---|---|
| u1 | i1 | ta | ta6 | u8 | 0.54 |
| u1 | i1 | ta | ta6 | u10 | 0.46 |
| u1 | i1 | tb | tb7 | u12 | 0.32 |
| u1 | i1 | tb | tb7 | u33 | 0.15 |
| ⋮ | ⋮ | ⋮ | ⋮ | ⋮ | ⋮ |
| u1 | i2 | ta | ta5 | u5 | 0.23 |
| u1 | i2 | ta | ta5 | u24 | 0.09 |
| ... | ... | ... | ... | ... | ... |
| u2 | i1 | ta | ta6 | u8 | 0.71 |
| u2 | i1 | ta | ta6 | u10 | 0.29 |
| ... | ... | ... | ... | ... | ... |

INFORMATION PROCESSING USING A POINT SYSTEM BASED ON USAGE HISTORY AND ASSOCIATED DATA CREATION

BACKGROUND OF THE INVENTION

1. Field of the Invention

The present invention relates to information processing using a use history relating to an item of a user and, more particularly, to an information processing method and an information processing device to perform information processing relating to a point, a terminal device connected to the information processing device, a display method in the terminal device, and an information processing program in an information processing device and a terminal device.

2. Description of the Related Art

In recent years, thanks to the development of the digital technology and network technology, the chances to distribute or sell items, such as digital contents and goods, using a network. Accompanying this, the needs for the technology to select and provide information of an item with which a user is highly likely to be interested from among a number of items are increasing.

Further, the so-called point service is performed widely, in which when a user purchases a product, a point is given according to the purchase price or the number of times of purchase and at the time of next purchase, a discount is allowed according to the point. Then, the technology combining provision of information about an item and the point service is also proposed. For example, Patent Document 1 (Japanese Patent Laid-Open (Kokai) No. 2002-288503) discloses technology to promote the use of an item by giving a point to a user who has given advice about a product to another user. Patent Document 2 (Japanese Patent Laid-Open (Kokai) No. 2007-200099) discloses technology to give a point to a user similar to a target user according to the number of times that the target user selects the item recommended by the user similar to the target user.

As the conventional technology described above, in the system in which a point is given to an information providing user when another user purchases an item according to the information provided by the information providing user, it can be expected that provision of information from users is promoted. Further, it is difficult for an information providing user to predict the timing at which a point is given, and therefore, it is possible to give a user a bigger element of surprise or a certain kind of emotion compared to the normal point system in which a user who purchases acquires a point. Then, each user is likely to feel like checking whether his/her point has increased, and therefore, there may be a case where the frequency of accesses to the site increases.

However, in Patent Document 1 and Patent Document 2 described above, the relationship between a user who provides information and a user who uses an item according to the information is one-to-one, and therefore, there used to be such a problem that users given a point actually are limited to a small part of users or the frequency with which a point increases is low. That is, when a user B uses an item based on information provided by a user A, the point of the user A increases once, but the points of most of other users are not changed at all. Because of this, even if a user frequently accesses a site in expectation of an increase in his/her point, it is only temporarily because the point does not increase and finally, there is a case where the frequency of accesses is reduced. For example, immediately after a user becomes a member of a point service, the user frequently accesses the site to check whether his/her point has increased, but, if the point does not increase for a long time, there is a case where the user loses the interest in the site or items.

SUMMARY OF THE INVENTION

In such circumstances, an object of the present invention is to increase interest of a user in the point service and to promote the use of an item.

The present invention provides an information processing method, a display method, an information processing device, a terminal device, and an information processing program as described below in order to solve the problems of the above-described conventional technology.

(1) An information processing method in an information processing device to receive use information relating to an item which has been used in another device. The method comprises the following steps: a use history storage step of storing, in a use history storage section, a use history that at least associates a use subject identifier for identifying a user or a terminal device a user has used, with a used item identifier, which is an item identifier for identifying an item used by a user, based on the use information; an associated data creation step of calculating a degree of similarity between two item identifiers based on a use history stored in the use history storage section and creating associated data to be provided to the other device, wherein the associated data causes a base item identifier and an associated item identifier to correspond to each other using the degree of similarity, the base item identifier is an item identifier of a base item, and the associated item identifier is an item identifier of an associated item similar to the base item; and a point distribution calculation step of calculating a change value to change a point value managed for each of the use subject identifiers. The use information corresponding to a use of the associated item based on the associated data in the other device is information including specific information capable of specifying a base item identifier corresponding to the associated item identifier of the used item. In the use history storage step, a use history causing the use subject identifier, the used item identifier, and the specific information at least to correspond to one another is stored in the use history storage section. In the point distribution calculation step, one use history having the specific information is selected from the use history storage section, a first previous use history set is formed, which is a set of other use histories having the same used item identifier as the base item identifier specified by the specific information of the one use history and being older than the one use history, and a change value to change the point value is calculated for a plurality of use subject identifiers which is at least a part of a user set, wherein the user set is a set of use subject identifiers included in the first previous use history set.

(2) The information processing method described in (1). In the point distribution calculation step, a first previous use history set is formed, which is a set of other use histories having the same used item identifier as the base item identifier specified by the specific information of the one use history and being older than the one use history. Then, one use history having the specific information is selected from the use history storage section and a second previous use history set is formed, which is a set of other use histories having the same used item identifier as the used item identifier of the one use history and being older than the one use history. Then, a change value to change the point value is calculated for a plurality of use subject identifiers which is at least a part of a user set, wherein the user set is a set of use subject identifiers included both in the first previous use history set and in the second previous use history set.

(3) The information processing method described in (1), further including a user attribute storage step of storing the use subject identifier and user attribute information in association with each other. In the point distribution calculation step, the change value is calculated for the use subject identifier, the user attribute information of which satisfies a predetermined condition, of the use subject identifiers included in the user set.

(4) The information processing method described in (1), further including an item attribute storage step of storing the item identifier and item attribute information in association with each other. In the associated data creation step, the associated data is created based on a use history including an item identifier, the item attribute information of which satisfies a predetermined condition, of the use histories stored in the use history storage section.

(5) The information processing method described in (1). In the point distribution calculation step, in order to change a point value managed for each combination of the use subject identifier and the item identifier, a change value is calculated for each combination corresponding to a use subject identifier, which is at least a part of the user set, and a used item identifier of the one use history.

(6) The information processing method described in (1). In the point distribution calculation step, the number of use subject identifiers for which the change value has been calculated is calculated.

(7) The information processing method described in (1). In the point distribution calculation step, the change value is calculated so that the sum total of change values during a predetermined period of time equals a predetermined value.

(8) A display method in a terminal device capable of data communication with an information processing device which updates point values of a plurality of use subject identifiers with reference to a change value of a point value calculated by the information processing method described in (5), based on one use history indicating that a user has used an item. The display method comprises the following steps: a transmission step of transmitting information for specifying one use subject identifier to the information processing device; a reception step of receiving, from the information processing device, item information and a point value managed by the information processing device in association with the one use subject identifier; and a control step of causing a display device to display the received item information and point value.

(9) A display method in a terminal device capable of data communication with an information processing device which calculates point values of a plurality of use subject identifiers by the information processing method described in (6), based on one use history indicating that a user has used an item. The display method comprises the following steps: a transmission step of transmitting the one use history to the information processing device; a reception step of receiving, from the information processing device, the number of use subject identifiers for which the information processing device has calculated a change value of a point based on the one use history; and a control step of causing a display device to display the received number of use subject identifiers.

(10) An information processing device which receives use information relating to an item which has been used in another device. The information processing device comprises the following sections: a use history storage section for storing a use history that at least associates a use subject identifier for identifying a user or a terminal device a user has used, with a used item identifier, which is an item identifier for identifying an item used by a user, based on the use information; an associated data creation section for calculating a degree of similarity between two item identifiers based on a use history stored in the use history storage section and creating associated data to be provided to the other device, wherein the associated data causes a base item identifier and an associated item identifier to correspond to each other using the degree of similarity, the base item identifier is an item identifier of a base item, and the associated item identifier is an item identifier of an associated item similar to the base item; and a point distribution calculation section for calculating a change value to change a point value managed for each of the use subject identifiers. The use information corresponding to a use of the associated item based on the associated data in the other device is information including specific information capable of specifying a base item identifier corresponding to the associated item identifier of the used item. The use history storage section stores therein a use history causing the use subject identifier, the used item identifier, and the specific information at least to correspond to one another. The point distribution calculation section selects one use history having the specific information from the use history storage section, forms a first previous use history set, which is a set of other use histories having the same used item identifier as the base item identifier specified by the specific information of the one use history and being older than the one use history, and calculates a change value to change the point value for a plurality of use subject identifiers which is at least a part of a user set, wherein the user set is a set of use subject identifiers included in the first previous use history set.

(11) A terminal device capable of data communication with an information processing device which updates point values of a plurality of use subject identifiers with reference to a change value of a point value calculated by the information processing method described in (5), based on one use history indicating that a user has used an item. The terminal device comprises the following sections: a terminal communication section to transmit information for specifying one use subject identifier to the information processing device and receive, from the information processing device, item information and a point value managed by the information processing device in association with the one use subject identifier; and a terminal control section to cause a display device to display the received item information and point value.

(12) A terminal device capable of data communication with an information processing device which calculates point values of a plurality of use subject identifiers by the information processing method described in (6), based on one use history indicating that a user has used an item. The terminal device comprises the following sections: a terminal communication section to transmit the one use history to the information processing device and receive, from the information processing device, the number of use subject identifiers for which the information processing device has calculated a change value of a point based on the one use history; and a terminal control section to cause a display device to display the received number of use subject identifiers.

(13) An information processing program causing a computer of an information processing device for receiving use information relating to an item which has been used in another device to execute steps. The information processing program has the following steps: a use history storage step of storing, in a use history storage section, a use history that at least associates a use subject identifier for identifying a user or a terminal device a user has used, with a used item identifier, which is an item identifier for identifying an item used by a user, based on the use information; an associated data creation step of calculating a degree of similarity between two item identifiers based on a use history stored in the use history storage section and creating associated data to be provided to the other device, wherein the associated data causes a base item identifier and an associated item identifier to correspond to each other using the degree of similarity, the base item identifier is an item identifier of a base item, and the associated item identifier is an item identifier of an associated item similar to the base item; and a point distribution calculation step of calculating a change value to change a point value managed for each of the use subject identifiers. The use information corresponding to the use of the associated item based on the associated data in the other device is information including specific information capable of specifying a base item identifier corresponding to the associated item identifier of the used item. In the use history storage step, a use history causing the use subject identifier, the used item identifier, and the specific information at least to correspond to one another is stored in the use history storage section. In the point distribution calculation step, one use history having the specific information is selected from the use history storage section, a first previous use history set is formed, which is a set of other use histories having the same used item identifier as the base item identifier specified by the specific information of the one use history and being older than the one use history, and a change value to change the point value is calculated for a plurality of use subject identifiers which is at least a part of a user set, wherein the user set is a set of use subject identifiers included in the first previous use history set.

(14) An information processing program causing a computer of a terminal device capable of data communication with an information processing device which updates point values of a plurality of use subject identifiers with reference to a change value of a point value calculated by the information processing method described in (5), based on one use history indicating that a user has used an item to execute steps. The computer executes the following steps: a transmission step of transmitting information for specifying one use subject identifier to the information processing device; a reception step of receiving, from the information processing device, item information and a point value managed by the information processing device in association with the one use subject identifier; and a control step of causing a display device to display the received item information and point value.

(15) An information processing program causing a computer of a terminal device capable of data communication with an information processing device which calculates point values of a plurality of use subject identifiers by the information processing method described in (6), based on one use history indicating that a user has used an item to execute steps. The computer executes the following steps: a transmission step of transmitting the one use history to the information processing device; a reception step of receiving, from the information processing device, the number of use subject identifiers for which the information processing device has calculated a change value of a point based on the one use history; and a control step of causing a display device to display the received number of use subject identifiers.

(16) An information processing method in an information processing device which receives use information relating to an item which has been used in another device. The information processing method comprises the following steps: a use history storage step of storing, in a use history storage section, a use history that at least associates a use subject identifier for identifying a user or a terminal device a user has used, with a used item identifier, which is an item identifier for identifying an item used by a user, based on the use information; an item attribute information storage step of storing, in an item attribute information storage section, item attribute information that at least associates an item identifier with an item attribute identifier for identifying an item attribute; an associated data creation step of calculating a degree of association between an item identifier and an item attribute identifier based on a use history stored in the use history storage section and item attribute information stored in the item attribute information storage section and creating associated data to be provided to the other device, wherein the associated data causes a base item identifier and an associated item attribute identifier to correspond to each other, the base item identifier is an item identifier of a base item, the associated item attribute identifier is an item attribute identifier corresponding to an associated attribute, and the associated attribute is an item attribute associated with the base item; and a point distribution calculation step of calculating a change value for changing a point value managed for each of the use subject identifiers. The use information corresponding to the use of the item having the associated attribute based on the associated data in the other device is information including specific information capable of specifying a base item identifier corresponding to the associated item attribute identifier of the used item. In the use history storage step, a use history causing the use subject identifier, the used item identifier, and the specific information at least to correspond to one another is stored in a use history storage section. In the point distribution calculation step, one use history having the specific information is selected from the use history storage section, a first previous use history set is formed, which is a set of other use histories having the same used item identifier as the base item identifier specified by the specific information of the one use history and being older than the one use history, a user set is formed, which is a set of use subject identifiers included in the first previous use history set, and a change value to change the point value is calculated for a plurality of use subject identifiers, which is at least a part of the user set.

(17) The information processing method described in (16). The specific information is information including the associated item attribute identifier of a used item and a base item identifier corresponding to the associated item attribute identifier. In the point distribution calculation step, a first previous use history set is formed, which is a set of other use histories having the same used item identifier as the base item identifier specified by the specific information of the one use history and being older than the one use history, an associated item set is formed, which is a set of item identifiers corresponding to the same item attribute identifier as the associated item attribute identifier specified by the specific information of the one use history from the item attribute information storage section, a second previous use history set is formed, which is a set of other use histories having any of item identifiers included in the associated item set and being older than the one use history from the use history storage section, a user set is formed, which is a set of use subject identifiers included both in the first previous use history set and in the second previous use history set, and a change value for changing the point value is calculated for a plurality of use subject identifiers, which is at least a part of the user set.

(18) The information processing method described in (16), further including a user attribute storage step of storing the use subject identifier and user attribute information in association with each other. In the point distribution calculation step, the change value is calculated for a use subject identifier, the user attribute information of which satisfies a predeter mined condition, of the use subject identifiers included in the user set.

(19) The information processing method described in (16). In the associated data creation step, a set of use histories including the base item identifier of the use histories stored in the use history storage section is formed as a base item use history, a set of use histories including any of item identifiers corresponding to an associated attribute is formed as an associated attribute use history, the number of use subject identifiers present both in the set of use subject identifiers included in the base item use history and in the set of use subject identifiers included in the associated attribute use history is calculated as the number of common use subjects, and the degree of association is calculated using the number of common use subjects.

(20) The information processing method described in (16), further including a first similarity degree calculation step of calculating a first degree of similarity, which is a degree of similarity between two item identifiers, based on a use history stored in the use history storage section. In the associated data creation step, a first associated candidate attribute set is formed, which is a set of item attribute identifiers corresponding to similar item identifiers, which are other item identifiers whose the first degree of similarity to a base item identifier is greater than a predetermined value, or other item identifiers selected in a number not exceeding a predetermined number in order of decreasing a degree of similarity between two item identifiers from the greatest first degree of similarity to a base item identifier, and for each item attribute identifier included in the first associated candidate attribute set, one or more of the similar item identifiers corresponding to the item attribute identifier are specified based on the item attribute information, a degree of association is calculated using the first degree of similarity between the specified similar item identifier and the base item identifier, and the associated attribute is selected from among the first associated candidate attribute set using the degree of association.

(21) The information processing method described in (16). The specific information is information including the associated item attribute identifier of a used item and a base item identifier corresponding to the associated item attribute identifier. In the point distribution calculation step, a change value is calculated for each combination corresponding to a use subject identifier, which is at least a part of the user set, and the associated item attribute identifier specified by the specific information of the one use history in order to change a point value managed for each combination of the use subject identifier and the item attribute identifier.

(22) The information processing method described in (16). In the point distribution calculation step, the number of use subject identifiers for which the change value has been calculated is calculated.

(23) The information processing method described in (16). In the point distribution calculation step, the change value is calculated so that the sum total of change values during a predetermined period of time equals a predetermined value.

(24) A display method in a terminal device capable of data communication with the information processing device described in (16) in which associated data is created. The display method comprises the following steps: a first transmission step of transmitting an item identifier to the information processing device; a first reception step of receiving, from the information processing device, an associated item attribute which is an item attribute included in the item attribute information corresponding to an associated item attribute identifier of associated data including a base item identifier coincident with the transmitted item identifier; and a first control step of causing a display device to display the associated item attribute received in the first reception step.

(25) A display method in a terminal device capable of data communication with an information processing device which updates point values of a plurality of use subject identifiers with reference to a change value of a point value calculated by the information processing method described in (21), based on one use history indicating that a user has used an item. The display method comprises the following steps: a transmission step of transmitting information for specifying one use subject identifier to the information processing device; a reception step of receiving, from the information processing device, an item attribute corresponding to an item attribute identifier and a point value managed by the information processing device in association with the one use subject identifier; and a control step of causing a display device to display the received item attribute corresponding to the item attribute identifier and the point value.

(26) A display method in a terminal device capable of data communication with an information processing device which calculates point values of a plurality of use subject identifiers by the information processing method described in (22), based on one use history indicating that a user has used an item. The display method comprises the following steps: a transmission step of transmitting the one use history to the information processing device; a reception step of receiving, from the information processing device, the number of use subject identifiers for which the information processing device has calculated a change value of a point based on the one use history; and a control step of causing a display device to display the received number of use subject identifiers.

(27) An information processing device which receives use information relating to an item which has been used in another device. The information processing device comprises the following sections: a use history storage section for storing a use history that at least associates a use subject identifier for identifying a user or a terminal device a user has used, with a used item identifier, which is an item identifier for identifying an item used by a user, based on the use information; an item attribute information storage section for storing item attribute information that at least associates an item identifier with an item attribute identifier for identifying an item attribute; an associated data creation section for calculating a degree of association between an item identifier and an item attribute identifier based on a use history stored in the use history storage section and item attribute information stored in the item attribute information storage section and creating associated data to be provided to the other device, wherein the associated data causes a base item identifier and an associated item attribute identifier to correspond to each other using the degree of association, the base item identifier is an item identifier of a base item, the associated item attribute identifier is an item attribute identifier corresponding to an associated attribute, and the associated attribute is an item attribute associated with the base item; and a point distribution calculation section for calculating a change value to change a point value managed for each of the use subject identifiers. The use information corresponding to a use of an item having the associated attribute based on the associated data in the other device is information including specific information capable of specifying a base item identifier corresponding to the associated item attribute identifier of a used item. The use history storage section stores, in a use history storage section, a use history causing the use subject identifier, the used item identifier, and the specific information at least to correspond to one another. The point distribution calculation section selects one use history having the specific information from the use history storage section, forms a first previous use history set, which is a set of other use histories having the same used item identifier as the base item identifier specified by the specific information of the one use history and being older than the one use history, forms a user set, which is a set of use subject identifiers included in the first previous use history set, and calculates a change value to change the point value for a plurality of use subject identifiers, which is at least a part of the user set.

(28) A terminal device capable of data communication with the information processing device described in (16) in which associated data is created. The terminal device comprises the following sections: a terminal communication section to transmit an item identifier to the information processing device and receive, from the information processing device, an associated item attribute, which is an item attribute included in the item attribute information corresponding to an item attribute identifier specified by causing the transmitted item identifier to correspond to a base item identifier of the associated data; and a terminal control section to cause a display device to display the associated item attribute received in the terminal communication section.

(29) A terminal device capable of data communication with an information processing device which updates point values of a plurality of use subject identifiers with reference to a change value of a point value calculated by the information processing method described in (21), based on one use history indicating that a user has used an item. The terminal device comprises the following sections: a terminal communication section to transmit information for specifying one use subject identifier to the information processing device and receive, from the information processing device, an item attribute corresponding to an item attribute identifier and a point value managed by the information processing device in association with the one use subject identifier; and a terminal control section to cause a display device to display the received item attribute corresponding to the item attribute identifier and the point value.

(30) A terminal device capable of data communication with an information processing device which calculates point values of a plurality of use subject identifiers by the information processing method described in (22), based on one use history indicating that a user has used an item. The terminal device comprises the following sections: a terminal communication section to transmit the one use history to the information processing device and receive, from the information processing device, the number of use subject identifiers for which the information processing device has calculated a change value of a point based on the one use history; and a terminal control section to cause a display device to display the received number of use subject identifiers.

(31) An information processing program causing a computer of an information processing device for receiving use information relating to an item which has been used in another device to execute steps. The information processing program has the following steps: a use history storage step of storing, in a use history storage section, a use history that at least associates a use subject identifier for identifying a user or a terminal device a user has used, with a used item identifier, which is an item identifier for identifying an item used by a user, based on the use information; an item attribute storage step of storing, in an item attribute information storage section, item attribute information that at least associates an item identifier with an item attribute identifier for identifying an item attribute; an associated data creation step of calculating a degree of association between an item identifier and an item attribute identifier based on a use history stored in the use history storage section and item attribute information stored in the item attribute information storage section and creating associated data to be provided to the other device, wherein the associated data causes a base item identifier and an associated item attribute identifier to correspond to each other using the degree of association, a base item identifier is an item identifier of a base item, the associated item attribute identifier is an item attribute identifier corresponding to an associated attribute, and the associated attribute is an item attribute associated with the base item; and a point distribution calculation step of calculating a change value to change a point value managed for each of the use subject identifiers. The use information corresponding to a use of an item having the associated attribute based on the associated data in the other device is information including specific information capable of specifying a base item identifier corresponding to the associated item attribute identifier of a used item. In the use history storage step, a use history causing the use subject identifier, the used item identifier, and the specific information at least to correspond to one another is stored in a use history storage section. In the point distribution calculation step, one use history having the specific information is selected from the use history storage section, a first previous use history set is formed, which is a set of other use histories having the same used item identifier as the base item identifier specified by the specific information of the one use history and being older than the one use history, a user set is formed, which is a set of use subject identifiers included in the first previous use history set, and a change value to change the point value is calculated for a plurality of use subject identifiers, which is at least a part of the user set.

(32) An information processing program causing a computer of a terminal device capable of data communication with the information processing device described in (16) in which associated data is created to execute steps. The computer executes the following steps: a first transmission step of transmitting an item identifier to the information processing device; a first reception step of receiving, from the information processing device, an associated item attribute, which is an item attribute included in the item attribute information corresponding to an item attribute identifier specified by causing an item identifier transmitted in the first transmission step to correspond to a base item identifier of the associated data; and a first control step of causing a display device to display the associated item attribute received in the first reception step.

(33) An information processing program causing a computer of a terminal device capable of data communication with an information processing device which updates point values of a plurality of use subject identifiers with reference to a change value of a point value calculated by the information processing method described in (21), based on one use history indicating that a user has used an item to execute steps. The computer executes the following steps: a transmission step of transmitting information for specifying one use subject identifier to the information processing device; a reception step of receiving, from the information processing device, an item attribute corresponding to an item attribute identifier and a point value managed by the information processing device in association with the one use subject identifier; and a control step of causing a display device to display the received item attribute corresponding to the item attribute identifier and the point value.

(34) An information processing program causing a computer of a terminal device capable of data communication with an information processing device which calculates point values of a plurality of use subject identifiers by the information processing method described in (22), based on one use history indicating that a user has used an item to execute steps.

The computer executes the following steps: a transmission step of transmitting the one use history to the information processing device; a reception step of receiving, from the information processing device, the number of use subject identifiers for which the information processing device has calculated a change value of a point based on the one use history; and a control step of causing a display device to display the received number of use subject identifiers.

According to the information processing method, the display method, the information processing device, the terminal device, and the information processing program, it is possible to make users more interested in the point service and promote the use of items.

BRIEF DESCRIPTION OF THE DRAWINGS

FIG. 5 is a diagram showing a storage state of an item information storage section 242 in the first embodiment of the present invention.

FIG. 6 is a diagram showing a storage state of a use history storage section 243 in the first embodiment of the present invention.

FIG. 12 is a diagram showing a storage state of a preference information storage section 132 in the first embodiment of the present invention.

FIG. 13 is a diagram showing a storage state of a distribution information storage section 134 in the first embodiment of the present invention.

FIG. 14 is a diagram showing a storage state of a use point information storage section 135 in the first embodiment of the present invention.

FIG. 20 is a diagram showing an example of distribution user selection processing in the first embodiment of the present invention.

FIG. 22 is a diagram showing a storage state of the use point information storage section 135 when a use point is stored for each user and for each item in the first embodiment of the present invention.

FIG. 24 is a diagram showing a storage state of the use point information storage section 135 when a use point is stored for each user and for each piece of similar item information in the first embodiment of the present invention.

FIG. 32 is a diagram showing a storage state of the distribution information storage section 134 when a third method for calculating a distribution rate is used in the first embodiment and the second embodiment of the present invention.

FIG. 37 is a diagram showing a storage state of an item information storage section 242A in the fourth embodiment of the present invention.

FIG. 38 is a diagram showing a storage state of a use history storage section 243A in the fourth embodiment of the present invention.

FIG. 44 is a diagram showing a storage state of an item preference information storage section 132A in the fourth embodiment of the present invention.

FIG. 45 is a diagram showing a storage state of an attribute preference information storage section 133A in the fourth embodiment of the present invention.

FIG. 46 is a diagram showing a storage state of a distribution information storage section 135A in the fourth embodiment of the present invention.

FIG. 47 is a diagram showing a storage state of a use point information storage section 137A in the fourth embodiment of the present invention.

FIG. 54 is a diagram showing an example of distribution user selection processing in the fourth embodiment of the present invention.

FIG. 56 is a diagram showing a storage state of the use point information storage section 137A when a use point is stored for each user and for each item attribute in the fourth embodiment of the present invention.

FIG. 57 is a diagram showing a display example of a user page displayed on the display section 34A, in which information for notifying the number of users to whom a use point is given is added, in the fourth embodiment of the present invention.

FIG. 59 is a diagram showing a storage state of a temporary point information storage section 630A in the fifth embodiment of the present invention.

FIG. 60 is a flowchart showing a procedure of temporary point calculation processing in the fifth embodiment of the present invention.

FIG. 64 is a diagram showing a storage stage of the distribution information storage section 135A when sixth and seventh methods for calculating a distribution rate are used in the fourth embodiment and the fifth embodiment of the present invention.

DESCRIPTION OF THE EMBODIMENTS

<First Embodiment>

Figure 1:
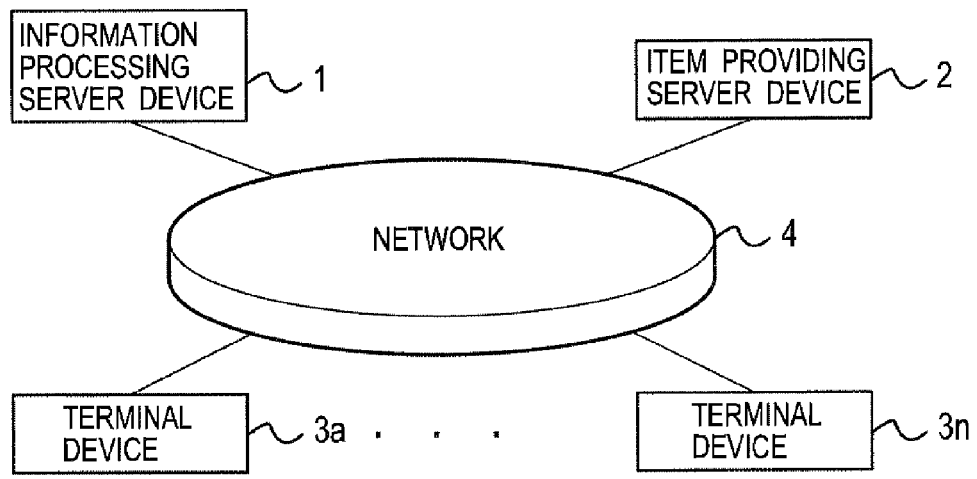
FIG. 1 is a first configuration diagram of an entire system in a first embodiment of the present invention.

Hereinafter, embodiments of the present invention are explained in detail using the drawings. FIG. 1 is a configuration diagram of an entire system in a first embodiment of the present invention. In the system in the present embodiment, an information processing server device 1, an item providing server device 2, and one or more terminal devices 3 (3a to 3n) are connected via a network 4. In each embodiment, only the information processing server device 1 and information processing server devices 6, 7 may function as an information processing device or the information processing server devices 1, 6, 7 may function as an information processing device in cooperation with the item providing server device 2 and the terminal device.

Figure 2:
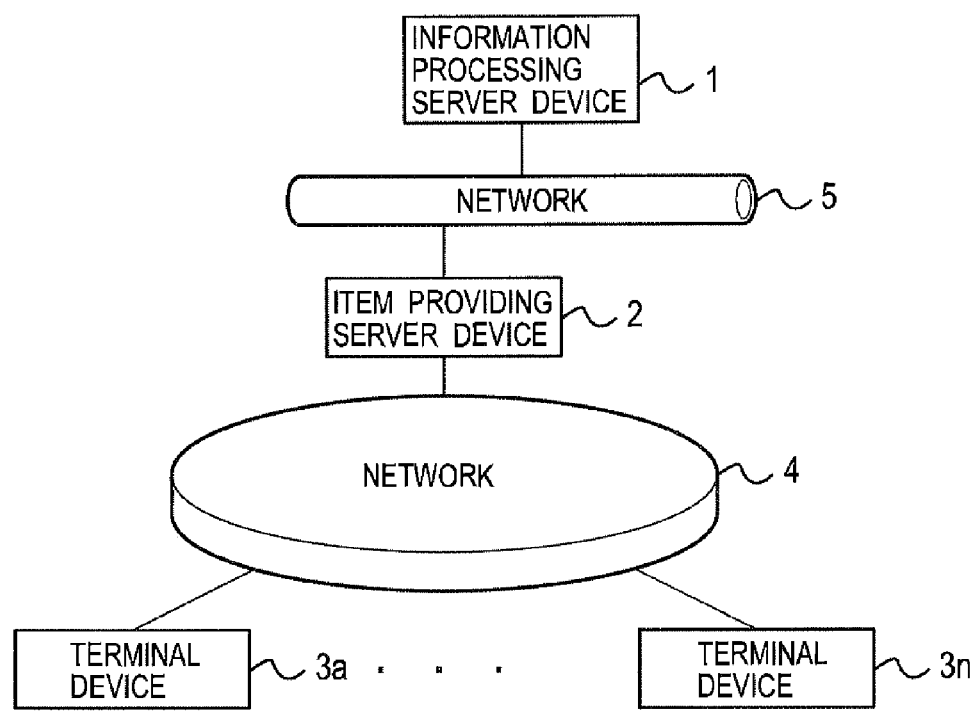
FIG. 2 is a second configuration diagram of the entire system in the first embodiment of the present invention.

Further, as shown in FIG. 2, it may also be possible to configure the entire system using two networks. In FIG. 2, the information processing server device 1 and the item providing server device 2 are connected via a network 5 and the item providing server device 2 and the terminal device 3 (3a to 3n) are connected via the network 4. The network 5 is LAN (Local Area Network) and it is designed so that the information processing server device 1 and the terminal device 3 (3a to 3n) cannot be connected directly. In the present embodiment, unless it is specified in particular, a case where the configuration of the entire system is such that as shown in FIG. 1 is explained. In the present embodiment, a case is explained where the information processing server device 1 and the item providing server device 2 are provided as separate devices, but it may also be possible to combine the two functions to realize them as a single device. The network 4 is, for example, a network, such as the Internet, and intermediates between the information processing server device 1, the item providing server device 2, and the terminal device 3 when information is transmitted and received therebetween.

Figures 3, 4:
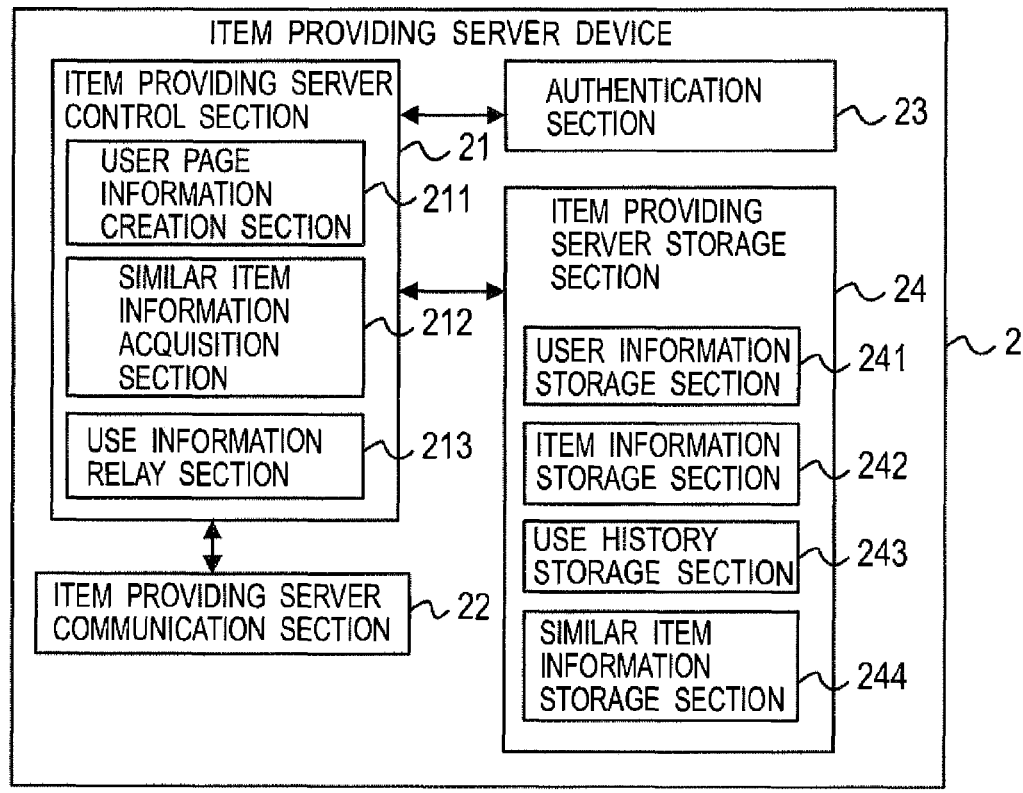
FIG. 3 is a configuration diagram of an item providing server device 2 in the first embodiment of the present invention.
FIG. 4 is a diagram showing a storage state of a user information storage section 241 in the first embodiment of the present invention.

The item providing server device 2 is a device to provide an item in response to a request from the terminal device 3. Here, items mean digital contents, such as text, voice, music, and video, and various goods, and further, information etc. about financial product, real estate, and person. That is, the item in the present embodiment may be tangible or intangible and may be charged or free. It is also possible to implement the item providing server device 2 as software (program) processing using a computer comprising a CPU, a RAM, a ROM, a hard disk drive (HDD), a network interface, etc. FIG. 3 is a configuration diagram of the item providing server device 2 in the present embodiment. The item providing server device 2 in the present embodiment is configured by an item providing server control section 21, an item providing server communication section 22, an authentication section 23, and an item providing server storage section 24.

The authentication section 23 stores user specifying information associating a user identifier for uniquely identifying a user who uses the terminal device 3 or a terminal identifier for uniquely identifying the terminal device 3 and a password and according to the necessity, the authentication section 23 performs authentication using user specifying information received from the terminal device 3 and stored user specifying information. In the present embodiment, a case is explained as an example, where a user identifier is used, but a case where a terminal identifier is used is the same. As a general term including both a user identifier and a terminal identifier, a use subject identifier is used. The item providing server storage section 24 stores various pieces of data using a storage device, such as HDD. The item providing server storage section 24 is configured by a user information storage section 241, an item information storage section 242, a use history storage section 243, and a similar item information storage section 244.

The user information storage section 241 stores a plurality of pieces of user information. FIG. 4 is a diagram showing a storage state of the user information storage section 241. The user information is information associating user_id, which is a user identifier for uniquely identifying a user who uses the terminal device 3, and user_info, which is user attribute information, and stored in the form of a table as shown in FIG. 4. The user attribute information is information about a user's name, age, sex, address (area), hobby, date when the user became a member (year/month, day, date, etc.), mail address, telephone number, etc.

The item information storage section 242 stores a plurality of pieces of item information. FIG. 5 is a diagram showing a storage state of the item information storage section 242. The item information is information associating item_id, which is an item identifier, and item_info, which is item attribute information, and stored in the form of a table as shown in FIG. 5. The item identifier is used to uniquely identify an item. The item attribute information is information about, for example, an item's name, creator, year when it was created, genre, price, condition of a user suitable for use of the item, etc.

The use history storage section 243 stores a plurality of use histories. The use history is a use history about an item of a user received from the terminal device 3 and includes at least a user identifier, an item identifier (used item identifier), and the date when the item was used (use date). FIG. 6 (FIG. 6(*a*) to FIG. 6(*d*)) is a diagram showing a storage state of the use history storage section 243. Hereinafter, four kinds of storage forms of a use history are explained using FIG. 6.

In a first storage form of a use history, a user identifier (user_id), an item identifier (item_id), and a use date (date) included in a use history are associated with each other and stored in the form of a table as shown in FIG. 6(*a*). A second storage form of a use history is used when the number of times a user uses an item is included in a use history and a user identifier (user_id), an item identifier (item_id), a use date (date), and the number of times of use (count) included in a use history are associated with each other and stored in the form of a table as shown in FIG. 6(*b*). A third storage form of a use history is used when an evaluation value (a degree of liking represented by a numerical value, such as "1: having a great dislike for", "2: rather averse to", "3: moderate", "4: rather fond of", and "5: having a great liking for"), which is evaluation for an item performed by a user and represented by a numerical value, is included in a use history and a user identifier (user_id), an item identifier (item_id), a use date (date), and an evaluation value (value) included in a use history are associated with each other and stored in the form of a table as shown in FIG. 6(*c*).

A fourth storage form of a use history is used when an amount of payment a user paid for an item is included in a use history and a user identifier (user_id), an item identifier (item_id), a use date (date), and an amount of payment (amount) included in a use history are stored in association with each other in the form of a table as shown in FIG. 6(*d*). The above is the explanation of the storage forms of a use history. Besides the above, it may also be possible to modify the storage form in accordance with the configuration of a use history so that all the pieces of information included in the use history can be stored.

It is premised that a use history received from the terminal device 3 includes a use date, but, if no use date is included, it is sufficient to store the date when the use history is stored in the use history storage section 243 as date in place of the use date. Alternatively, it may also be possible to not store date and in this case also, data newly added is added to the last of the table (to the lowermost row) without fail, and therefore, the row data located upper in the table is older and the row data located lower is more recent as a result. Because of this, it is possible to easily determine which data is older by investigating the positional relationship between two rows.

Figures 7, 8:
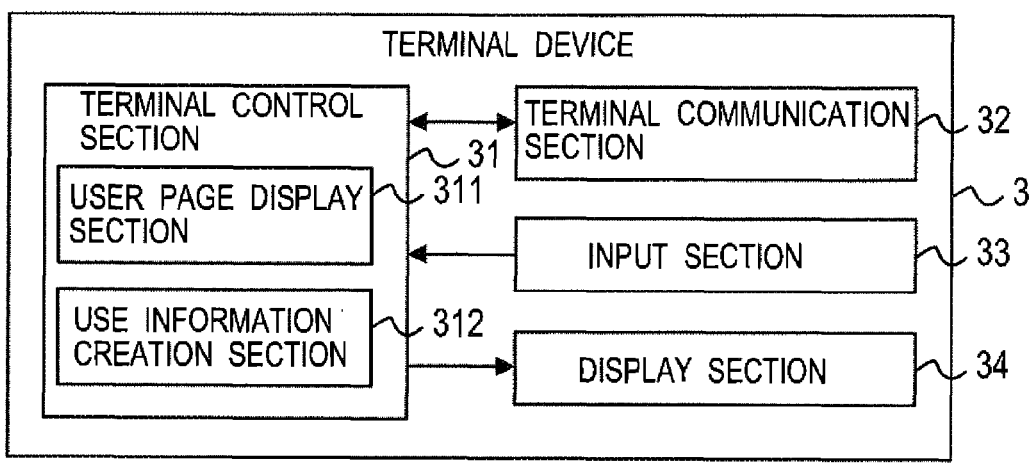
FIG. 7 is a diagram showing a storage state of a similar item information storage section 244 in the first embodiment of the present invention.
FIG. 8 is a configuration diagram of a terminal device 3 in the first embodiment of the present invention.

The similar item information storage section 244 stores a plurality of pieces of similar item information for each item. FIG. 7 is a diagram showing a storage state of the similar item information storage section 244. The similar item information is information associating base_item_id, which is an item identifier (base item identifier) of an item that is a base (base item), sim_item_id, which is an item identifier (similar item identifier) of an item having a high degree of similarity to a base item (similar item), and value, which is the similarity between a base item and a similar item represented by a numerical value (degree of similarity) and stored in the form of a table as shown in FIG. 7. Here, the names base_item_id and sim_item_id are given for discrimination to store two kinds of item identifiers in one table, but, these are the same as item_id stored in the item information storage section 242 etc.

The item providing server communication section 22 is a section to communicate with the information processing server device 1 and the terminal device 3 via the network 4.

The item providing server control section 21 totally controls each section configuring the item providing server device 2. The item providing server control section 21 is configured by a user page information creation section 211, a similar item information acquisition section 212, and a use information relay section 213.

The user page information creation section 211 performs user page information transmission processing, search result transmission processing, and similar item information transmission processing according to data received from the terminal device 3.

The user page information transmission processing is processing to create user page information of a user and transmit the created user page information to the terminal device 3 the user is using when receiving a user page information acquisition request from the terminal device 3. The user page information acquisition request is information about a request for acquisition of user page information and includes at least a user identifier of the user. The user page information is information necessary to cause the terminal device 3 to display a search screen, a browse screen of a use history, a browse screen of similar item information, and a check screen of a use point. For example, it may also be possible to create user page information using the HTML (Hyper Text Markup Language) format or use another data format.

Here, the use point is a numerical value given to a certain user having some relationship with a similar item when another user uses the similar item. Alternatively, it may also be possible to give a use point to the user him/herself who has used the similar item. Further, it may also be possible for the side providing services (service provider) by the item providing server device 2 to give a user who uses the service a special favor in accordance with the use point. For example, in the case of a shopping site, it may also be possible to enable a user to use the use point as part of payment at the time of purchasing a product or to discount the price according to the use point. A certain user having some relationship with the similar item is a user who uses the similar item and the base item corresponding to the similar item.

It may be possible to acquire information (use point information) about the use point of a user necessary to create user page information from the information processing server device 1. It may also be possible to acquire the use history of a user necessary to create user page information from the use history storage section 244.

The search result transmission processing is processing to transmit item information that satisfies the received search condition as a search result to the terminal device 3 when receiving the search condition from the terminal device 3.

The similar item information transmission processing is processing to transmit similar item information corresponding to the received similar item information acquisition request to the terminal device 3 when receiving the similar item information acquisition request from the terminal device 3. Specifically, an item identifier included in the similar item information acquisition request is collated with base_item_id and all the pieces of similar item information that match are extracted from the similar item information storage section 244 and all the extracted pieces of similar item information are transmitted to the terminal device 3. Here, the similar item information acquisition request is a request for acquisition of similar item information and includes at least an item identifier.

When receiving similar item information from the information processing server device 1, the similar item information acquisition section 212 stores the received similar item information in the similar item information storage section 244 after deleting all the pieces of stored data.

When receiving use information from the terminal device 3, the use information relay section 213 performs use information relay processing. The use information includes at least the use history before use point calculation processing is performed. When relating to the use of a similar item, the use information includes specific information in addition to the use history. The specific information is information for specifying a base item identifier of browsed similar item information and for example, includes a base item identifier and a row number indicating the storage position of the browsed similar item information in the similar item information storage section 244. When the specific information includes a row number, it is necessary to transmit also the row number to the terminal device 3 in addition to the similar item information in the similar item information transmission processing by the user page information creation section 211 described above. The use information relay processing is processing to store the use history included in the received use information in the use history storage section 243 and transmit the received use information to the information processing server device 1.

The terminal device 3 is a general computer comprising a CPU, a RAM, a ROM, a hard disk drive, a network interface, etc., and performs predetermined operations based on incorporated programs. FIG. 8 is a configuration diagram of the terminal device 3 in the present embodiment. The terminal device 3 in the present embodiment is configured by a terminal control section 31, a terminal communication section 32, an input section 33, and a display section 34.

The terminal communication section 32 is a section for communicating with the item providing server device 2 via the network 4. The input section 33 is an interface used by a user to operate the terminal device 3 and is, for example, a mouse or keyboard when the terminal device 3 is a PC (Personal Computer) or a button when the terminal device 3 is a mobile telephone. The display section 34 is an interface, for example, a display to display various pieces of information so that a user can view them visually.

The terminal control section 31 totally controls each section configuring the terminal device 3. The terminal control section 31 is configured by a user page display section 311 and a use information creation section 312.

The user page display section 311 performs user page information acquisition request transmission processing, user page display processing, search condition transmission processing, search result display processing, similar item information acquisition request transmission processing, and similar item information display processing according to the operation acquired from the input section 33 and the kind of data received from the item providing server device 2. The user page information acquisition request transmission processing is processing performed when acquiring the operation to request the display of a user page from the input section 33 and is processing to create a user page information acquisition request using the user identifier of a user and transmit the created user page information acquisition request to the item providing server device 2. The user page is drawn based on the user page information received from the item providing server device 2. The user page display processing is processing to create a user page based on the user page information received from the item providing server device 2 and display the created user page on the display section 34. The search condition transmission processing is processing performed when acquiring the input operation of a condition and the contents of the operation to request a search from the input section 33 and is processing to create a search condition using the user identifier of the user and the acquired condition and transmit the created search condition to the item providing server device 2.

Figure 9:
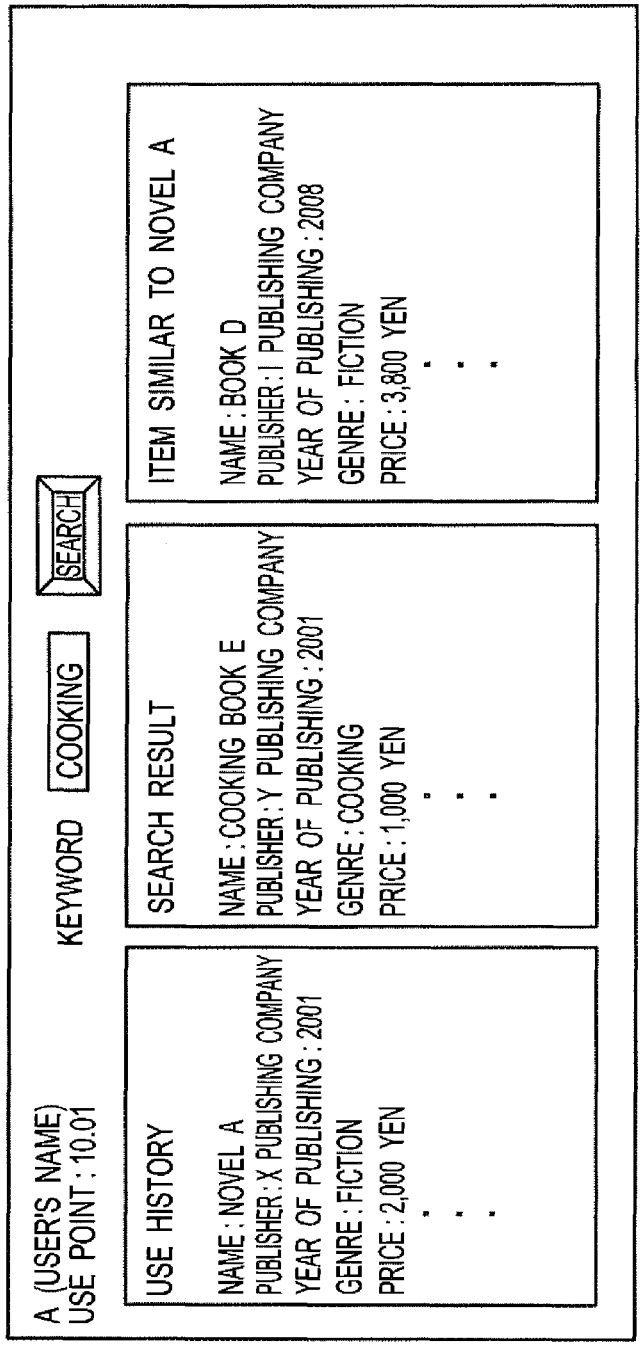
FIG. 9 is a diagram showing a display example of a user page displayed on a display section 34 in the first embodiment of the present invention.

The search result display processing is processing to update the user page based on the search result received from the item providing server device 2. The similar item information acquisition request transmission processing is processing performed when acquiring the operation from the input section 33, such as selection of the use history displayed on the use history browse screen and selection of the search result displayed on the search result browse screen, and is processing to create a similar item information acquisition request using the item identifier of the item, an object of the operation, and transmit the created similar item information acquisition request to the item providing server device 2. The similar item information display processing is processing to update the user page based on the similar item information received from the item providing server device 2. FIG. 9 is a display example of a user page. In the display example in FIG. 9, the user's name of a user using the terminal device 3 and the use point are displayed on the top-left side and the use history of the user is displayed on the bottom-left side. Further, in the center on the top side, a text box into which a search condition is input and a "search" button that triggers search condition transmission processing are displayed and in the center on the lower side, item information that satisfies the search condition is displayed. On the bottom-right side, similar item information is displayed.

The use information creation section 312 performs use information transmission processing when acquiring the use operation of an item displayed in the user page from the input section 33. The use operation of an item is an operation to select item attribute information, such as an item's name displayed in the user page, an operation to perform playback when the item is music, an operation to view when the item is a movie, an operation to specify an item as a purchase candidate (put the item into a shopping bag) when the item can be purchased in the user page, an operation to purchase the item specified as the purchase candidate, etc.

In the use information transmission processing, first, use information is created using the use history created based on the user identifier of a user and the item identifier of an item, which is an object of the use operation. At this time, when the item, which is the object of the use operation, is a similar item, use information is created using the specific information created based on the base item identifier included in the similar item information or the row number corresponding to the similar item information in addition to the use history. Then, the created use information is transmitted to the item providing server device 2. In the display example in FIG. 9, when "cooking book E", which is the search result, is used, the use information is created using only the use history of the "cooking book E" as a result and when "book D", which is a similar item, is used, the use information is created using the specific information created based on the base item identifier (item identifier of "novel A") included in the similar item information corresponding to the "book D" and the use history of the "book D". When creating the specific information using the row number, it is necessary to receive also the row number of the similar item information together with the similar item information at the time of the similar item information display processing.

It is also possible to add information other than that described above to the use history in the use information transmission processing. For example, it may also be possible to add use form information to distinguish the operation to select item attribute information, such as an item's name, the operation to specify an item as a purchase candidate, the operation to purchase the item specified as the purchase candidate, the operation to playback an item, etc., from one another. Further, it may also be possible to cause a user to evaluate an item and then add the evaluation value (degree of liking represented by a numerical value, such as "1: having a great dislike for", "2: rather averse to", "3: moderate", "4: rather fond of", and "5: having a great liking for") to the use history. Further, when performing the use information transmission processing at intervals of a predetermined period of time, it may also be possible to add the number of times of use of an item during the period of time to the use history. When it is necessary for the item providing server device 2 to perform authentication in the processing in each section of the terminal control section 31, it is sufficient to transmit the user specifying information in association therewith to the item providing server device 2. It may also be possible to store in advance a password of the user specifying information to be transmitted in a storage section, not shown schematically, of the terminal device 3 and acquire it from the storage section, not shown schematically. Further, it may also be possible to cause a user to input a password when transmitting user specifying information.

Figure 10:
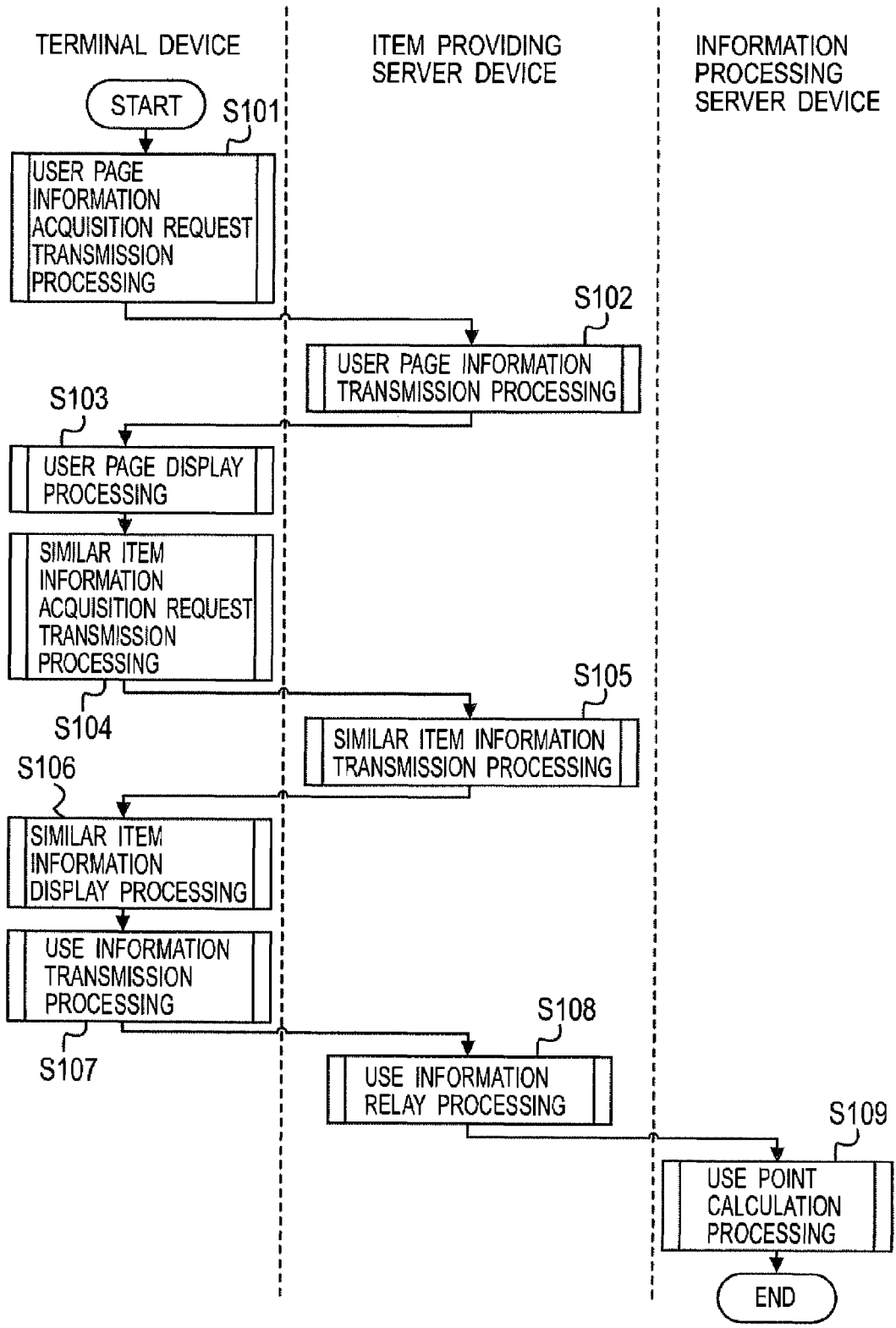
FIG. 10 is a flowchart showing an example of a procedure in relation to the use of an item in the terminal device 3 in the first embodiment of the present invention.

Here, using the flowchart in FIG. 10, an example of a procedure relating to the use of an item in the terminal device 3 is explained. First, the terminal device 3 performs user page information acquisition request transmission processing and transmits a user page information acquisition request to the item providing server device 2 (step S101).

Next, when receiving the user page information acquisition request from the terminal device 3, the user page information creation section 211 performs user page information transmission processing and transmits the user page information to the terminal device 3 (step S102). Next, when receiving the user page information from the item providing server device 2, the terminal device 3 performs user page display processing (step S103). Next, when a user who has browsed the displayed user page performs the operation to acquire a similar item, the terminal device 3 performs similar item information acquisition request transmission processing and transmits the similar item information acquisition request to the item providing server device 2 (step S104).

Next, when receiving the similar item information acquisition request from the terminal device 3, the user page information creation section 211 performs similar item information transmission processing and transmits similar item information to the terminal device 3 (step S105). Next, when receiving similar item information from the item providing server device 2, the terminal device 3 performs similar item information display processing (step S106). Next, when a user who has browsed the displayed similar item information performs the use operation relating to an item, the terminal device 3 performs use information transmission processing (step S107).

Next, the use information relay section 213 acquires use information from the terminal device 3, performs use information relay processing and transmits the acquired use information to the information processing server device 1 (step S108). Next, when receiving use information from the item providing server device 2, the information processing server device 1 performs use point calculation processing (step S109) and the series of processing from step S101 to step S109 is completed. The use point calculation processing is described later. The above is the explanation of the example of the procedure relating to the use of an item in the terminal device 3.

The information processing server device 1 is a device to transmit similar item information to the item providing server device 2 or transmit use point information in response to a request from the item providing server device 2. It is also possible to implement the information processing server device 1 as software (program) processing using a computer comprising a CPU, a RAM, a ROM, a hard disk drive (HDD), a network interface, etc.

Figure 11:
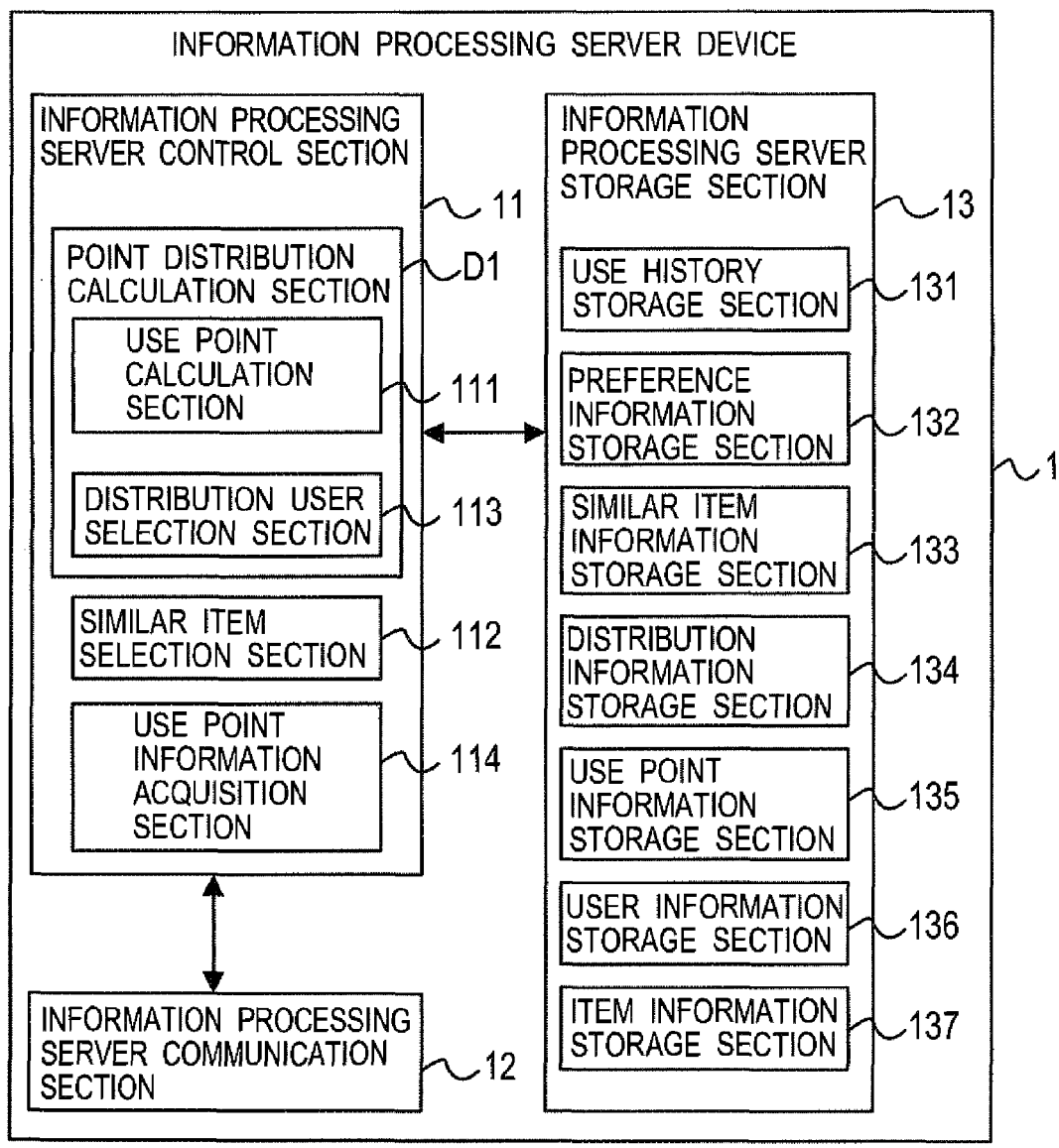
FIG. 11 is a configuration diagram of an information processing server device 1 in the first embodiment of the present invention.

FIG. 11 is a configuration diagram of the information processing server device 1 in the present embodiment. The information processing server device 1 in the present embodiment is configured by an information processing server control section 11, an information processing server communication section 12, and an information processing server storage section 13.

The information processing server storage section 13 stores various pieces of data using a storage device, such as HDD. The information processing server storage section 13 is configured by a use history storage section 131, a preference information storage section 132, a similar item information storage section 133, a distribution information storage section 134, a use point information storage section 135, a user information storage section 136, and an item information storage section 137.

The use history storage section 131 has the same storage form as that of the use history storage section 243 of the item providing server device 2 and stores all the use histories stored in the use history storage section 243.

The preference information storage section 132 stores a plurality of pieces of preference information. FIG. 12 is a diagram showing a storage state of the preference information storage section 132. The preference information is information associating an item identifier (item_id), a user identifier (user_id), and a preference value (p_value), which is a degree of liking of a user for an item represented by a numerical value, and stored in the form a table as shown in FIG. 12.

The similar item information storage section 133 has the same storage form as that of the similar item information storage section 244 of the item providing server device 2 and stores all the pieces of similar item information stored in the similar item information storage section 244.

The distribution information storage section 134 stores a plurality of pieces of distribution information. FIG. 13 is a diagram showing a storage state of the distribution information storage section 134. The distribution information is information associating a base item identifier (base_item_id), a similar item identifier (sim_item_id), a user identifier (user_id) of a user (distribution user) who used a base item and an similar item in the past, which is an object of distribution of a use parent point, and a distribution rate (rate) of a use parent point and stored in the form of a table as shown in FIG. 13. The use parent point in the present embodiment is a parent (base) of a use point given to use information having base item information indicating the use of a similar item and by multiplying the use parent point by a distribution rate, a use point is calculated for each distribution user. The use point information storage section 135 stores a plurality of pieces of use point information. FIG. 14 is a diagram showing a storage state of the use point information storage section 135. The use point information is information associating a user identifier (user_id) and a use point (point) of a user corresponding to the user identifier and stored in the form of a table as shown in FIG. 14. The initial value of the stored use point is "0".

The user information storage section 136 has the same storage form as that of the user information storage section 241 of the item providing server device 2 and stores all the pieces of user information stored in the user information storage section 241.

The item information storage section 137 has the same storage form as that of the item information storage section 242 of the item providing server device 2 and stores all the pieces of item information stored in the item information storage section 242. The use history storage section, the similar item information storage section, the user information storage section, and the item information storage section exist both in the information processing server device 1 and in the item providing server device 2, but, it may also be possible to provide the respective storage sections in one of the devices and enable information stored in the respective storage sections to be mutually exchanged therebetween.

The information processing server communication section 12 is a section to communicate with the item providing server device 2 via the network 4.

The information processing server control section 11 totally controls each section configuring the information processing server device 1. The information processing server control section 11 is configured by a use point calculation section 111, a similar item selection section (associated data creation section) 112, a distribution user selection section 113, and a use point information acquisition section 114. The use point calculation section 111 and the distribution user selection section 113 cooperate and function as a point distribution calculation section D1.

Figure 15:
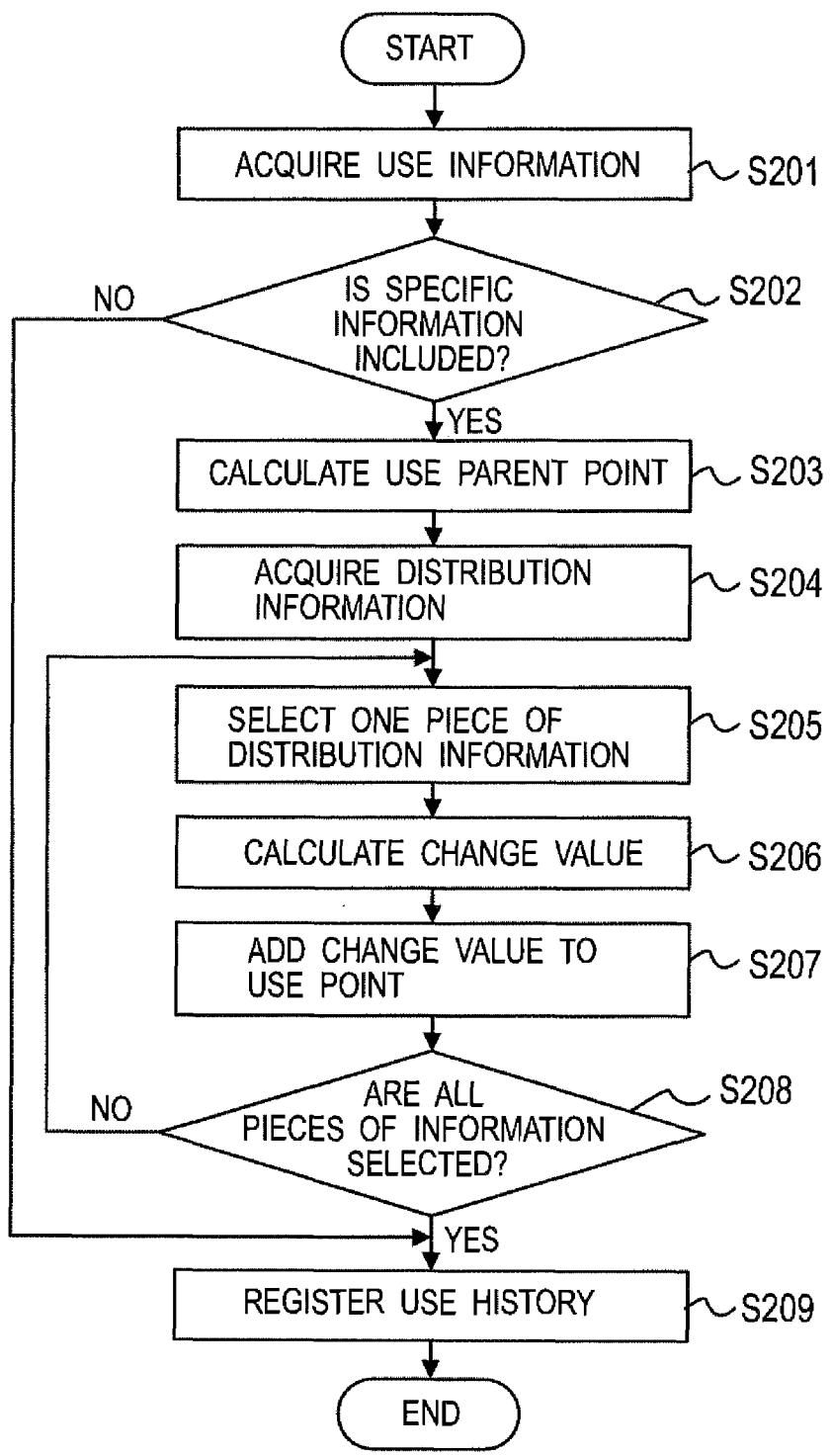
FIG. 15 is a flowchart showing a procedure of use point calculation processing in the first embodiment of the present invention.

When receiving use information from the item providing server device 2, the use point calculation section 111 performs use point calculation processing (step S111). The procedure of the use point calculation processing is explained using the flowchart in FIG. 15. First, the use point calculation section 111 acquires use information from the item providing server device 2 (step S201). Next, the use point calculation section 111 determines whether or not the use information acquired in step S201 includes specific information (step S202). When specific information is included, the procedure proceeds to step S203 and when not, to step S209.

In step S203, the use point calculation section 111 calculates a use parent point. In the method for calculating a use parent point, for example, a certain point (for example, a point of 10) set in advance by the service provider is given for each piece of use information. In the case of a shopping site that handles charged items, it may also be possible to calculate a use parent point as a certain proportion (for example, 1% of a purchase price) of a purchase price. Further, when use form information of an item is included in the use history included in the use information, it may also be possible for the service provider to set a certain point in advance for each use form and give it as a use parent point.

Next, the use point calculation section 111 extracts a base item identifier from the specific information included in the use information acquired in step S201 from the distribution information storage section 134 and acquires all the pieces of distribution information in which the combination of the extracted base item identifier and the used item identifier of the use history (one use history) included in the use information agrees with the combination of base_item_id and sim_item_id (step S204). All the distribution users corresponding to user_id included in the distribution information acquired here are users who have used the base item and the item corresponding to the use history at the time earlier than the use information. When the specific information is created based on the row number, it is sufficient to specify the similar item information corresponding to the row number from the similar item information storage section 133 and extract the base item identifier from the specified similar item information.

Next, the use point calculation section 111 selects one of the pieces of distribution information acquired in step S204, for example, in the order of acquisition (step S205). Next, the use point calculation section 111 calculates a change value to change a use point by multiplying the use parent point calculated in step S203 and rate included in the distribution information selected in step S205 (step S206). Next, the use point calculation section 111 specifies the use point information corresponding to user_id included in the distribution information selected in step S205 in the use point information storage section 135 and adds the change value calculated in step S206 to point (original use point) of the specified use point information (step S207).

Next, the use point calculation section 111 determines whether or not all the pieces of distribution information are selected in step S205 (step S208). When all are selected, the procedure proceeds to step S209 and when those not selected yet remain, to step S205. In step S209, the use point calculation section 111 stores the use history included in the use information acquired in step S201 in the use history storage section 131 and the series of processing from step S201 to step S209 is completed. By storing a use history in the use history storage section 131, the use history is regarded to be processed already. When it is desired to add a fixed change value also to a user who has used a similar item, it may be possible to add in this step. At this time, in the use point information storage section 135, the use point information corresponding to the user identifier included in the use information acquired in step S201 is specified and the change value set in advance by the service provider is added to point (original use point) of the specified use point information.

In the above-described explanation, in step S207, the change value is added to the original use point and thus the use point is updated, however, it may also be possible to update the use point by using multiplication processing of the original point and a coefficient (change value) shown below in place of addition processing. At this time, in step S203, in place of the use parent point, which is the sum of use points to be added, a parent increase rate is calculated, which is the total value of increase rates (a value indicative of how much the original use point is increased, and the coefficient is obtained by adding one to this value). Then, it is assumed that a distribution rate relating to a base item ib and a similar item is of a distribution user u included in the distribution information selected in step S205 is rate (u, ib, is) and a parent increase rate is sr, and a coefficient m (u, ib, is) is calculated by formula (1).

$$m(u,ib,is) = 1 + sr \times \text{rate}(u,ib,is) \qquad \text{Formula (1)}$$

When the initial value of the use point is "0", the use point does not increase even if the coefficient is multiplied a number of times, and therefore, the initial value is set to a value greater than "0", or the initial value is "0" but only when it becomes an object of calculation of the use point for the first time, a fixed point number is added. Further when it is desired to perform multiplication by a fixed coefficient also for a user who has used a similar item, it is sufficient to specify the use point information corresponding to the user identifier included in the use information acquired in step S201 and multiply point (original use point) of the specified use point information by the coefficient set in advance by the service provider in step S209. The above is the explanation of use point calculation processing.

The similar item selection section 112 performs similar item selection processing at each predetermined timing after deleting all of the pieces of preference information stored in the preference value storage section 132 and similar item information stored in the similar item information storage section 133. As the predetermined timing, predetermined time intervals (for example, every 24 hours) may be used or the predetermined timing may be each time a use history is received a predetermined number of times. Further, it may also be possible to vary the time intervals, such as that, every three hours from Monday through Friday, every six hours on Saturday, and every 12 hours on Sunday. Furthermore, it may also be possible to vary the time intervals according to seasons, such as that, the time intervals are set short in summer and long in winter.

Figure 16:
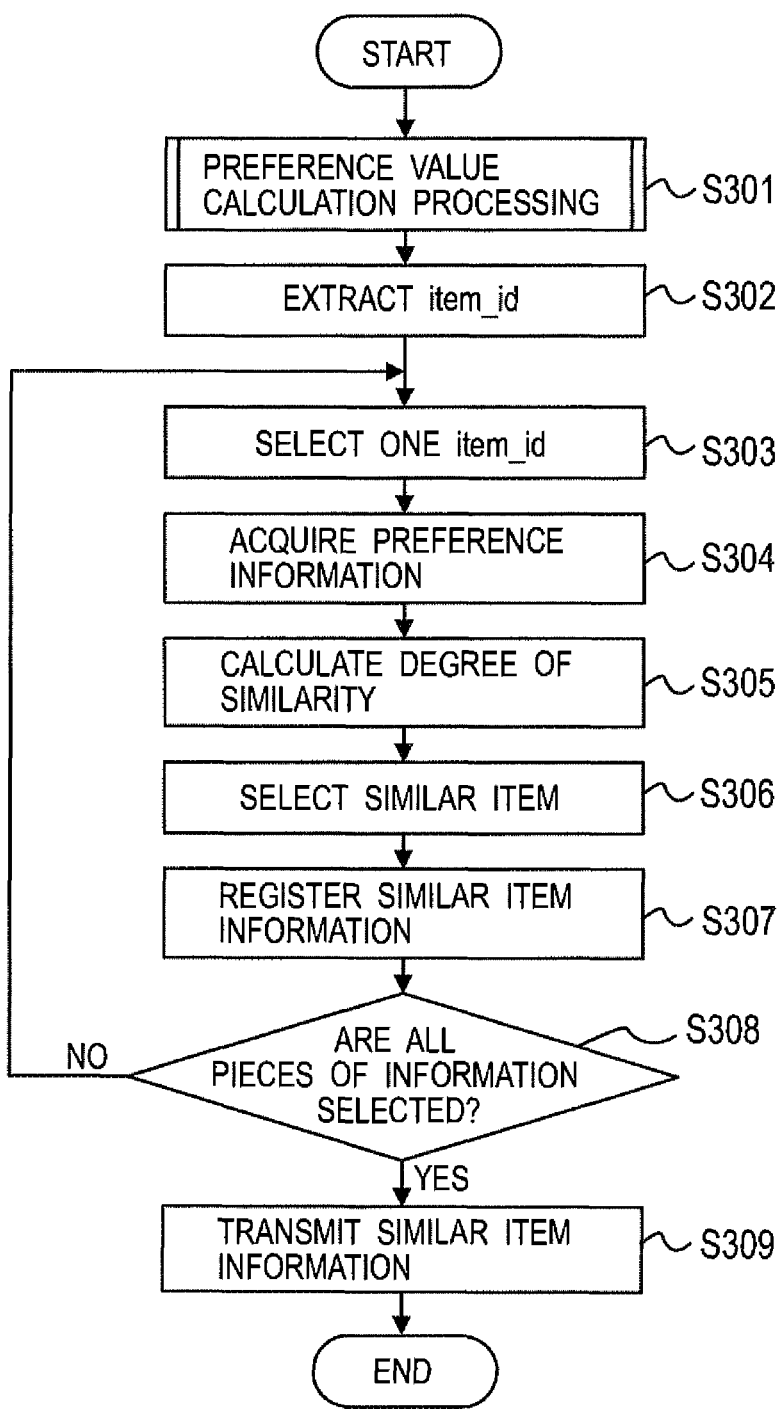
FIG. 16 is a flowchart showing a procedure of similar item selection processing in the first embodiment of the present invention.

Here, the procedure of similar item selection processing is explained using the flowchart in FIG. 16. First, the similar item selection section 112 performs preference value calculation processing (step S301). Next, the similar item selection section 112 extracts all item_ids without duplication from the preference information storage section 132 (step S302). Next, the similar item selection section 112 selects one of item_ids extracted in step S302, for example, in the order of extraction (step S303).

Next, the similar item selection section 112 acquires the preference information of the item (regarded as the base item) corresponding to item_id selected in step S302 and all the pieces of preference information of the item (similar candidate item) used by any of users who have used the base item from the preference information storage section 132 (step S304). In order to acquire all the pieces of preference information of the similar candidate item, it is sufficient to acquire all the pieces of preference information having any of the user identifiers included in all the pieces of preference information of the base items of all the pieces of preference information except for the preference information of the base item.

Next, the similar item selection section 112 calculates a degree of similarity to the base item for each similar candidate item using the preference information acquired in step 304 (step S305). As a method for calculating a degree of similarity, it may be possible to use, for example, a Jaccard coefficient of a set of users who have used the base item and a set of users who have used the similar candidate item. It may also be possible to use a cosine distance between two items calculated using the preference value of the user for the item as the degree of similarity. Further, it may also be possible to use a Pearson's product-moment correlation coefficient calculated using the preference value of the user who has used both the base item and the similar candidate item as the degree of similarity. Furthermore, it may also be possible to calculate the degree of similarity between two items using the item attribute information without using the use history. Besides the above, any index may be used as long as it indicates similarity between two items.

Next, the similar item selection section 112 selects a similar item from among the similar candidate items based on the degree of similarity calculated in step S305 (step S306). As the selection criterion of a similar item, it is sufficient to select similar items in the number set in advance by the service provider in the descending order of degree of similarity. It may also be possible to select, as similar items, similar candidate items having a degree of similarity higher than a threshold value determined in advance by the service provider.

Next, the similar item selection section 112 stores similar item information associating item_id of a base item (base_item_id), an item identifier of the similar item selected in step S306 (sim_item_id), and the degree of similarity (value) between the base item and the similar item in the similar item information storage section 133 for each similar item selected in step S306 (step S307). Next, the similar item selection section 112 determines whether or not all item_ids extracted in step S303 are selected (step S308). When all are selected, the procedure proceeds to step S309 and when those not selected yet remain, to step S303.

In step S309, the similar item selection section 112 transmits all the pieces of similar item information stored in the similar item information storage section 133 to the item providing server device 2 and the series of processing from step S301 to step S309 is completed.

Figure 17:
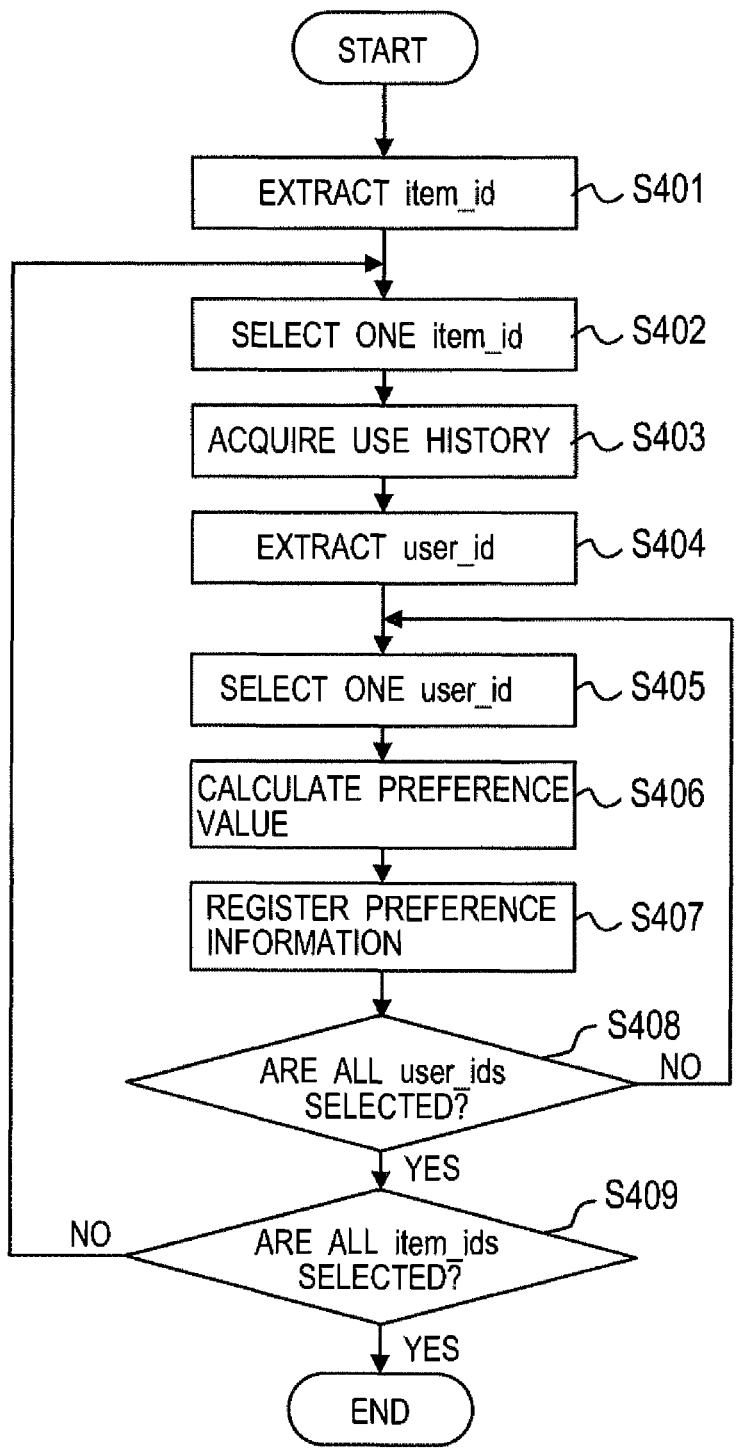
FIG. 17 is a flowchart showing a procedure of preference value calculation processing in the first embodiment of the present invention.

Next, the procedure of the preference value calculation processing in step S301 is explained using the flowchart in FIG. 17. First, the similar item selection section 112 extracts all item_ids without duplication from the use history storage section 131 (step S401).

Next, the similar item selection section 112 selects one of item_ids extracted in step S401, for example, in the order of extraction (step S402). Next, the similar item selection section 112 acquires all the use histories including item_id selected in step S402 from the use history storage section 131 (step S403). Next, the similar item selection section 112 extracts all user_ids without duplication from the use histories acquired in step S403 (step S404).

Next, the similar item selection section 112 selects one of user_ids extracted in step S404, for example, in the order of extraction (step S405). Next, the similar item selection section 112 calculates a preference value using only those (preference value calculation target use histories) including user_id selected in step S405 of the use histories acquired in step S403 (step S406). Hereinafter, eight kinds of methods for calculating a preference value are explained.

A first method for calculating a preference value is a method for calculating a preference value as "1". In this method, the influence (weight) of each individual user on the preference value is assumed to be equal (the same). The amount of calculation of this method is the smallest. A second method for calculating a preference value is a method for calculating a preference value as the total number of times of use. As the total number of times of use, the sum of the numbers of times of use included in the preference value calculation target use history when the number of times of use is stored as in the second storage form of the use history storage section 131 may be used. When the number of times of use is not included, the number of preference value calculation target use histories may be used as the total number of times of use. In this method, the influence (weight) of each individual user on the preference value is varied, and therefore, a user having a larger total number of times of use of an item, which is the target of calculation of a preference value, has a greater influence as a result.

A third method for calculating a preference value is a method that can be used only when the evaluation value is stored as in the third storage form of the use history storage section 131 and is a method for calculating a typical value (sum, average value, maximum value, minimum value, median, or an evaluation value corresponding to the most recent date of evaluation values) of the evaluation values included in the preference value calculation target use history as the preference value. In this method, the influence (weight) of each individual user on the preference value is varied, and therefore, a user having a higher evaluation value for an item, which is the target of calculation of the preference value, has a greater influence as a result. A fourth method for calculating a preference value is a method for calculating a preference value by using a use date included in the use history and weighting the use history in such a manner that a use history including an older use date is weighted more. For example, it is sufficient to calculate a difference between the date (present) when similar item selection processing is performed and the use date thereof and calculate a typical value (sum total, average value, maximum value, or minimum value) of the difference for each preference value calculation target use history. In this method, the influence (weight) of each individual user on the preference value is varied, and therefore, a user who has used the item earlier, which is the target of calculation of the preference value, has a greater influence (weight) as a result.

A fifth method for calculating a preference value is a method for calculating a preference value by using a use date included in the use history and weighting the use history in such a manner that a use history including a more recent use date is weighted more. For example, it is sufficient to calculate a difference between the date (present) when similar item selection processing is performed and the use date thereof and calculate a typical value (sum total, average value, maximum value, or minimum value) of the inverse of the difference for each preference value calculation target use history. In this method, the influence of each individual user on the preference value is varied, and therefore, a user who has used the item more recently, which is the target of calculation of the preference value, has a greater influence as a result. Although the inverse is used so that the larger the difference between dates, the smaller the distribution rate is, another method may be used. For example, an exponential function (monotonically decreasing function) having a base of more than 0 and less than 1 may be used.

In the fourth and fifth methods for calculating a preference value, it is necessary to perform processing to prevent the difference between the date (present) when similar item selection processing is performed and the use date from becoming "0". A sixth method for calculating a preference value is a method that can be used only when an amount of payment is stored as in the fourth storage form of the use history storage section 131 and a method for calculating a typical value (sum total, average value, maximum value, minimum value, or median) of the amount of payment included in the preference value calculation target use history as the preference value. In this method, the influence (weight) of each individual user on the preference value is varied, and therefore, a user whose amount of payment for an item is larger, which is the target of calculation of the preference value, has a greater influence as a result.

A seventh method for calculating a preference value is a method for calculating a preference value by weighting a user in such a manner that a user whose date of membership registration is older is weighted more when the date (date of membership registration) when the user became a member is included in the user information stored in the user information storage section 136. For example, it is sufficient to calculate a typical value (sum total, average value, maximum value, minimum value, or median) of a difference between the date (present) when similar item selection processing is performed and the date of membership registration as the preference value. In this method, the influence (weight) of each individual user on the preference value is varied, and therefore, a user who became a member earlier has a greater influence as a result.

An eighth method for calculating a preference value is a method for calculating a preference value by weighting a user in such a manner that a user whose date of membership registration is more recent is weighted more when the date of membership registration is included in the user information stored in the user information storage section 136. For example, it is sufficient to calculate a typical value (sum total, average value, maximum value, minimum value, or median) of the inverse of a difference between the date (present) when similar item selection processing is performed and the date of membership registration as the preference value. In this method, the influence (weight) of each individual user on the preference value is varied, and therefore, a user who became a member more recent has a greater influence as a result. Although the inverse is used so that the larger the difference between dates, the smaller the distribution rate is, another method may be used. For example, an exponential function (monotonically decreasing function) having a base of more than 0 and less than 1 may be used.

In the seventh and eighth methods for calculating a preference value, it is necessary to perform processing to prevent the difference between the date (present) when similar item selection processing is performed and the date of membership registration from becoming "0". It may also be possible to calculate a preference value by combining the first to eighth methods for calculating a preference value. For example, it may also be possible to calculate the preference values (preference value 1 to preference value N) by the respective methods and use the sum, product, average value, etc., of those preference values as the total preference value. Further, it may also be possible to combine the third and sixth methods for calculating a preference value, calculate the product of the evaluation value and the amount of payment, and calculate the sum total of those products as the preference value.

Next, the similar item selection section 112 stores preference information associating item_id selected in step S402, user_id selected in step S405, and the preference value (p_value) calculated in step S406 in the preference information storage section 132 (step S407). Next, the similar item selection section 112 determines whether or not all user_ids extracted in step S405 are selected (step S408). When all are selected, the procedure proceeds to step S409 and when those not selected yet remain, to step S405. In step S409, the similar item selection section 112 determines whether or not all item_ids extracted in step S402 are selected. When all are selected, the series of processing from step S401 to step S409 is completed and when those not selected yet remain, the procedure proceeds to step S402.

It may also be possible to limit the use histories used in preference value calculation processing only to use histories relating to the items used during the period from a specific time in the past to the time (present) when preference value calculation processing is performed. A specific time in the past may be set in advance by the service provider and for example, a time three months, half a year, or one year before the time when preference value calculation processing is performed may be set. At this time, when extracting item_id from the use history storage section 131 in step S401, it is sufficient to extract only item_id included in the use histories after the specific time in the past. Further, when acquiring the use history from the use history storage section 131 in step S403, it is sufficient to acquire the use histories after the specific time in the past. Due to this, it is possible to select a similar item using only use histories corresponding to a predetermine period of time.

Further, it may also be possible to limit the use histories used in preference value calculation processing using the item attribute information included in the item information stored in the item information storage section 137. At this time, when extracting item_id from the use history storage section 131 in step S401, it is sufficient to acquire only item_id of the item having the item attribute of a predetermined condition (for example, genre "fiction"). It is, of course, possible to specify nothing as a predetermined condition. Due to this, it is possible to select a similar item using only the item having a predetermined item attribute. The above is the explanation of the procedure of similar item selection processing.

The distribution user selection section 113 performs distribution user selection processing at each predetermined timing after deleting all the pieces of data stored in the distribution information storage section 134. As a predetermined timing, various kinds of timing can be used as the predetermined timing at which similar item selection processing is performed. Further, this timing may be synchronized or not synchronized with the predetermined timing at which similar item selection processing is performed.

Figure 18:
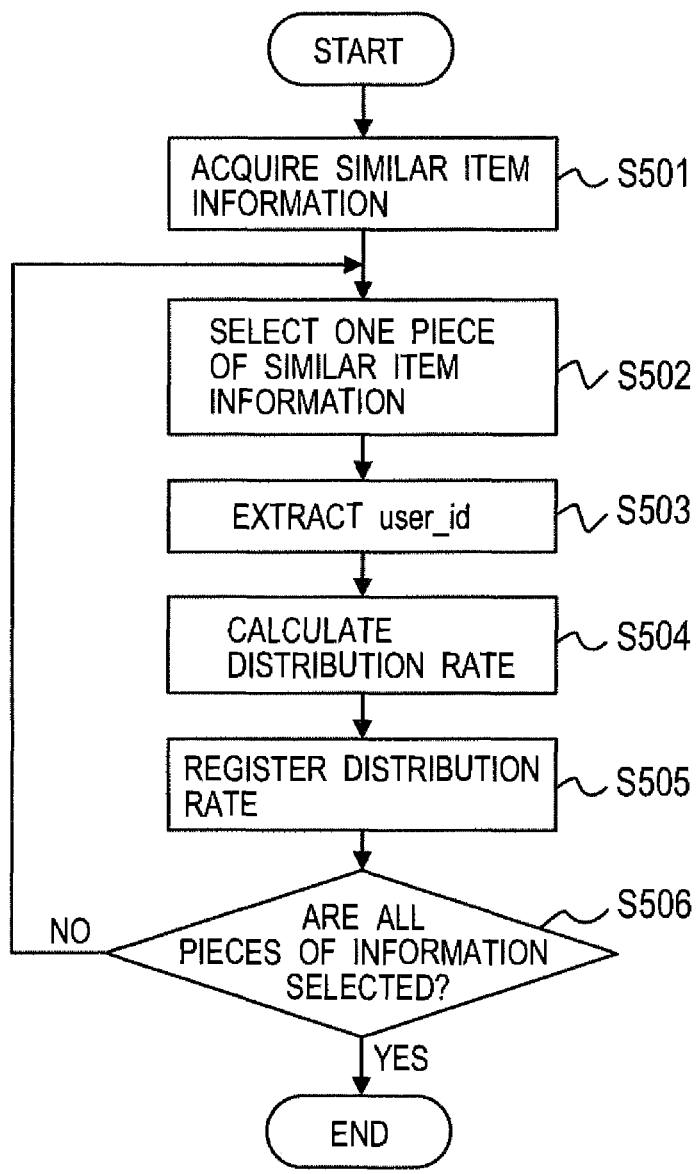
FIG. 18 is a flowchart showing a procedure of distribution user selection processing in the first embodiment of the present invention.

The procedure of distribution user selection processing is explained using the flowchart in FIG. 18. First, the distribution user selection section 113 acquires all the pieces of similar item information from the similar item information storage section 133 (step S501). Next, the distribution user selection section 113 selects one of the pieces of similar item information acquired in step S501. For example, it is sufficient to select the piece of similar item information one by one, for example, in the order of acquisition (step S502).

Next, the distribution user selection section 113 extracts user_id of a user (distribution target user) who has used both the base item and the similar item in the similar item information selected in step S502 from the use history storage section 131 (step S503). In order to extract user_id of a distribution target user, first, preference information (base item preference information) having item_id that agrees with base_item_id included in similar item information is specified. Next, preference information (similar item preference information) having item_id that agrees with sim_item_id included in similar item information is specified. Next, all user_ids present both in the specified base item preference information (preference information created using the first previous use history) and in the similar item preference information (preference information created using the second previous use history) are extracted. The distribution rate is calculated only for the distribution target user. If the characteristic that a point is given when both the base item and the similar item are used is disclosed, an incentive is produced in a user who uses only one of the base item and the similar item to "obtain a point by using the item not used", and therefore, the effect to promote the use of the item is further increased.

It may also be possible to select a user who has used only the base item as a distribution target user. By doing so, the frequency with which a point is given to a user is increased, and therefore, the effect to cause a user to access the site more frequently is obtained. Further, when selecting a user who has used the base item as a distribution target user, it is also possible to give more points to a user who has used both the base item and the similar item than points to a user who has used only the base item. At this time, by disclosing the characteristic, an incentive is produced in a user to "obtain more points by using the item not used", and therefore, the effect to promote the use of the item is further increased. Further, it may also be possible to select a user who has used only the similar item as a distribution target user or select a user who has used one of the base item and the similar item as a distribution target user. At this time also, the same effect as that when a user who has used only the base item is selected as a distribution target user can be obtained.

Next, the distribution user selection section 113 calculates a distribution rate for each distribution target user (step S504). As a method for calculating a distribution rate, the following two kinds of methods can be used. In the following explanation of the method for calculating a distribution rate, it is assumed that the base item corresponding to the similar item information selected in step S502 is ib, the similar item is, and a set of distribution target users who have used both ib and is U (ib, is). The sum total of the distribution rates are set to 1 so that the sum total of the use points for one similar item equals the use parent point.

A first method for calculating a distribution rate is a method for calculating a distribution rate so that the rate is the same for the distribution target users. If it is assumed that the number of the set of distribution target users U (ib, is) is |U (ib, is)|, a distribution rate rate (u, ib, is) of a user u (∈U (ib, is)) is expressed by formula (2). The amount of calculation of this method is the smallest. Further, in this method, the distribution rate is calculated based on the consideration that all the distribution target users contribute equally to similar item selection.

$$\text{rate}(u, ib, is) = \frac{1}{|U(ib, is)|} \qquad \text{Formula (2)}$$

A second method for calculating a distribution rate is a method for calculating a distribution rate using the preference value. It may also be possible to acquire the preference value used here from the preference information stored in the preference information storage section 132 or calculate it using a use history. When the average value, maximum value, minimum value, sum, product, or one of the two preference values (preference value of the base item and preference value of the similar item) for the distribution target user u (∈U (ib, is)) is assumed to be a total preference value V (u), then the distribution rate rate (u, ib, is) of the user u is expressed by formula (3).

$$\text{rate}(u, ib, is) = \frac{V(u)}{\sum_{u' \in U(ib,is)} V(u')} \quad \text{Formula (3)}$$

In the second method for calculating a distribution rate, the distribution rate is calculated so that the value is larger for the distribution target user having a higher preference value in the distribution target user set U (ib, is). Consequently, in this method, the characteristic changes depending on the method for calculating a preference value.

When the first method for calculating a preference value is used, the characteristic is the same as that in the first method for calculating a distribution rate. When the second method for calculating a preference value is used, the use point obtained increases in proportion to the number of times of use, and therefore, by disclosing the characteristic to users, it is possible to promote the use of an item by the users. When the third method for calculating a preference value is used, the distribution rate is higher for a user having a higher typical value of the evaluation value. When the fourth method for calculating a preference value is used, more points are distributed to a user who has begun to use the base item and the similar item recently (user who has become a member newly etc.), and therefore, it is likely to prevent the user from withdrawing from the item use service. The reason for this is that in the methods other than the fourth method for calculating a preference value, a user who has used most recently obtains a considerably smaller total value of use points obtained from the similar item information corresponding to the base item and the similar item than a user who has used earlier, but, in this calculation method, it is possible to reduce a difference between the total value of use points of a user who has used the item earlier and the total value of use points of a user who has used later.

In the fifth method for calculating a preference value, it is possible for a user who has used earlier to obtain more use points, and therefore, by disclosing the characteristic to users, it is possible to obtain a large number of users when the use of an item starts. When the sixth method for calculating a preference value is used, the distribution rate is higher for a user having a higher typical value of the amount of payment. When the seventh method for calculating a preference value is used, the use point of a user becomes likely to increase, who has become a member recently, and therefore, it is likely to prevent a user who has become a member from giving up his/her membership immediately. The reason for this is that in the methods other than the seventh method for calculating a preference value, there is a trend for the use point of a user who has become a member recently to be hard to increase. In particular, when the item use service lasts for a long period of time, the number of users is large accordingly, the number of items used by each user increases, and the number of distribution target users relating to one piece of similar item information increases, and therefore, the use point obtained at one time is reduced. When the eighth method for calculating a preference value is used, it is possible for a user who has become a member earlier (user who has been a member for a long time) to obtain more points, and therefore, by disclosing the characteristic to users, the possibility that users make judgments that "once become a member, it is more advantageous to be a member as long as possible" becomes high, and therefore, it is possible to increase the number of users who continue to be a member without giving up his/her membership halfway.

When selecting a user who has used the base item as a distribution target user, it is sufficient to calculate a distribution rate using the preference value for the base item as the total preference value. At this time, it may also be possible to calculate the total preference value by, for example, adding a constant determined in advance by the service provider to the preference value for the base item so that a distribution target user who has used both the base item and the similar item can obtain more use points than a distribution target user who has used only the base item. Further, it may also be possible to calculate the total preference value by multiplying the preference value for the base item by a coefficient greater than "1", determined in advance by the service provider. Furthermore it may also be possible to calculate the sum of the preference value for the base item and the preference value for the similar item as the total preference value. When selecting a user who has used only the similar item as a distribution target user, it is sufficient to calculate a distribution rate using the preference value for the similar item as the total preference value. When selecting a user who has used one of the base item and the similar item as a distribution target user, it may also be possible to calculate the total preference value using two preference values for a distribution target user who has used both the base item and the similar item and calculate the preference value for an item used once as the total preference value for distribution target users other than the above. The above is the explanation of the method for calculating a distribution rate.

The distribution rate calculated by the above-mentioned two kinds of methods for calculating a distribution rate has a value equal to or more than "0". Then, when the distribution rate is "0", the change value is "0", and therefore, a distribution target user whose distribution rate is not "0" is selected as a distribution user to whom a use parent point is distributed (the set formed by distribution users will be the set of users to whom a use point is distributed). Next, the distribution user selection section 113 stores distribution information associating base_item_id and sim_item_id included in the similar item information selected in step S502, user_id of a distribution user, and the distribution rate (rate) of a distribution user calculated in step S504 in the distribution information storage section 134 for each distribution user (step S505). Next, the distribution user selection section 113 determines whether or not all the pieces of similar item information are selected in step S502 (step S506). When all are selected, the series of processing from step S501 to step S506 is completed and when those not selected yet remain, the procedure proceeds to step S502.

It may also be possible to limit the similar item information of the distribution user selection processing target using the item attribute information included in the item information stored in the item information storage section 137. At this time, when acquiring similar user information in step S501, it is sufficient to acquire only the similar user information in which the base item identifier and the similar item identifier agree with any of item_ids of items having the item attribute of a predetermined condition (for example, genre "fiction"). It may, of course, be possible to specify nothing as a predetermined condition.

Further, it may also be possible to limit the number of distribution users to whom the use parent point is distributed for one piece of similar item information. To do this, it is sufficient to extract part of users from the distribution target candidate user set as distribution target users rather than selecting all the users (distribution target candidate users) who have used both the base item and the similar item as distribution target users for whom the distribution rate is calculated. As a method for extracting distribution target users from distribution target candidate users, for example, it is sufficient to randomly extract distribution target users in the number not exceeding a predetermined number from the distribution target candidate user set. That is, when the number of distribution target candidate users is larger than the predetermined number, it may be possible to randomly extract the predetermined number of users and when the number of distribution target candidate users is equal to or less than the predetermined number, it is sufficient to extract all the distribution target candidate users as distribution target users. Further, it may also be possible to extract distribution target users in the number not exceeding the predetermined number in the descending order of the total preference value.

It may also be possible to extract user identifiers from the use histories in the order from the oldest use date and extract the user identifiers of distribution target users in the number not exceeding the predetermined number in the order of extraction. Further, on the contrary, it may also be possible to extract user identifiers from the use histories in the order from the most recent use date and extract the user identifiers of distribution target users in the number not exceeding the predetermined number in the order of extraction. When the date of membership registration is included in the user information storage section 136, it may also be possible to extract user identifiers from the use histories in the order from the oldest date of membership registration and extract the user identifiers of distribution target users in the number not exceeding the predetermined number in the order of extraction. Further, on the contrary, it may also be possible to extract user identifiers from the use histories in the order from the most recent date of membership registration and extract the user identifiers of distribution target users in the number not exceeding the predetermined number in the order of extraction.

It may also be possible to select distribution target candidate users as distribution target users, who satisfy conditions determined in advance by the service provider (for example, a condition is set for each of a plurality of attributes, such as, whether or not the sex is "female", whether or not the age is in the range of "20" to "24", and whether or not the area is "Japan", and whether or not the distribution target candidate users satisfy all of these conditions or at least one of these conditions, etc.) based on the user attribute information included in the user information stored in the user information storage section 136. The above is the explanation of the procedure of distribution user selection processing.

The use point information acquisition section 114 performs use point information transmission processing in response to a request from the item providing server device 2. The use point information transmission processing is processing to acquire use point information corresponding to a user identifier included in the use point information acquisition request received from the item providing server device 2 from the use point information storage section 135 and transmit the acquired use point information to the item providing server device 2.

Figure 19:
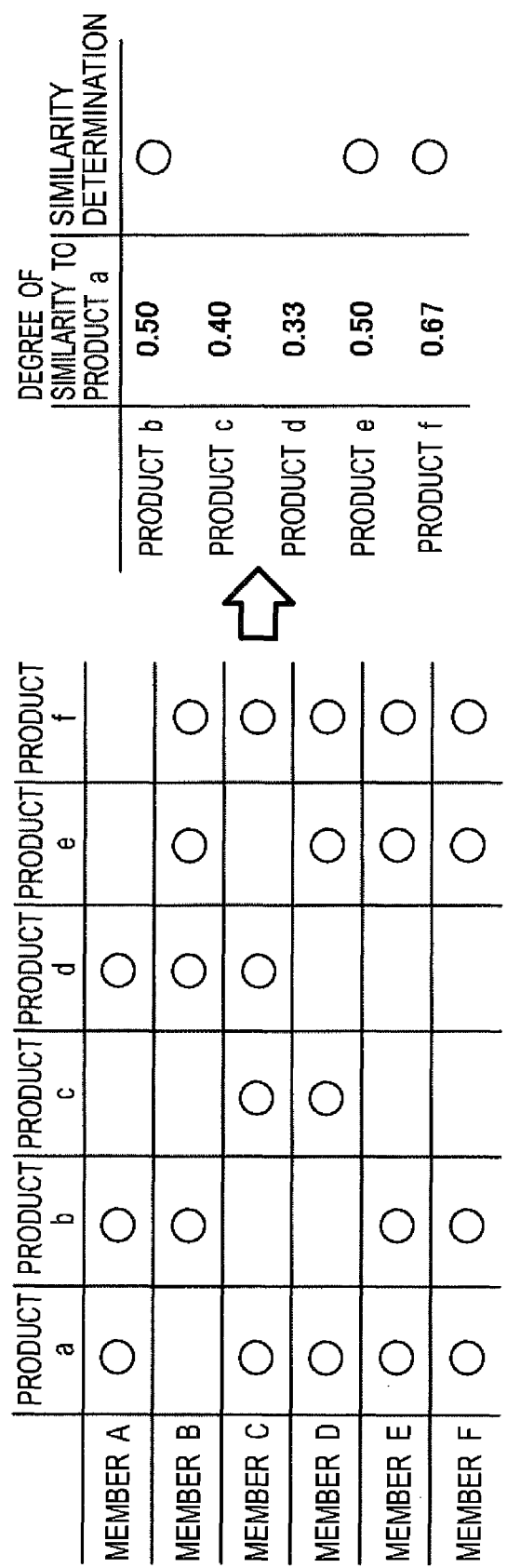
FIG. 19 is a diagram showing an example of similar item selection processing in the first embodiment of the present invention.

Here, an example is explained, in which a similar item of a product a is selected based on the purchase histories of member A to member F and the distribution rate of the use parent point is calculated for each similar product to the product a, using the drawings along the present embodiment. First, an example is explained, in which a similar product to the product a is selected, using FIG. 19. In the table on the left side in FIG. 9, the purchase status of the product a to product f by the member A to the member F is indicated by presence/absence of "∘". For example, the table indicates that the member A has purchased the "product a", "product b", and "product d". The degree of similarity between the product a and another product is calculated by a Jaccard coefficient and a threshold value is set to 0.5. By doing so, the degree of similarity between the product a and another product is calculated as shown in the table on the right side in FIG. 9 and similar products to the product a are found to be the product b, the product e, and the product f attached with "∘" in the similarity determination.

Next, an example in which the distribution rate of the use parent point is calculated for each similar product to the product a is explained using FIG. 20. A user who has used both the base item and the similar item is selected as a distribution target user and the first method for calculating a distribution rate is used as a method for calculating a distribution rate. Then, the distribution rates of the member A, the member E, and the member F, who are distribution target users of the similar product b, are "0.33", respectively, the distribution rates of the member D, the member E, and the member F, who are distribution target users of the similar product e, are "0.33", respectively, and the distribution rates of the member C, the member D, the member E, and the member F, who are distribution target users of the similar product f, are "0.25", respectively. The distribution rates of all of the users, who are distribution targets, are greater than "0", and therefore, all the distribution target users are selected as distribution users.

Then, if the member B purchases the similar product b introduced as a similar item to the product a, the use point is given to the three members, that is, the member A, the member E, and the member F, if the member B purchases the similar product e introduced as a similar item to the product a, the use point is given to the three members, that is, the member D, the member E, and the member F, and if the member B purchases the similar product f introduced as a similar item to the product a, the use point is given to the four members, that is, the member C, the member D, the member E, and the member F. In this manner, a plurality of members can obtain points by one-time purchase. In the system according to the prior art in which a point is given to one member who has provided information referred to by a user who has purchased a product, only one member can obtain a point for one-time purchase. When distributing a point to a user who has used the base item as a distribution user, points are distributed to all the members who have purchased the product a, and therefore, even when the member B purchases any of the similar product b, the similar product e, and the similar product f, use points are given to the five members, that is, the member A, the member C, the member D, the member E, and the member F. In this manner, more members can obtain points.

Further, in the normal point system in which when the member B purchases all the similar product b, the similar product e, and the similar product f introduced as similar items to the product a (the number of times of purchase is three), a point is given to the user him/herself who has purchased the products, or in the point system in which a point is given to another user who has provided information to the user who has purchased the product, the number of times a point is given is three in total in both the systems. On the other hand, in the case of the present invention, as shown in the table in FIG. 20, a point is given ten times in total as a result. Further, if a point is given to the user him/herself who has purchased the products, a point is given 13 (10+3) times in total. As described above, according to the present invention, it is possible to increase the frequency with which a point is updated and the number of users to whom a point is given than before. When distributing a point to a user who has used the base item as a distribution user, a point is given 15 times in total as a result if the member B purchases all the similar product b, the similar product e, and the similar product f. Further, if a point is given to the user him/herself who has purchased the product, a point is given 18 (15+3) times in total. In this manner, it is possible to further increase the frequency with which a point is updated and the number of users to whom a point is given. Because of this, it is possible to continuously give a feeling of expectation that "my point may have increased today" or an unexpected feeling that "I am surprised that my point has increased suddenly at an unexpected timing", and therefore, it is possible to increase the frequency of accesses to the item providing server. Then, by making users more interested in the items and the item providing server, it is possible to promote the use of items.

Further, in the present embodiment, the users to whom a point is given are limited to the user of purchase and the distribution users, and therefore, it is possible to increase the number of points given to a user comparatively larger without distributing points to many users more than necessary. When giving a point only to a user who has used both the base item and the similar item, if the user is notified in advance of the mechanism of the point distribution, the user to whom a point has been given will know the reason (relationship of cause and effect) that "similar item information is formed because I have used a certain item before and a user who saw this has purchased the item, and therefore, my point has increased". That is, it is possible for the user to know that the user's past purchase activity (use activity) had indirectly led to the purchase activity of another user, and therefore, it is likely that satisfaction and reliability for the point system are obtained. Further, the possibility is raised that the user increases the number of items to use aiming at the induction of the purchase action of another user or the user tends to use items not used frequently by the user before, and therefore, it is possible to promote the use of items. Furthermore, a user who has used the item earlier obtains more points, and therefore, by notifying the user of the characteristic of such a point service, an incentive to "predict an item similar to the item I have purchased before and use it as soon as possible" is produced in each user, and the effect to promote the use of items is obtained.

The use point calculation section 111 of the information processing server device 1 calculates the use parent point and the calculated use parent point is distributed to the use point calculation target user, but, it may also be possible to give a fixed use point to the use point calculation target user without distributing the use parent point. At this time, it is sufficient to add the fixed use point in step S207 without performing processing in step S203 and step S206 in the use point calculation processing of the use point calculation section 111.

Figure 21:
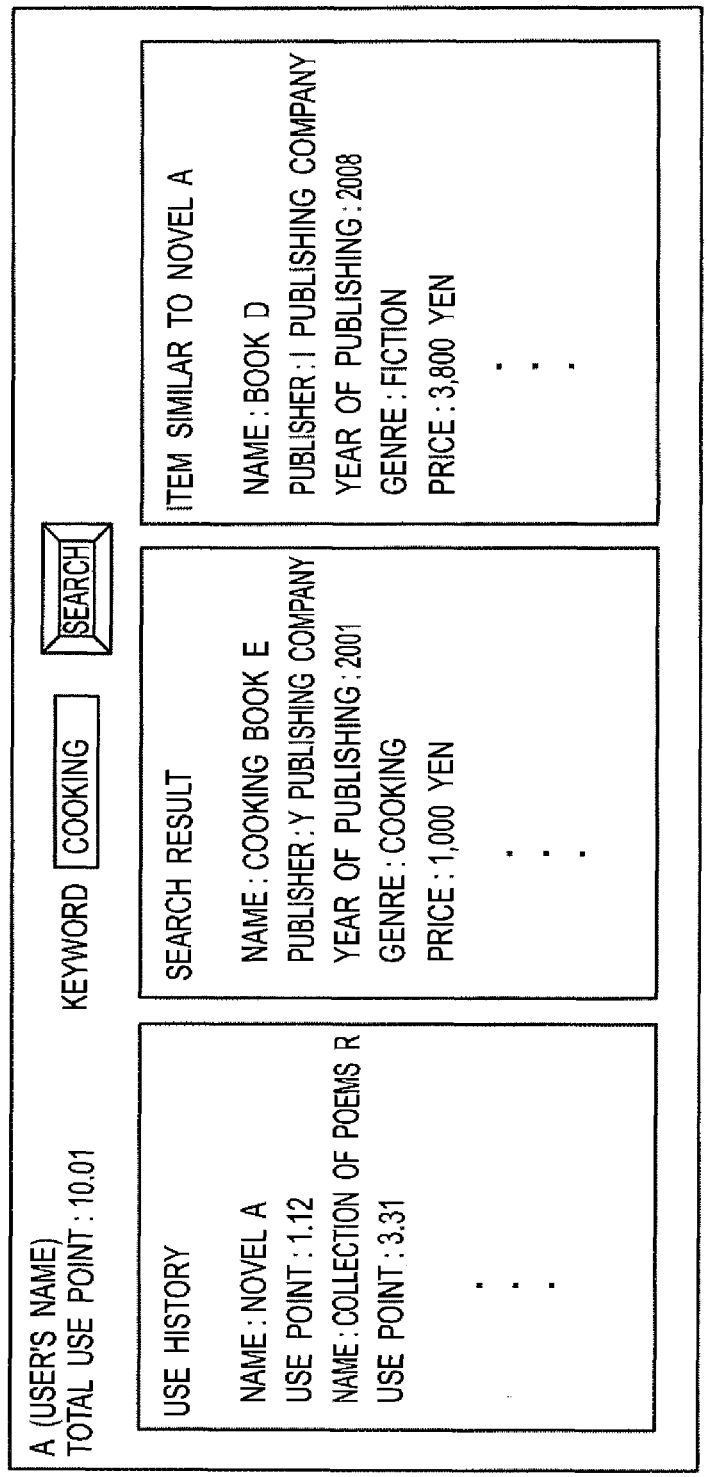
FIG. 21 is a diagram showing a display example of a user page displayed on the display section 34, in which a use point for each used item is added, in the first embodiment of the present invention.

When displaying a user page on the display section 34 of the terminal device 3, one number of the total acquired points of the use point is displayed for each user, but, it may also be possible to display the use point for each used item of a user who is using the terminal device 3 as shown in the display example of a user page in FIG. 21. In the display example in FIG. 21, the user's name of a user who is using the terminal device 3 and the total value of the obtained use points are displayed on the top-left side and the items the user who is using the terminal 3 has used before and the use point for each item are displayed on the bottom-left side.

At this time, it is necessary to store the use point for each user and each used item in the use point information storage section 135, and therefore, for example, as in the storage state in FIG. 22, the user identifier (user_id), the item identifier (item_id), and the use point (point) are stored in association with one another as use point information. When specifying the use point information to be updated in step S207 in the use point calculation processing in the use point calculation section 111, the user identifier included in the distribution information selected in step S205 and the used item identifier of the use history included in the use information acquired in step S201 are used. Further, when the use point information acquisition section 114 performs the use point information transmission processing, it is sufficient to acquire all the pieces of use point information corresponding to the user identifier included in the use point information acquisition request from the use point information storage section 135 and transmit all the acquired pieces of use point information to the item providing server device 2.

Figure 23:
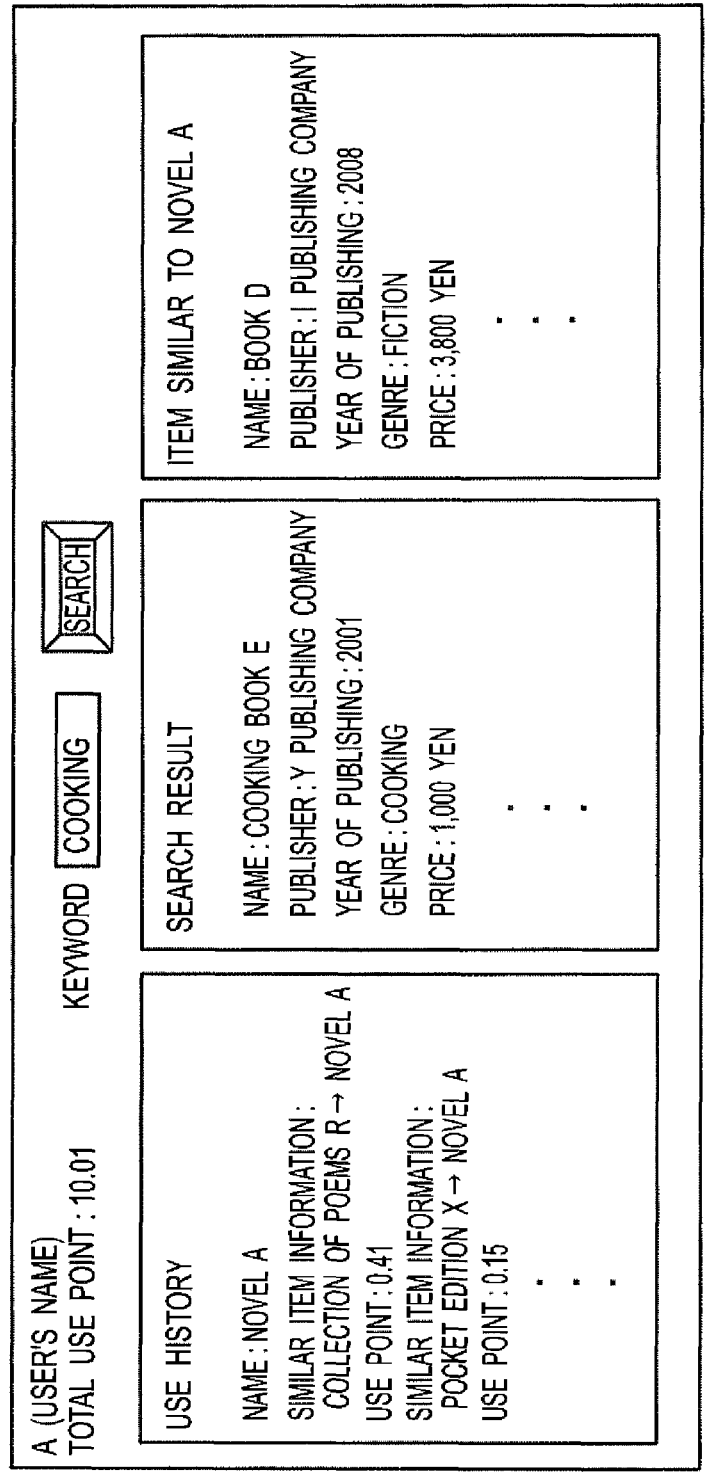
FIG. 23 is a diagram showing a display example of a user page displayed on the display section 34, in which a use point for each piece of similar item information is added, in the first embodiment of the present invention.

When displaying a user page on the display section 34 of the terminal device 3, as shown in the display example of a user page in FIG. 23, it may also be possible to display the use point for each piece of similar item information formed by only items used before by the user who is using the terminal device 3. In the display example in FIG. 23, the user's name of a user who is using the terminal device 3 and the total value of obtained use points are displayed on the top-left side and the items used before by the user who is using the terminal device 3 and the use point for each piece of similar item information are displayed on the bottom-left side.

At this time, it is necessary to store the use point for each user and each piece of similar item information in the use point information storage section 135, and therefore, for example, as in the storage state in FIG. 24, the user identifier (user_id), the base item identifier (base_item_id), the similar item identifier (sim_item_id), and the use point (point) are stored in association with one another as use point information. When specifying the use point information to be updated in step S207 in the use point calculation processing in the use point calculation section 111, the user identifier, the base item identifier, and the similar item identifier included in the distribution information selected in step S205 are used.

Figure 25:
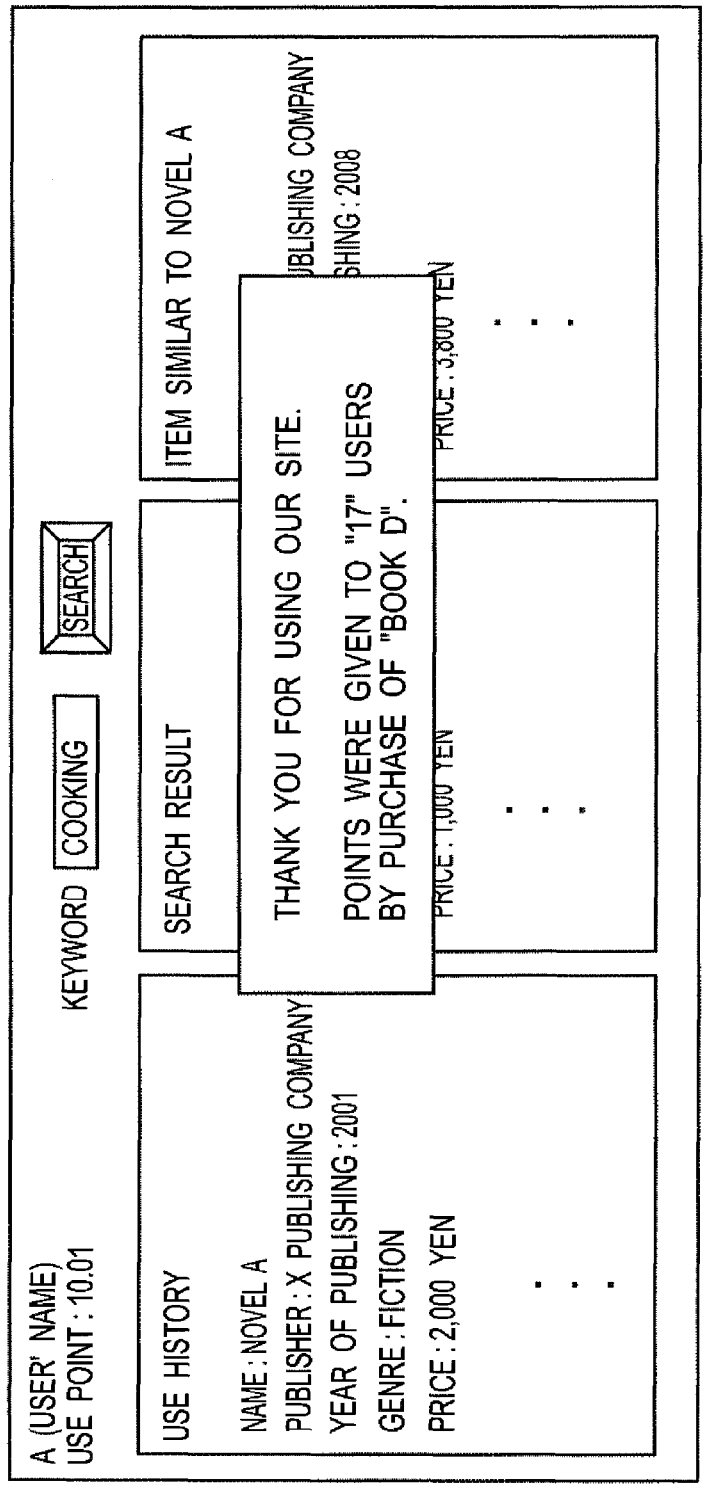
FIG. 25 is a diagram showing a display example of a user page displayed on the display section 34, in which information for notifying the number of users to whom a use point is given is added, in the first embodiment of the present invention.

It may also be possible to display information indicative of how many users are given a use point by the use of a similar item for users who have used the similar item. At this time, it is sufficient for the use point calculation section 111 to transmit the number of pieces of distribution information (number of users given a use point) acquired in step S204 to the terminal device 3 when the use point calculation processing is completed. Then, it is sufficient for the terminal device 3 to display the received information for notifying the number of users given a use point in the user page displayed on the display section 34, for example, as in the display example in the user page in FIG. 25.

The use point calculation section 111 performs the use point calculation processing each time receiving use information from the item providing server device 2, but, it may also be possible to perform the use point calculation processing at each predetermined timing. At this time, a use information storage section to store use information is provided in the information processing server storage section 13 and when receiving use information from the item providing server device 2, the use point calculation section 111 stores the received use information in the use information storage section rather than performing the use point calculation processing. By storing the received use information in the use information storage section, the use history included in the stored use information is regarded not to be processed yet. Then, it is sufficient for the use point calculation section 111 to acquire all the pieces of use information stored in the use information storage section at each predetermined timing, select one piece of use information sequentially from a set of acquired use information, perform the use point calculation processing, and delete all the pieces of use information stored in the use information storage section. In this case, all the use histories stored in the use history storage section 131, which are used in the use point calculation processing, are data used before (older than) the use history included in the use information.

As a predetermined timing, various timings can be used as in the similar item selection processing. For example, it may be possible to perform processing at predetermined time intervals, such as every 24 hours. It may also be possible to synchronize with the timing at which similar item selection processing is performed or not. It is possible to realize the use information storage section by storing use information in place of the use history in the use history storage section 131 rather than providing it. At this time, when receiving use information from the item providing server device 2, the use point calculation section 111 stores the received use information in the use history storage section 131 as a use history rather than performing the use point calculation processing. Then, it is sufficient for the use point calculation section 111 to acquire all the use histories, for which the use point calculation processing is not performed yet, of the use histories stored in the use history storage section 131 and perform processing from step S201 to step S208 of the use point calculation processing for each acquired use history. In order to determine whether or not the use point calculation processing is performed, that is, whether the use history is processed or not, it is sufficient to add a region to store information for determining whether the use history is processed or not in the use history storage section 131. Further, it is also possible to determine based on the use date by storing the date when the previous use point calculation processing was performed.

<Second Embodiment>

A second embodiment of the present invention is explained below in detail using the drawings. In the second embodiment of the present invention, the service provider determines the use parent point to be given during a fixed period of time and the use point is calculated based on the use parent point rather than calculating the use parent point for one similar item.

The configuration of the entire system in the second embodiment of the present invention is the same as that in the first embodiment of the present invention except in that an information processing server device 6 is used in place of the information processing server device 1. The item providing server device 2, the terminal device 3, and the network 4 (and the network 5) are the same as those in the first embodiment of the present invention.

Figure 26:
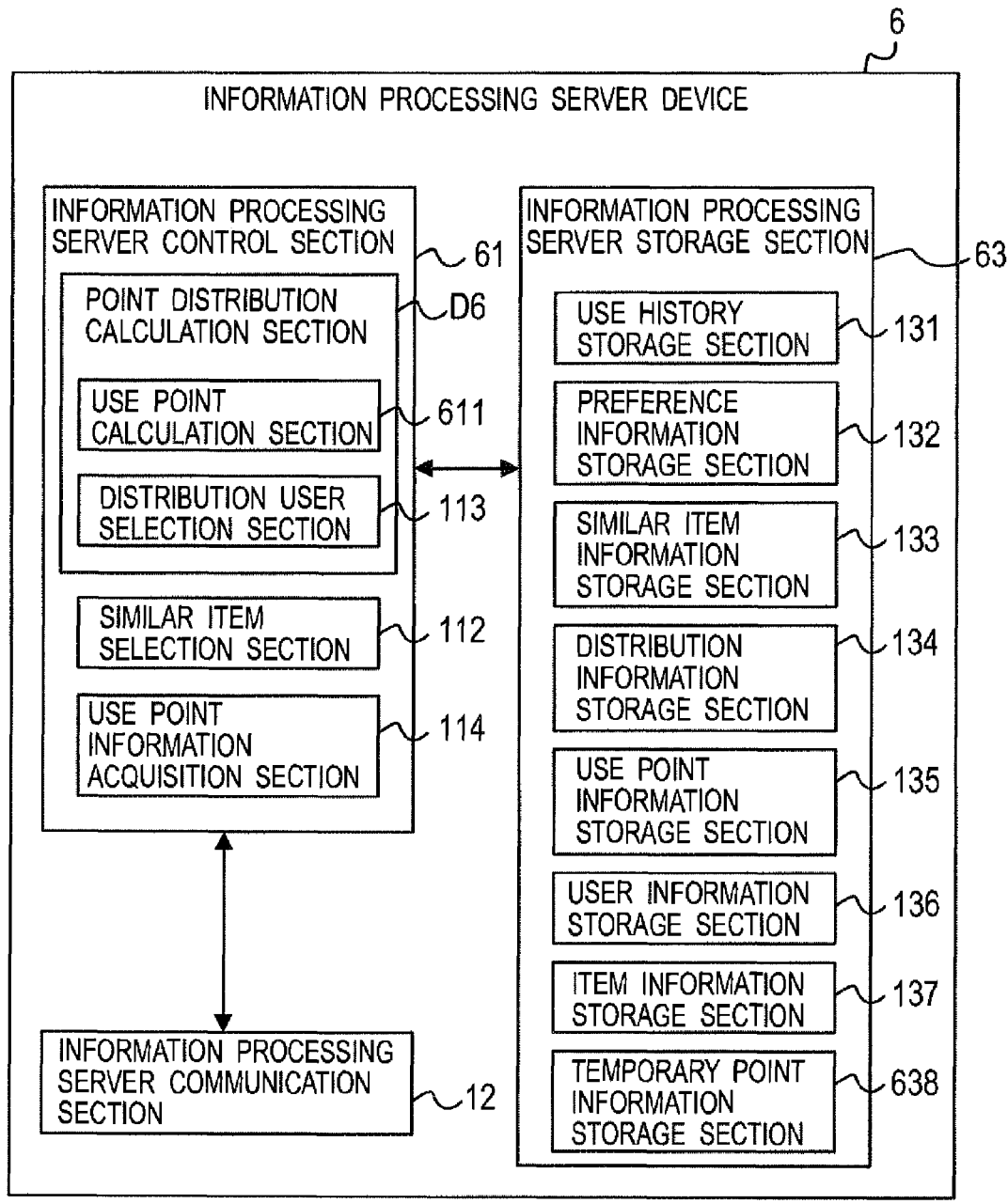
FIG. 26 is a configuration diagram of an information processing server device 6 in a second embodiment of the present invention.

The information processing server device 6 is a device to transmit a similar item to the item providing server device 2 and transmit a use point in response to a request from the item providing server device 2. It is also possible to implement the information processing server device 6 as software (program) processing using a computer comprising a CPU, a RAM, a ROM, a hard disk drive (HDD), a network interface, etc. FIG. 26 is a configuration diagram of the information processing server device 6 in the present embodiment. The information processing server device 6 in the present embodiment is configured by an information processing server control section 61, the information processing server communication section 12, and an information processing server storage section 63. The information processing server communication section 12 is the same as that in the first embodiment of the present invention.

Figures 27, 28:
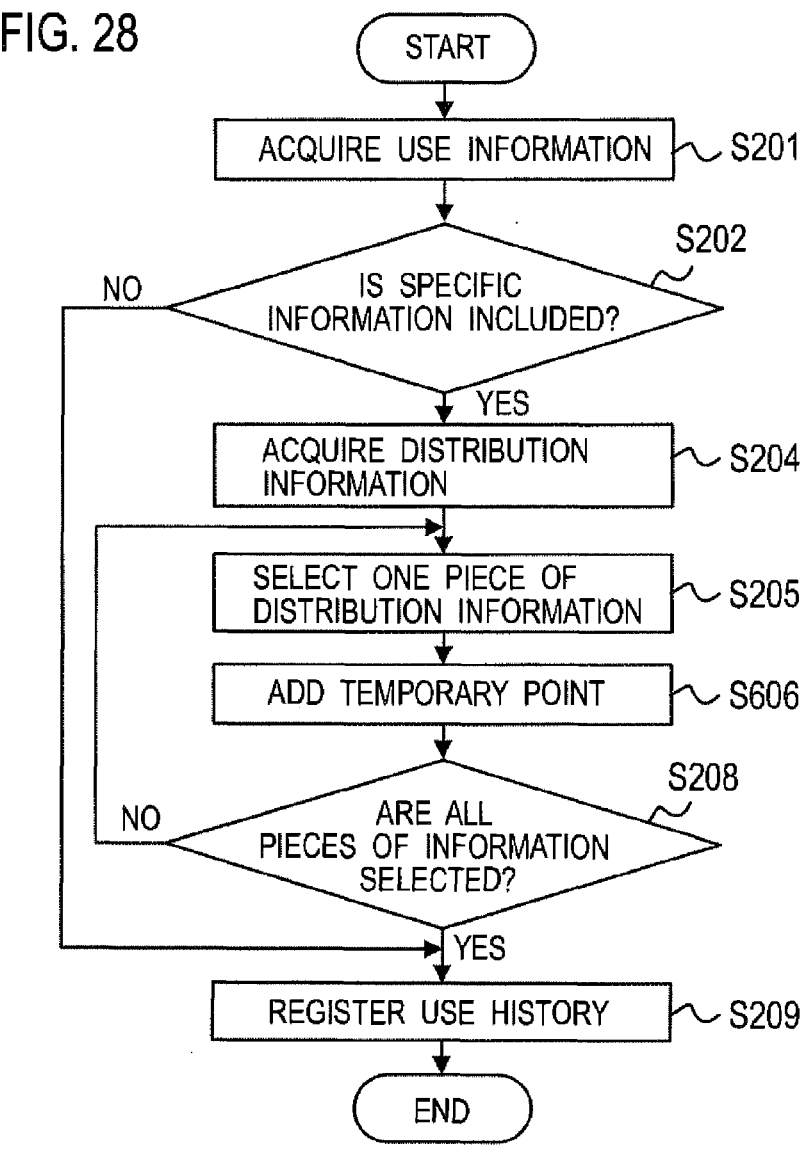
FIG. 27 is a diagram showing a storage state of a temporary point information storage section 638 in the second embodiment of the present invention.
FIG. 28 is a flowchart showing a procedure of temporary point calculation processing in the second embodiment of the present invention.

The information processing server storage section 63 stores various pieces of data using a storage device, such as HDD. The information processing server storage section 63 is configured by the use history storage section 131, the preference information storage section 132, the similar item information storage section 133, the distribution information storage section 134, the use point information storage section 135, the user information storage section 136, the item information storage section 137, and a temporary point information storage section 638. The use history storage section 131, the preference information storage section 132, the similar item information storage section 133, the distribution information storage section 134, the use point information storage section 135, the user information storage section 136, and the item information storage section 137 are the same as those in the first embodiment of the present invention. The temporary point information storage section 638 stores a plurality of pieces of temporary point information using a storage device, such as HDD. FIG. 27 is a diagram showing a storage state of the temporary point information storage section 638. The temporary point information is information associating user_id, which is a user identifier, and tmp_point, which is a temporary point of a user corresponding to the user identifier and stored in the form of a table as shown in FIG. 27. The initial value of the stored temporary point is "0".

The information processing server control section 61 totally controls each section configuring the information processing server device 6. The information processing server control section 61 is configured by a use point calculation section 611, the similar item selection section 112, the distribution user selection section 113, and the use point information acquisition section 114. The similar item selection section 112, the distribution user selection section 113, and the use point information acquisition section 114 are the same as those in the first embodiment of the present invention. The use point calculation section 611 and the distribution user selection section 113 cooperate and function as a point distribution calculation section D6. When receiving use information from the item providing server device 2, the use point calculation section 611 performs temporary point calculation processing. Further, the use point calculation section 611 performs use parent point distribution processing at fixed time intervals. The fixed time intervals may be, for example, every other day, every two weeks, each time after a fixed period of time elapses, etc. It may also be possible for the service provider to arbitrarily change the time intervals.

The procedure of the temporary point calculation processing is explained using the flowchart in FIG. 28. The procedure of the temporary point processing is the procedure of use point calculation processing in the first embodiment of the present invention, in which the processing in step S203 is deleted and the processing from step S206 to step S207 is replaced with processing in step S606, and therefore, only the replaced processing is explained.

In step S606, the use point calculation section 611 specifies temporary point information corresponding to user_id included in the distribution information selected in step S205 in the temporary point information storage section 638 and adds rate included in the distribution information selected in step S205 to tmp_point of the specified temporary point information. Next, the procedure proceeds to step S208. The above is the explanation of the temporary point calculation processing.

Figure 29:
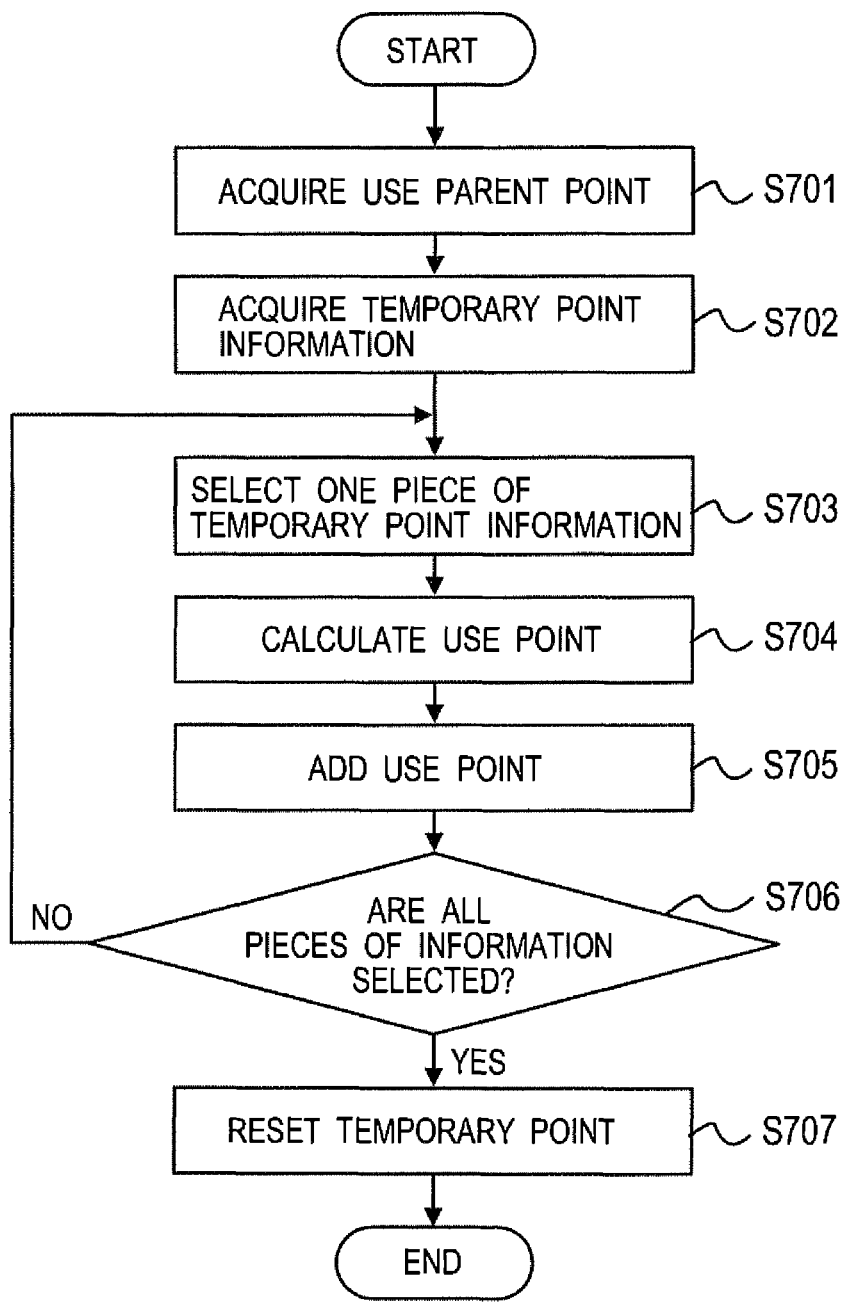
FIG. 29 is a flowchart showing a procedure of use parent point distribution processing in the second embodiment of the present invention.

Next, the procedure of use parent point distribution processing performed at fixed time intervals is explained using the flowchart in FIG. 29. First, the use point calculation section 611 acquires the use parent point given during a fixed period of time (step S701). A method for acquiring a use parent point may be a method in which a value is set in advance by the service provider and the set value is acquired or a method in which a section to input the use parent point, such as a keyboard, not shown schematically, is prepared and each time use parent point distribution processing is performed, the service provider inputs the use parent point and thereby the use parent point is acquired.

Next, the use point calculation section 611 acquires all the pieces of temporary point information in which the value of tmp_point exceeds "0" from the temporary information storage section 638 in order to extract distribution target users of the use parent point (step S702). Next, the use point calculation section 611 selects one piece of the temporary point information acquired in step S702, for example, in the order of acquisition (step S703). Next, the use point calculation section 611 calculates a change value to change a use point for user_id included in the temporary point information selected in step S703 (step S704). The change value is calculated by distributing the use parent point acquired in step S701 according to a proportion of tmp_point included in the temporary point information selected in step S703 to the sum total of tmp_points included in all the pieces of temporary point information acquired in step S702. If it is assumed that a set of users to whom a use parent point vp is distributed is Ut, tmp_point of a user ub (ub∈Ut) for whom a use point is calculated is t (ub), and tmp_point of a user u (u∈Ut) is t (u), a use point pt (ub) of the user ub is calculated by formula (4).

$$pt(ub) = \frac{t(ub)}{\sum_{u \in Ut} t(u)} \times vp \quad \text{Formula (4)}$$

Next, the use point calculation section 611 specifies use point information corresponding to user_id included in the temporary point information selected in step S703 in the use point information storage section 135 and adds the change value calculated in step S704 to point (original use point) of the specified use point information (step S705). Next, the use point calculation section 611 determines whether or not all the pieces of temporary point information are selected in step S703 (step S706). When all are selected, the procedure proceeds to step S707 and when those not selected yet remain, to step S703. In step S707, the use point calculation section 611 replaces all the values of tmp_points of all the pieces of temporary point information with "0" in the temporary point information storage section 638 and the processing from step S701 to S707 is completed.

In step S705, it may also be possible to update the use point using multiplication processing of the original use point and a coefficient (change value) in place of addition processing as in the first embodiment of the present invention. At this time, it is assumed that a set of all the users to whom a parent increase rate sr is distributed is Ut, tmp_point of a user ub (ub∈Ut) for whom a use point is calculated is t (ub), and tmp_point of a user u (u∈Ut) is t (u) and from formula (5), a coefficient m (ub) is calculated for the user ub.

$$m(ub) = 1 + \frac{t(ub)}{\sum_{u \in Ut} t(u)} \times sr \quad \text{Formula (5)}$$

The above is the explanation of the use parent point distribution processing performed at fixed time intervals.

According to the method of giving a use point in the present embodiment, it is possible for the service provider to arbitrarily control the sum total of use points to be given during a fixed period of time, and therefore, it is possible to easily give a use point according to the budget relating to the point service of an entrepreneur.

<Third Embodiment>

A third embodiment of the present invention is explained below in detail using the drawings. In the third embodiment of the present invention, the distribution user selection processing at each predetermined timing is not performed and the distribution rate is calculated each time the use point calculation processing is performed. The configuration of the entire system in the third embodiment of the present invention is the same as that in the first embodiment of the present invention except in that an information processing server device 7 is used in place of the information processing server device 1. The item providing server device 2, the terminal device 3, and the network 4 (and the network 5) are the same as those in the first embodiment of the present invention.

Figure 30:
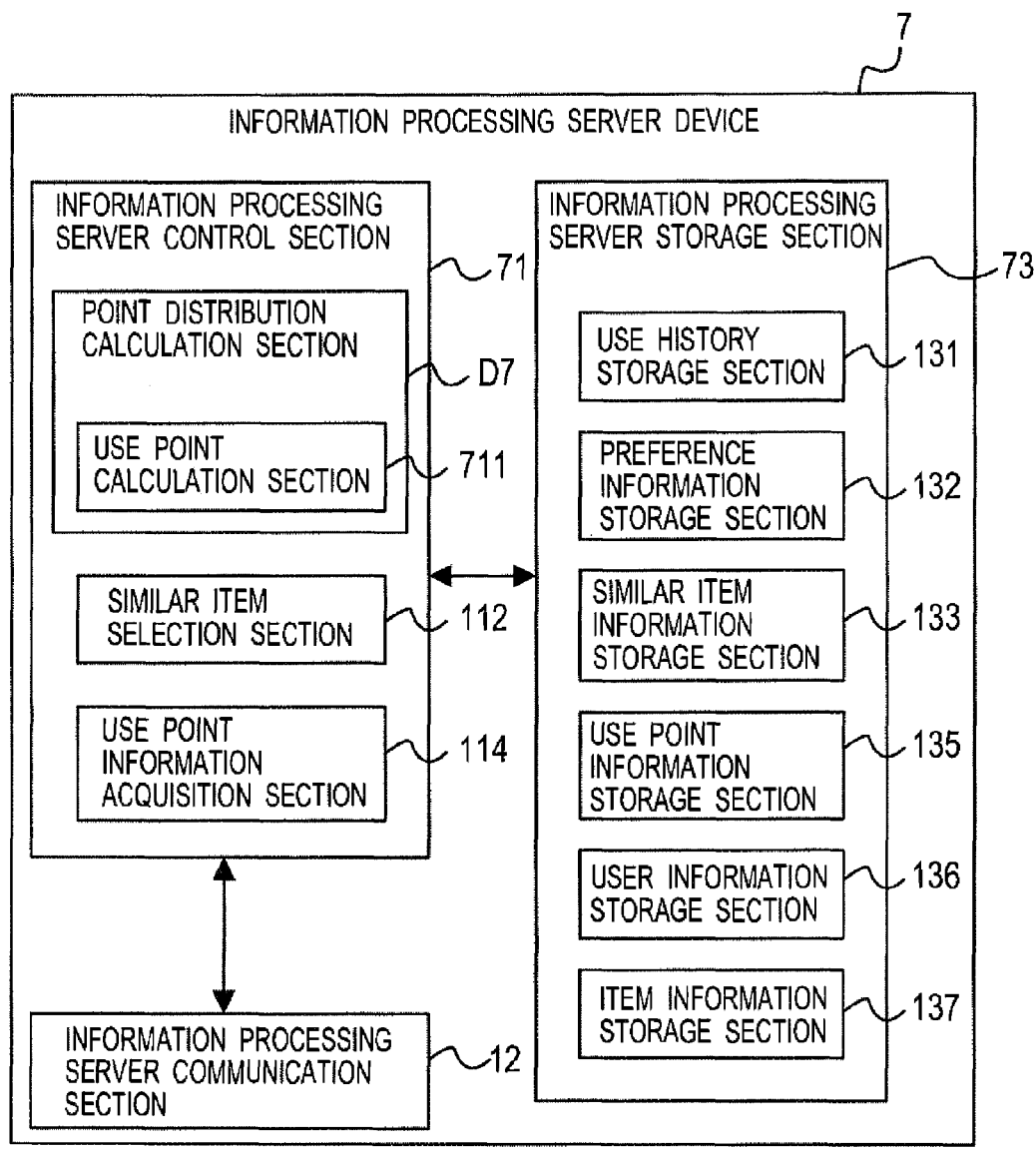
FIG. 30 is a configuration diagram of an information processing server device 7 in a third embodiment of the present invention.

The information processing server device 7 is a device to transmit a similar item to the item providing server device 2 and transmit a use point in response to a request from the item providing server device 2. It is also possible to implement the information processing server device 7 as software (program) processing using a computer comprising a CPU, a RAM, a ROM, a hard disk drive (HDD), a network interface, etc. FIG. 30 is a configuration diagram of the information processing server device 7 in the present embodiment. The information processing server device 7 in the present embodiment is configured by an information processing server control section 71, the information processing server communication section 12, and an information processing server storage section 73. The information processing server communication section 12 is the same as that in the first embodiment of the present invention.

The information processing server storage section 73 stores various pieces of data using a storage device, such as HDD. The information processing server storage section 73 is configured by the use history storage section 131, the preference information storage section 132, the similar item information storage section 133, the use point information storage section 135, the user information storage section 136, and the item information storage section 137. The use history storage section 131, the preference information storage section 132, the similar item information storage section 133, the use point information storage section 135, the user information storage section 136, and the item information storage section 137 are the same as those in the first embodiment of the present invention. The information processing server control section 71 totally controls each section configuring the information processing server device 7. The information processing server control section 71 is configured by a use point calculation section 711, the similar item selection section 112, and the use point information acquisition section 114. The similar item selection section 112 and the use point information acquisition section 114 are the same as those in the first embodiment of the present invention. In the present embodiment, the use point calculation section 711 alone functions as a point distribution calculation section D7.

Figure 31:
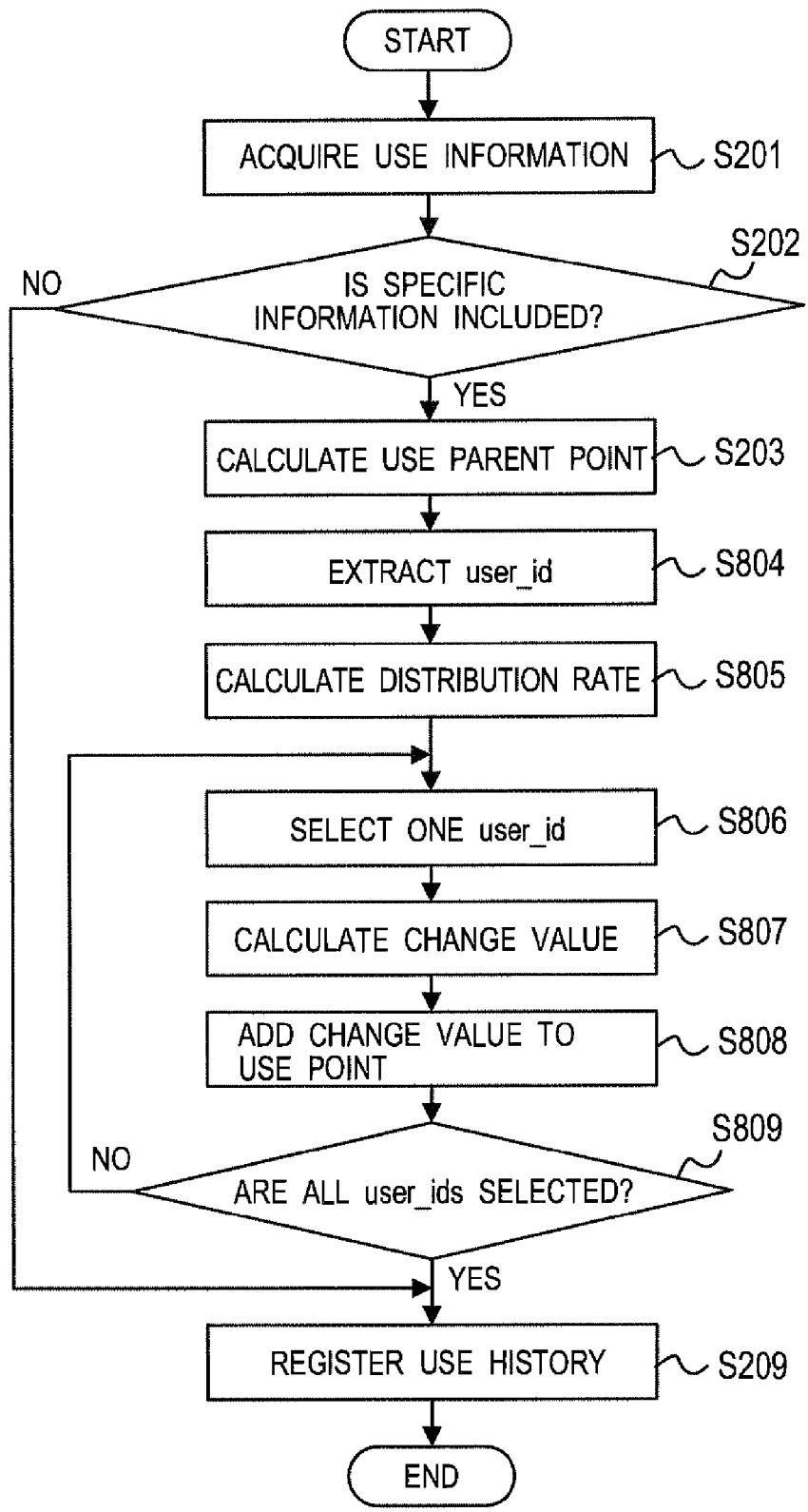
FIG. 31 is a flowchart showing a procedure of use point calculation processing in the third embodiment of the present invention.

When receiving use information from the item providing server device 2, the use point calculation section 711 performs use point calculation processing. The use point calculation processing in the present embodiment is explained using the flowchart in FIG. 31. The procedure of the use point processing in the present embodiment is the procedure of the use point calculation processing in the first embodiment of the present invention, in which the processing from step S204 to step S208 is replaced with the processing from step S804 to step S809, and therefore, only the replaced processing is explained.

In step S804, the use point calculation section 711 extracts user_id of the user (distribution target user) who has used both the item corresponding to the base item identifier corresponding to the specific information included in the use information acquired in step S201 and the item corresponding to the used item identifier of the use history from the use history storage section 131. In order to extract user_id of the distribution target user, first, the use history (base item use history) having item_id that agrees with the base item identifier corresponding to the specific information included in the use information acquired in step S201 is specified. Next, the use history (similar item use history) having item_id that agrees with the used item identifier of the use history included in the use information acquired in step S201 is specified. Next, all user_ids present both in the specified base item use history and in the specified similar item use history are extracted. In the present embodiment also, it is possible to select a user who has used the base item as a distribution target user as in the first embodiment of the present invention. Further, it may also be possible to select a user who has used only the similar item as a distribution target user or select a user who has used one of the base item and the similar item as a distribution target user.

Next, the use point calculation section 711 calculates the distribution rate for each distribution target user (step S805). As a method for calculating a distribution rate, it is possible to use the following calculation method in addition to the two kinds of methods for calculating a distribution rate in the first embodiment of the present invention. A third method for calculating a distribution rate is a method that uses the degree of similarity between two users. Specifically, the third method for calculating a distribution rate is a method in which the degree of similarity between a user (base user) corresponding to the use information acquired in step S201 and a distribution target user is calculated and the distribution rate is calculated according to the degree of similarity. If it is assumed that a set of distribution target users is U (ib, is) and the degree of similarity between a base user ub and a user u (U∈(ib, is)) is sim (u, ub), a distribution rate rate (u, ub, ib, is) of the user u is expressed by formula (6). In the third method for calculating a distribution rate, the distribution rate is higher for a distribution target user of which the degree of similarity between two users is higher.

$$\text{rate}(u, ub, ib, is) = \frac{sim(u, ub)}{\sum_{u' \in U(ib, is)} sim(u', ub)} \quad \text{Formula (6)}$$

As a method for calculating a degree of similarity between two users, it may be possible to use a Jaccard coefficient between a set of items the base user has used and a set of items a distribution target user has used. It may also be possible to use a cosine distance between two users calculated using the preference value of the user for the item as the degree of similarity. Further, it may also be possible to use a Pearson's product-moment correlation coefficient, which is a method for calculating a degree of similarity between users in the cooperative filtering scheme on the assumption that the preference value of an item both the base user and the distribution target user have used is the evaluation given to the item by the users.

Further, as the degree of similarity between two users, it is also possible to use a degree of adaptation. The degree of adaptation is the number of the same attribute values between two pieces of user attribute information and for example, when attributes included in attribute information is the sex, age, and area and the attribute values of one piece of user attribute information are "male", "24", and "Tokyo" and the other attribute values are "female", "24", and "Tokyo", the number of the same attributes is two, and therefore, the degree of adaptation is determined to be "2". It may also be possible for the service provider to arbitrarily determine the condition of the same attribute value for each attribute and for example, as to the age, it may also be possible to determine that the attribute value is the same when a difference between attribute values is less than "5" or it may also be possible to convert the attribute values from "20" to "29" into "twenties" and "30" to "39" into "thirties" and determine whether or not the attribute values are the same using the converted values. As to the other attributes, such as "area", it may be possible to perform the same processing. Further, it may also be possible to calculate the degree of adaptation by weighting attributes differently from one another. For example, when the age is the same, it may also be possible to calculate the degree of adaptation as twice the degree of adaptation when "area" is the same. It is, of course, possible to use other methods as long as they are methods for calculating a value indicative of the similarity between two users.

Next, the use point calculation section 711 selects one of user_ids extracted in step S804, for example, in the order of extraction (step S806). Next, the use point calculation section 711 selects the distribution rate corresponding to user_id selected in step S806 from among the distribution rates calculated in step S805 and calculates a change value to change a use point by multiplying the use parent point calculated in step S203 and the selected distribution rate (step S807). Next, the use point calculation section 711 specifies the use point information corresponding to user_id selected in step S806 in the use point information storage section 135 and adds the change value calculated in step S807 to point (original use point) of the specified use point information (step S808).

Next, the use point calculation section 711 determines whether or not all user_ids are selected in step S806 (step S809). When all are selected, the procedure proceeds to step S209 and when those not selected yet remain, to step S806. The above is the explanation of the procedure of use point calculation processing in the present embodiment.

According to the method for giving a use point in the present embodiment, a distribution target user is selected each time the use point calculation processing is performed, and therefore, for example, when selecting a user who has used the base item as a distribution target user, it is possible to distribute the use parent point also to a user who has used the base item after the predetermined timing at which the distribution user selection processing was performed in the first embodiment of the present invention. Because of this, it is possible to distribute a point to more users.

It is possible to use the third method for calculating a distribution rate in the third embodiment of the present invention in the other embodiments. At this time, it is necessary to prepare in advance distribution information for each base user in the third embodiment of the present invention. Because of this, it is necessary to store information associating the user identifier (base_user_id) of the base user, the base item identifier (base_item_id), the similar item identifier (sim_item_id), the user identifier (user_id) of the distribution user, and the distribution rate (rate) of the use parent point as distribution information in the distribution information storage section 134 as shown in FIG. 32.

Further, it is necessary to calculate the degree of similarity between all the pairs of users in advance before performing the distribution user selection processing and perform the distribution user selection processing for each user. That is, it is necessary to select one as a user identifier of a base user from among all the user identifiers and repeatedly perform the distribution user selection processing for each selected user identifier of the base user. Then, in step S505, it is necessary to store distribution information associating the user identifier (base_user_id) of the selected base user, base_item_id and sim_item_id included in the similar item information selected in step S502, user_id of the distribution target user, and the distribution rate (rate) of the distribution user calculated in step S504 in the distribution information storage section 134 for each distribution user.

Furthermore, in step S204 of the use point calculation processing, it is necessary to acquire all the pieces of distribution information in which the combination of the user identifier of the use history included in the use information acquired in step S201, the base item identifier extracted from the specific information, and the used item identifier of the use history agrees with the combination of base_user_id, base_item_id, and sim_item_id.

By satisfying the above conditions, also in the embodiments other than the third embodiment of the present invention, it is possible to use the third method for calculating a distribution rate.

<Fourth Embodiment>

Figure 33:
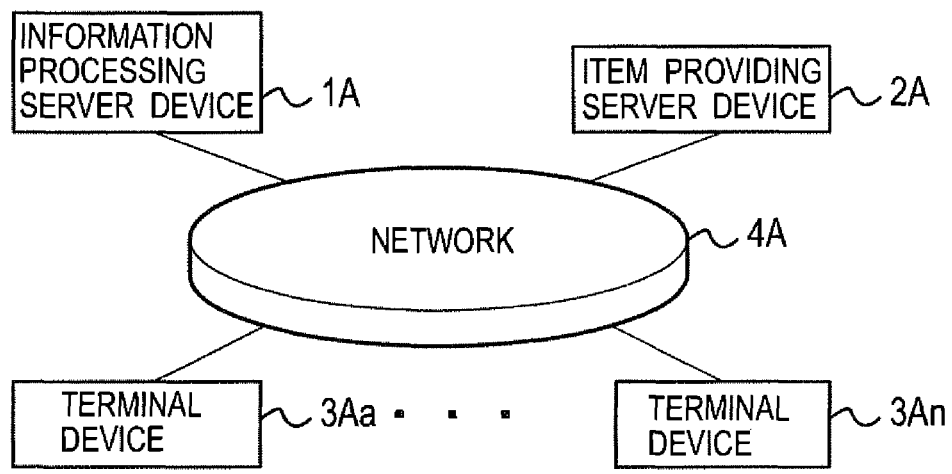
FIG. 33 is a first configuration diagram of an entire system in a fourth embodiment of the present invention.

An embodiment of the present invention is explained below in detail using the drawings. FIG. 33 is a configuration diagram of the entire system in a fourth embodiment of the present invention. In the system in the present embodiment, an information processing server device 1A, an item providing server device 2A, and one or more terminal devices 3A (3Aa to 3An) are connected via a network 4A. In each embodiment, it may also be possible for only the information processing server device 1A and information processing server devices 6A, 7A to function as an information processing device or for the information processing server devices 1A, 6A, 7A to function as an information processing device by cooperating with the item providing server device 2A and the terminal device.

Figure 34:
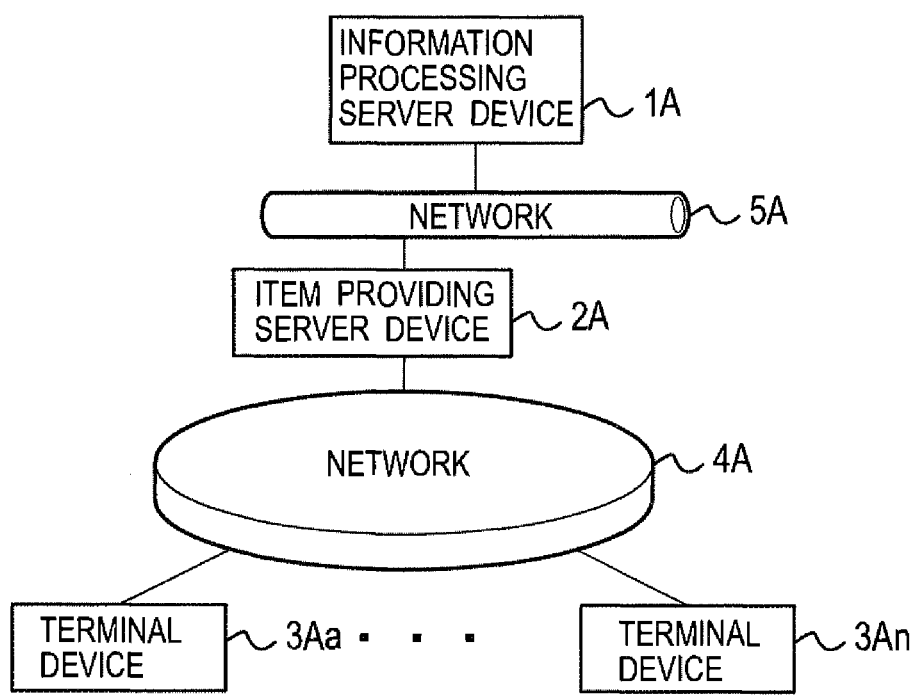
FIG. 34 is a second configuration diagram of the entire system in the fourth embodiment of the present invention.

Further, as shown in FIG. 34, it may also be possible to configure the entire system using two networks. In FIG. 34, the information processing server device 1A and the item providing server device 2A are connected via a network 5A and the item providing server device 2A and the terminal device 3A (3Aa to 3An) are connected via the network 4A. The network 5 is LAN (Local Area Network) and it is designed so that the information processing server device 1A and the terminal device 3A (3Aa to 3An) cannot be connected directly. In the present embodiment, unless it is specified in particular, a case where the configuration of the entire system is such that as shown in FIG. 33 is explained. In the present embodiment, a case is explained where the information processing server device 1A and the item providing server device 2A are regarded as separate devices, however, it may also be possible to combine the two functions to realize a single device.

The network 4A is, for example, a network, such as the Internet, and intermediates between the information processing server device 1A, the item providing server device 2A, and the terminal device 3A when information is exchanged therebetween.

Figures 35, 36:
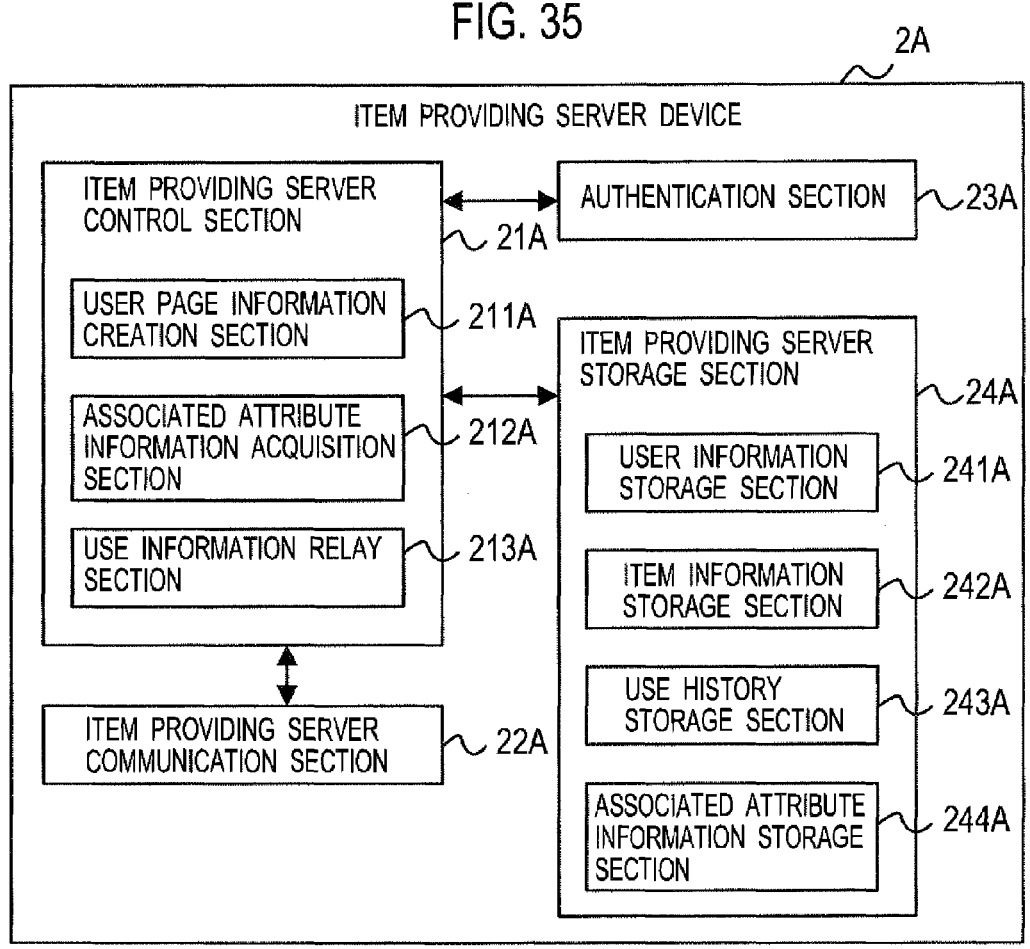
FIG. 35 is a configuration diagram of an item providing server device 2A in the fourth embodiment of the present invention.
FIG. 36 is a diagram showing a storage state of a user information storage section 241A in the fourth embodiment of the present invention.

The item providing server device 2A is a device to provide an item in response to a request from the terminal device 3A. Here, items mean digital contents, such as text, voice, music, and video, and various goods, and further, information etc. about financial product, real estate, person. That is, the item in the present embodiment may be tangible or intangible and may be charged or free. It is also possible to implement the item providing server device 2A as software (program) processing using a computer comprising a CPU, a RAM, a ROM, a hard disk drive (HDD), a network interface, etc. FIG. 35 is a configuration diagram of the item providing server device 2A in the present embodiment. The item providing server device 2A in the present embodiment is configured by an item providing server control section 21A, an item providing server communication section 22A, an authentication section 23A, and an item providing server storage section 24A.

The item providing server communication section 22A is a section to communicate with the information processing server device 1A and the terminal device 3A via the network 4A.

The authentication section 23A stores user specifying information associating a user identifier for uniquely identifying a user who uses the terminal device 3A or a terminal identifier for uniquely identifying the terminal device 3A and a password and according to the necessity, the authentication section 23A performs authentication using user specifying information received from the terminal device 3A and stored user specifying information. In the present embodiment, a case is explained as an example, where a user identifier is used, but, a case where a terminal identifier is used is the same. As a general term including both a user identifier and a terminal identifier, a use subject identifier is used.

The item providing server storage section 24A stores various pieces of data using a storage device, such as HDD. The item providing server storage section 24A is configured by a user information storage section 241A, an item information storage section 242A, a use history storage section 243A, and an associated attribute information storage section 244A.

The user information storage section 241A stores a plurality of pieces of user information. FIG. 36 is a diagram showing a storage state of the user information storage section 241. The user information is information associating user_id, which is a user identifier for uniquely identifying a user who uses the terminal device 3A, and user_info, which is user attribute information, and stored in the form of a table as shown in FIG. 36. The user attribute information is information about a user's name, age, sex, address (area), hobby, date when the user became a member (year/month, day, date, etc.), mail address, telephone number, etc.

The item information storage section 242A stores a plurality of pieces of item identification information, attribute type information, attribute value information, and attribute correspondence information (item attribute information), respectively. FIG. 37 (FIG. 37(a) to FIG. 37(d)) is a diagram showing a storage state of the item information storage section 242A. The item identification information is information associating item_id, which is an item identifier for uniquely identifying an item, and item_name, which is the name of an item, and stored in the form of a table as shown in FIG. 37(a).

The attribute type information is information associating type_id, which is an attribute type identifier for uniquely identifying the type of an item attribute, and type_name, which is the name of the type of an item attribute, and stored in the form of a table as shown in FIG. 37(b). The type of an item attribute corresponds to the category of the item attribute, such as "creator", "genre", "year of creation", "price", and "condition of a user suitable for use" of an item.

The attribute value information is information associating type_id, which is an attribute type identifier, attr_id, which is an attribute value identifier for uniquely identifying an attribute value corresponding to type_id, and attr_name, which is an attribute value and stored in the form of a table as shown in FIG. 37(c). For example, when an item relates to "book" and type_id is an identifier corresponding to "genre", the attribute value is, for example, "fiction", "love", "cooking", etc.

The attribute correspondence information is information associating attributes corresponding to an item, that is, information associating item_id, which is an item identifier, type_id, which is an attribute type identifier, and attr_id, which is an attribute value identifier, and stored in the form of a table as shown in FIG. 37(b).

By using the tables in FIG. 37(a) to FIG. 37(d), it is possible to manage a plurality of attributes an item has for each type of attribute. The item identification information corresponding to an item and the attribute type information and the attribute value information specified by the attribute correspondence information corresponding to the item are together referred to as item attribute information. Further, a combination (item attribute identifier) of type_id and attr_id and a combination of type_name and attr_name are referred to as an item attribute.

The use history storage section 243A stores a plurality of use histories. The use history is a use history about an item of a user received from the terminal device 3A and includes at least a user identifier, an item identifier, and the date when the item was used (use date). FIG. 38 (FIG. 38(a) to FIG. 38(d)) is a diagram showing a storage state of the use history storage section 243A. Hereinafter, four kinds of storage forms of a use history are explained using FIG. 38.

In a first storage form of a use history, a user identifier (user_id), an item identifier (item_id), and a use date (date) included in a use history are associated and stored in the form of a table as shown in FIG. 38(a). A second storage form of a use history is used when the number of times a user uses an item is included in a use history and a user identifier (user_id), an item identifier (item_id), a use date (date), and the number of times of use (count) included in a use history are associated and stored in the form of a table as shown in FIG. 38(b).

A third storage form of a use history is used when an evaluation value (a degree of liking represented by a numerical value, such as "1: having a great dislike for", "2: rather averse to", "3: moderate", "4: rather fond of", and "5: having a great liking for"), which is evaluation for an item performed by a user and represented by a numerical value, is included in a use history and a user identifier (user_id), an item identifier (item_id), a use date (date), and an evaluation value (value) included in a use history are associated and stored in the form of a table as shown in FIG. 38(c).

A fourth storage form of a use history is used when an amount of payment a user paid for an item is included and a user identifier (user_id), an item identifier (item_id), a use date (date), and an amount of payment (amount) included in a use history are associated and stored in the form of a table as shown in FIG. 38(d). The above is the explanation of the storage forms of a use history. Besides the above, it may also be possible to modify the storage form in accordance with the configuration of a use history so that all the pieces of information included in the use history can be stored. It is premised that a use history received from the terminal device 3A includes a use date, but, if no use date is included, it is sufficient to store the date when the use history is stored in the use history storage section 243A as date in place of the use date. Alternatively, it may also be possible not to store date and in this case also, data newly added is added to the last of the table (to the lowermost row) without fail, and therefore, the row data located upper in the table is older and the row data located lower is more recent. Because of this, it is possible to easily determine which data is older by investigating the positional relationship between two rows.

Figures 39, 40:
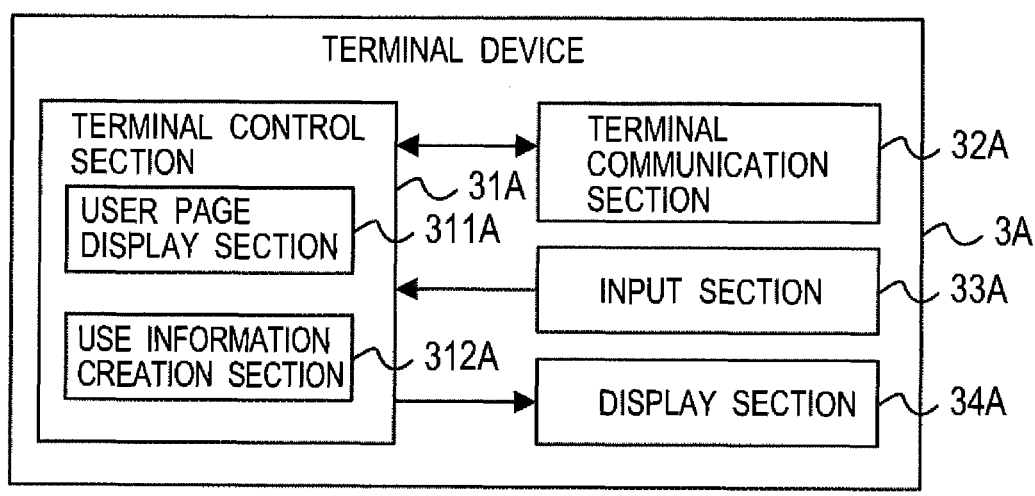
FIG. 39 is a diagram showing a storage state of an associated attribute information storage section 244A in the fourth embodiment of the present invention.
FIG. 40 is a configuration diagram of a terminal device 3A in the fourth embodiment of the present invention.

The associated attribute information storage section 244A stores a plurality of pieces of associated attribute information for each item. FIG. 39 is a diagram showing a storage state of the associated attribute information storage section 244A. The associated attribute information is information associating a combination (associated item attribute identifier) of an item identifier of an item that serves as a base (base item) (base item identifier (item_id)), an attribute type identifier (type_id) corresponding to an item attribute (associated attribute) in close association with the base item, and an attribute value identifier (attr_id) and a value, which is the association between a base item and an associated attribute represented by a numerical value (degree of association (value)) and stored in the form of a table as shown in FIG. 38.

The item providing server control section 21A totally controls each section configuring the item providing server device 2A. The item providing server control section 21A is configured by a user page information creation section 211A, an associated attribute information acquisition section 212A, and a use information relay section 213A. The user page information creation section 211A performs user page information transmission processing, search result transmission processing, associated attribute information transmission processing, and associated attribute correspondence item attribute information transmission processing according to data received from the terminal device 3A.

The user page information transmission processing is processing to create user page information for a user and transmit the created user page information to the terminal device 3A the user is using when receiving a user page information acquisition request from the terminal device 3A. The user page information acquisition request is information about a request for acquisition of user page information and includes at least a user identifier of the user. The user page information is information necessary to cause the terminal device 3A to display a search screen, a browse screen of a use history, a browse operation screen of associated attribute information, and a check screen of a use point. For example, it may also be possible to create user page information using the HTML (Hyper Text Markup Language) format or use another data format.

Here, the use point is a numerical value given to a certain user having some relationship with associated attribute information when another user uses an item corresponding to the associated attribute information. Alternatively, it may also be possible to give a use point to the user him/herself who has used an item corresponding to the associated attribute information. Further, it may also be possible for the side providing services (service provider) by the item providing server device 2A to give a user who uses the service a special favor in accordance with the use point. For example, in the case of a shopping site, it may also be possible to enable a user to use the use point as part of payment at the time of purchase of a product or to discount the price according to the use point. A certain user having some relationship with the associated attribute information is a user who uses a base item corresponding to the associated attribute information or a user who uses both an item having an associated attribute and a base item corresponding to the associated attribute information.

It is possible to acquire information (use point information) about the use point of a user necessary to create user page information from the information processing server device 1A. It is also possible to acquire the use history of a user necessary to create user page information from the use history storage section 244A.

The search result transmission processing is processing to transmit item information that satisfies the received search condition as a search result to the terminal device 3A when receiving the search condition from the terminal device 3A.

The associated attribute information transmission processing is processing to transmit associated attribute information corresponding to a received associated attribute information acquisition request to the terminal device 3A when receiving the associated attribute information acquisition request from the terminal device 3A. Specifically, an item identifier included in the associated attribute information acquisition request is collated with item_id and all the pieces of associated attribute information that match are extracted from the associated attribute information storage section 244A and all the extracted pieces of associated attribute information are transmitted to the terminal device 3A. Here, the associated attribute information acquisition request is a request for acquisition of associated attribute information and includes at least an item identifier.

The associated attribute correspondence item attribute information transmission processing is processing to transmit item attribute information corresponding to a received associated attribute correspondence item attribute information acquisition request to the terminal device 3A when receiving the associated attribute correspondence item attribute information acquisition request from the terminal device 3A. Specifically, a first item type identifier and an attribute value identifier of associated attribute information included in the associated attribute correspondence item attribute information acquisition request is collated with attribute correspondence information and all the item identifiers of attribute correspondence information that match are extracted from the item information storage section 242A. Next, all the pieces of item attribute information corresponding to the extracted item identifiers are extracted and all the extracted pieces of the item attribute information are transmitted to the terminal device 3A. Here, the associated attribute correspondence item attribute information acquisition request is a request for acquisition of item attribute information corresponding to associated attribute information and includes at least associated attribute information.

When receiving associated attribute information from the information processing server device 1A, the associated attribute information acquisition section 212A stores the received associated attribute information in the associated attribute information storage section 244A after deleting all the pieces of the stored data.

When receiving use information from the terminal device 3A, the use information relay section 213A performs use information relay processing. The use information includes at least the use history before use point calculation processing is performed. When relating to the use of an item corresponding to an associated attribute, the use information includes specific information in addition to the use history. The specific information is information for specifying browsed associated attribute information and for example, includes a base item identifier included in the browsed associated attribute information, the browsed associated attribute information itself, and a row number indicative of the storage position of the browsed associated attribute information in the associated attribute information storage section 244A. When the specific information includes a row number, it is necessary to transmit also the row number to the terminal device 3A in addition to the associated attribute information in the associated attribute information transmission processing by the user page information creation section 211A described above. The use information relay processing is processing to store the use history included in the received use information in the use history storage section 243A and transmit the received use information to the information processing server device 1A.

The terminal device 3A is a general computer comprising a CPU, RAM, ROM, hard disk drive, network interface, etc., and performs predetermined operations based on incorporated programs. FIG. 40 is a configuration diagram of the terminal device 3A in the present embodiment. The terminal device 3A in the present embodiment is configured by a terminal control section 31A, a terminal communication section 32A, an input section 33A, and a display section 34A.

The terminal communication section 32A is a section to communicate with the item providing server device 2A via the network 4A.

The input section 33A is an interface used by a user to operate the terminal device 3A and is, for example, a mouse or keyboard when the terminal device 3A is a PC (Personal Computer) or a button when the terminal device 3A is a mobile telephone.

The display section 34A is an interface, for example, a display to display various pieces of information so that a user can view them visually.

Figure 41:
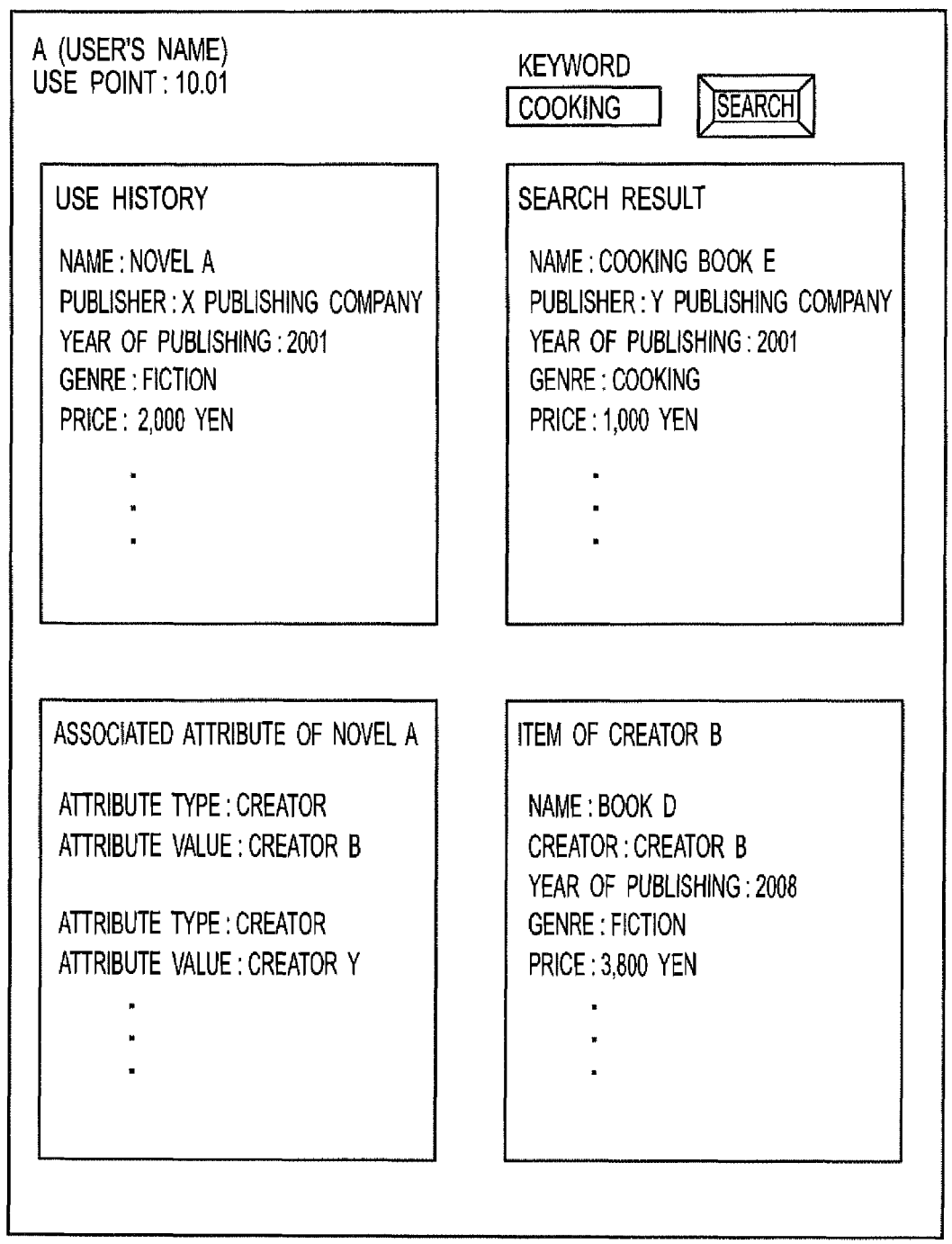
FIG. 41 is a diagram showing a display example of a user page displayed on the display section 34A in the fourth embodiment of the present invention.

The terminal control section 31A totally controls each section configuring the terminal device 3A. The terminal control section 31A is configured by a user page display section 311A and a use information creation section 312A. The user page display section 311A performs user page information acquisition request transmission processing, user page display processing, search condition transmission processing, search result display processing, associated attribute information acquisition request transmission processing, associated attribute information display processing, associated attribute correspondence item attribute information acquisition request transmission processing, and associated attribute correspondence item attribute information display processing according to the operation acquired from the input section 33A and the kind of data received from the item providing server device 2A. The user page information acquisition request transmission processing is processing performed when acquiring the operation to request the display of a user page from the input section 33A and is processing to create a user page information acquisition request using the user identifier of a user and transmit the created user page information acquisition request to the item providing server device 2A. The user page is drawn based on the user page information received from the item providing server device 2A. The user page display processing is processing to create a user page based on the user page information received from the item providing server device 2A and display the created user page on the display section 34. The search condition transmission processing is processing performed when acquiring the input operation of a condition and the contents of the operation to request a search from the input section 33A and is processing to create a search condition using the user identifier of the user and the acquired condition and transmit the created search condition to the item providing server device 2A. The search result display processing is processing to update the user page based on the search result received from the item providing server device 2A. The associated attribute information acquisition request transmission processing is processing performed when acquiring the operation from the input section 33A, such as selection of the use history displayed on the use history browse screen and selection of the search result displayed on the search result browse screen and is processing to create an associated attribute information acquisition request using the item identifier of the item, which is an object of the operation, and transmit the created associated attribute information acquisition request to the item providing server device 2A. The associated attribute information display processing is processing to update the user page based on the associated attribute information received from the item providing server device 2A. The associated attribute correspondence item attribute information acquisition request transmission processing is processing performed when acquiring the operation from the input section 33A, such as selection of associated attribute information displayed on the associated attribute information browse screen, and is processing to create an associated attribute correspondence item attribute information acquisition request using the associated attribute information, which is an object of the operation, and transmit the created associated attribute correspondence item attribute information acquisition request to the item providing server device 2A. The associated attribute correspondence item attribute information display processing is processing to update the user page based on the item attribute information received from the item providing server device 2A. FIG. 41 is a display example of a user page. In the display example in FIG. 41, the user's name of a user who is using the terminal device 3A and the use point are displayed on the left side in the upper row and the use history of the user is displayed on the left side in the middle row. Further, on the right side in the upper row, a text box into which a search direction is input and a "search" button that triggers search condition transmission processing are displayed and on the right side in the middle row, item attribute information that satisfies the search condition is displayed. On the left side in the lower row, associated attribute information is displayed and on the right side in the lower row, item attribute information corresponding to the selected associated attribute information is displayed.

When acquiring the use operation of an item displayed in the user page from the input section 33A, the use information creation section 312A performs use information transmission processing. The use operation of an item is an operation to select item attribute information, such as an item's name displayed in the user page, an operation to perform playback when the item is music, an operation to view when the item is a movie, an operation to specify an item as a purchase candidate (put the item into a shopping bag) when the item can be purchased in the user page, an operation to purchase the item specified as the purchase candidate, etc.

In the user information transmission processing, first, use information is created using the use history created based on the user identifier of a user and the item identifier of an item, which is an object of the use operation. At this time, when the item, which is the object of the use operation, is an item corresponding to the associated attribute information, use information is created using the specific information created based on the base item identifier included in the associated attribute information, or associated attribute information thereof, or the row number corresponding to the associated attribute information in addition to the use history. Then, the created use information is transmitted to the item providing server device 2A. In the display example in FIG. 41, when "cooking book E", which is the search result, is used, the use information is created using only the use history of the "cooking book E" as a result.

Further, when "book D", which is an item corresponding to associated attribute information, is used, the use information is created using the specific information created based on the base item identifier (item identifier of "novel A") included in the associated attribute information corresponding to the "book D", or the associated attribute information corresponding to the "book D" (associated attribute information corresponding to "creator: creator B" of the "novel A"), or the row number of the associated attribute information corresponding to the "book D", and the use history of the "book D". When creating the specific information using the row number, it is necessary to receive also the row number of the associated attribute information together with the associated attribute information at the time of the associated attribute information processing.

It is also possible to add information other than that described above to the use history in the use information transmission processing. For example, it may also be possible to add use status information to distinguish the operation to select item attribute information, such as an item's name, the operation to specify an item as a purchase candidate, the operation to purchase the item specified as the purchase candidate, the operation to playback an item, etc., from one another. Further, it may also be possible to cause a user to evaluate an item and add the evaluation value (preference value represented by a numerical value, such as "1: having a great dislike for", "2: rather averse to", "3: moderate", "4: rather fond of", and "5: having a great liking for") to the use history. Further, when performing the use information transmission processing at intervals of a predetermined period of time, it may also be possible to add the number of times of use of an item during the period of time to the use history. When it is necessary for the item providing server device 2A to perform authentication in the processing in each section of the terminal control section 31A, it is sufficient to transmit the user specifying information in association therewith to the item providing server device 2A. It may also be possible to store in advance a password of the user specifying information to be transmitted in a storage section, not shown schematically, of the terminal device 3A and acquire it from the storage section, not shown schematically. Further, it may also be possible to cause a user to input a password when transmitting user specifying information.

Figure 42:
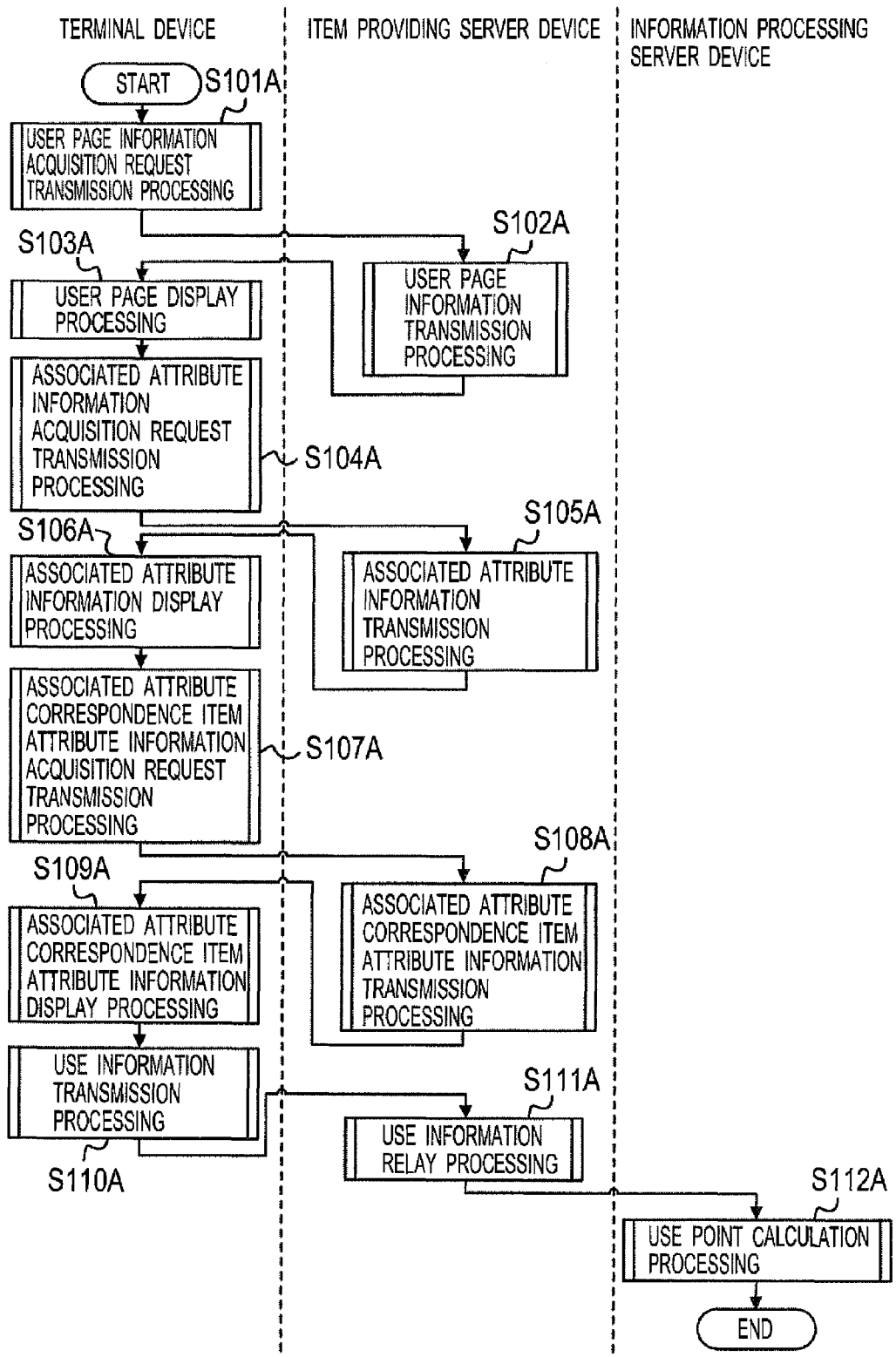
FIG. 42 is a flowchart showing an example of a procedure in relation to the use of an item in the terminal device 3A in the fourth embodiment of the present invention.

Here, using the flowchart in FIG. 42, an example of a procedure relating to the use of an item in the terminal device 3A is explained. First, the terminal device 3A performs user page information acquisition request transmission processing (step S101A). Next, when receiving the user page information acquisition request from the terminal device 3A, the user page information creation section 211A performs user page information transmission processing (step S102A). Next, when receiving the user page information from the item providing server device 2A, the terminal device 3A performs user page display processing (step S103A). Next, when a user who has browsed the displayed user page performs the operation to acquire associated attribute information, the terminal device 3A performs associated attribute information acquisition request transmission processing (step S104A). Next, when receiving the associated attribute information acquisition request from the terminal device 3A, the user page information creation section 211A performs associated attribute information transmission processing (step S105A).

Next, when receiving associated attribute information from the item providing server device 2A, the terminal device 3A performs associated attribute information display processing (step S106A). Next, when a user who has browsed the displayed user page performs the operation to acquire item attribute information corresponding to associated attribute information, the terminal device 3A performs associated attribute correspondence item attribute information acquisition request transmission processing (step S107A). Next, when receiving the associated attribute correspondence item attribute information acquisition request from the terminal device 3A, the user page information creation section 211A performs associated attribute correspondence item attribute information transmission processing (step S108A).

Next, when receiving item attribute information from the item providing server device 2A, the terminal device 3A performs associated attribute correspondence item attribute information display processing (step S109A). Next, when a user who has browsed the item attribute information corresponding to the displayed associated attribute information performs the use operation relating to the item, the terminal device 3 performs use information transmission processing (step S110A).

Next, when receiving use history information from the terminal device 3A, the use information relay section 213A performs use information relay processing (step S111A). Next, when receiving use information from the item providing server device 2A, the information processing server device 1A performs use point calculation processing (step S112A) and the series of processing from step S101A to step S112A is completed. The use point calculation processing is described later. The above is the explanation of the example of the procedure relating to the use of an item in the terminal device 3A.

The information processing server device 1A is a device to transmit associated attribute information to the item providing server device 2A or transmit use point information in response to a request from the item providing server device 2. It is also possible to implement the information processing server device 1A as software (program) processing using a computer comprising a CPU, a RAM, a ROM, a hard disk drive (HDD), a network interface, etc.

Figure 43:
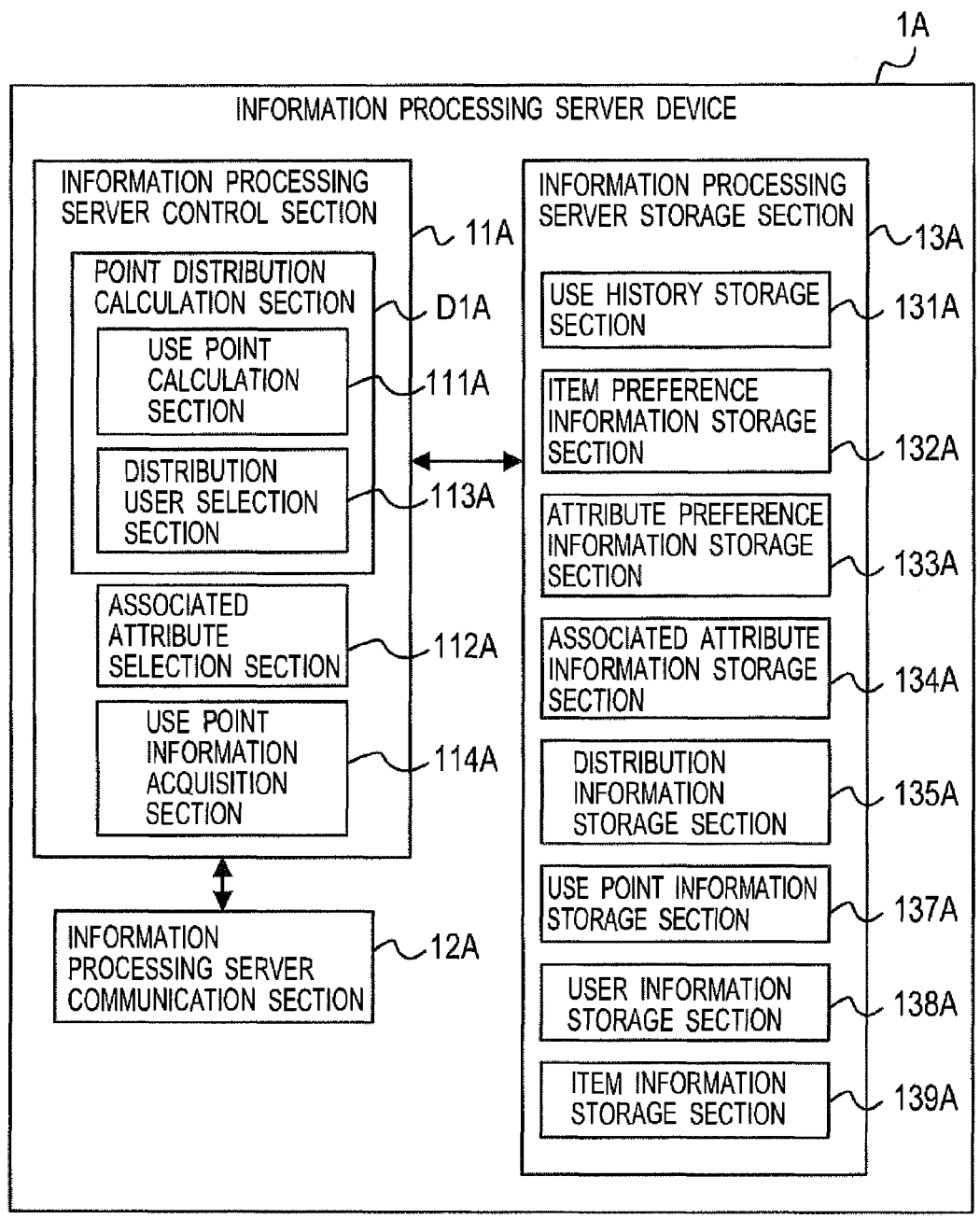
FIG. 43 is a configuration diagram of an information processing server device 1A in the fourth embodiment of the present invention.

FIG. 43 is a configuration diagram of the information processing server device 1A in the present embodiment. The information processing server device 1A in the present embodiment is configured by an information processing server control section 11A, an information processing server communication section 12A, and an information processing server storage section 13A.

The information processing server communication section 12A is a section to communicate with the item providing server device 2A via the network 4A. The information processing server storage section 13A stores various pieces of data using a storage device, such as HDD. The information processing server storage section 13A is configured by a use history storage section 131A, an item preference information storage section 132A, an attribute preference information storage section 133A, an associated attribute information storage section 134A, a distribution information storage section 135A, a use point information storage section 137A, a user information storage section 138A, and an item information storage section (item attribute information storage section) 139A.

The use history storage section 131A has the same storage form as that of the use history storage section 243A of the item providing server device 2A and stores all the use histories stored in the use history storage section 243A.

The item preference information storage section 132A stores a plurality of pieces of item preference information. FIG. 44 is a diagram showing a storage state of the item preference information storage section 132A. The item preference information is information associating a user identifier (user_id), an item identifier (item_id), and an item preference value (ip_value), which is a degree of liking of a user for an item represented by a numerical value, and stored in the form a table as shown in FIG. 44.

The attribute preference information storage section 133A stores a plurality of pieces of attribute preference information. FIG. 44 is a diagram showing a storage state of the attribute preference information storage section 133A. The attribute preference information is information associating a user identifier (user_id), an attribute type identifier (type_id), an attribute value identifier (attr_id), and an attribute preference value (ap_value), which is a degree of liking of a user for an item attribute represented by a numerical value, and stored in the form a table as shown in FIG. 45.

The associated attribute information storage section 134A has the same storage form as that of the associated attribute information storage section 244A of the item providing server device 2A and stores all the pieces of associated attribute information stored in the associated attribute information storage section 244A.

The distribution information storage section 135A stores a plurality of pieces of distribution information. FIG. 45 is a diagram showing a storage state of the distribution information storage section 135A. The distribution information is information associating a combination of an item identifier (item_id) of a base item and an attribute type identifier (type_id) and an attribute value identifier (attr_id) corresponding to an associated attribute, a user identifier (user_id) of a user (distribution user) who has used a base item, which is an object of distribution of a use parent point, and any of items having an associated attribute, and a distribution rate (rate) of a use parent point and stored in the form of a table as shown in FIG. 46. The use parent point in the present embodiment is a parent (base) of a use point given to use information indicative of the use of an item having an associated attribute and by multiplying the use parent point by a distribution rate, a use point is calculated for each distribution user.

The use point information storage section 137A stores a plurality of pieces of use point information. FIG. 47 is a diagram showing a storage state of the use point information storage section 137A. The use point information is information associating a user identifier (user_id) and a use point (point) of a user corresponding to the user identifier and stored in the form of a table as shown in FIG. 47. The initial value of the stored use point is "0".

The user information storage section 138A has the same storage form as that of the user information storage section 241A of the item providing server device 2A and stores all the pieces of user information stored in the user information storage section 241A.

The item information storage section 139A has the same storage form as that of the item information storage section 242A of the item providing server device 2A and stores all the pieces of item attribute information stored in the item information storage section 242A.

The use history storage section, the associated attribute information storage section, the user information storage section, and the item information storage section exist both in the information processing server device 1A and in the item providing server device 2A, but, it may also be possible to provide the respective storage sections in one of the devices and enable information stored in the respective storage sections to be exchanged therebetween.

The information processing server control section 11A totally controls each section configuring the information processing server device 1A. The information processing server control section 11A is configured by a use point calculation section 111A, an associated attribute selection section (associated data creation section) 112A, a distribution user selection section 113A, and a use point information acquisition section 114A. The use point calculation section 111A and the distribution user selection section 113A cooperate and function as a point distribution calculation section D1A.

Figure 48:
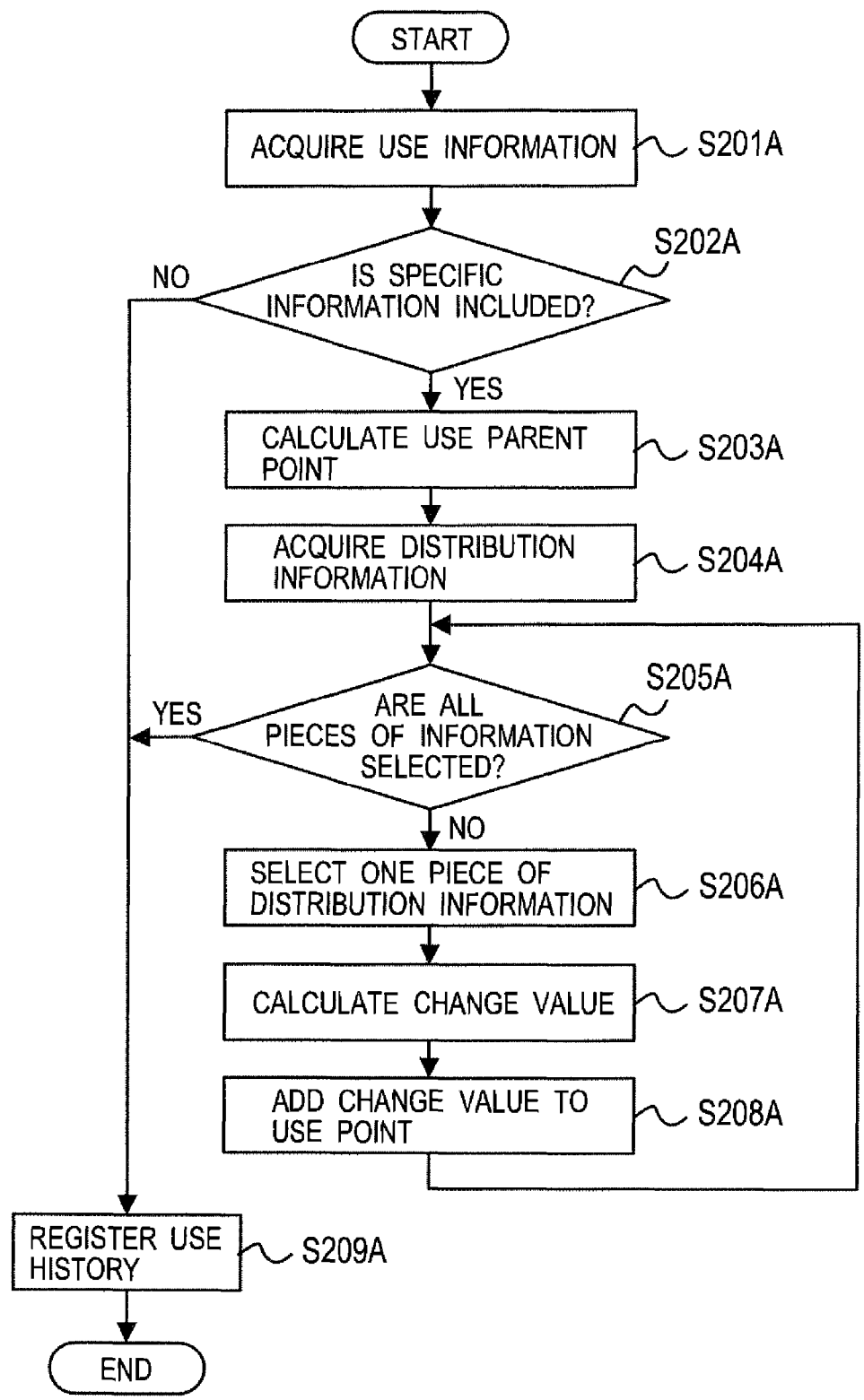
FIG. 48 is a flowchart showing a procedure of use point calculation processing in the fourth embodiment of the present invention.

When receiving use information from the item providing server device 2A, the use point calculation section 111A performs use point calculation processing (step S111A). The procedure of the use point calculation processing is explained using the flowchart in FIG. 48. First, the use point calculation section 111A acquires use information from the item providing server device 2 (step S201A). Next, the use point calculation section 111A determines whether or not the use information acquired in step S201A includes specific information (step S202A). When specific information is included, the procedure proceeds to step S203A and when not, to step S209A.

In step S203A, the use point calculation section 111A calculates a use parent point. In the method for calculating a use parent point, for example, a certain point (for example, a point of 10) set in advance by the service provider is given for each piece of use information. In the case of a shopping site that handles charged items, it may also be possible to calculate a use parent point as a certain proportion (for example, 1% of a purchase price) of a purchase price. Further, when use status information of an item is included in the use history included in the use information, it may also be possible for the service provider to set a certain point in advance for each use status and give as a use parent point.

Next, the use point calculation section 111A acquires distribution information corresponding to specific information included in the use information acquired in step S201A (step S204A). A method for acquiring distribution information for each format of specific information is explained. When the specific information is a base item identifier, first, all the pieces of associated attribute information corresponding to the base item identifier are acquired from the associated attribute information storage section 134A. Then, a combination of the item identifier, the attribute type identifier, and the attribute value identifier of the associated attribute information is collated with a combination of distribution information (item_id, type_id, attr_id) and all the pieces of distribution information that match are acquired. When there are two or more pieces of associated attribute information corresponding to the base item identifier, it is sufficient to acquire distribution information for each piece of associated attribute information. At this time, for example, when the number of pieces of associated attribute information corresponding to the base item is three, the total value of distribution rates equals the number of pieces of associated attribute information corresponding to the base item identifier, such as that the total value of distribution rates is "3". Because of this, when there exist two or more pieces of associated attribute information corresponding to the base item identifier, it is necessary to set the total value of distribution rate to "1" by dividing the total value of distribution rate by the number of pieces of associated attribute information corresponding to the base item identifier.

When the specific information is associated attribute information, a combination of the item identifier, the attribute type identifier, and the attribute value identifier of the associated attribute information is collated with a combination of distribution information (item_id, type_id, attr_id) and all the pieces of distribution information that match are acquired. The distribution users corresponding to user_id included in distribution information acquired here are all the users who have used the base item and the item corresponding to the associated attribute information earlier than the use information. When the specific information is created based on the row number, it is sufficient to acquire associated attribute information corresponding to the row number from the associated attribute information storage section 134A and use the acquired associated attribute information.

Next, the use point calculation section 111A determines whether or not all the pieces of distribution information are selected in step S206A (step S205A). When all are selected, the procedure proceeds to step S209A and when those not selected yet remain, to step S206A. In step S206A, the use point calculation section 111A selects one piece of distribution information acquired in step S204A, for example, in the order of acquisition. Next, the use point calculation section 111A calculates s change value to change a use point by multiplying the use parent point calculated in step S203A and rate included in the distribution information selected in step S206A (step S207A).

Next, the use point calculation section 111A specifies use point information corresponding to user_id included in the distribution information selected in step S206A in the use point information storage section 137A and add the change value calculated in step S207A to point (original use point) of the specified use point information (step S208A). Next, the procedure proceeds to step S205A.

In step S209A, the use point calculation section 111A stores the use history included in the use information acquired in step S201A in the use history storage section 131A and the series of processing from step S201A to step S209A is completed. By storing a use history in the use history storage section 131A, the use history is regarded to be processed already. When it is desired to add a fixed change value also to a user who has used an item corresponding to the associated attribute information, it may be possible to add in this step. At this time, in the use point information storage section 137A, the use point information corresponding to the user identifier of the use history included in the use information acquired in step S201A is specified and the change value set in advance by the service provider is added to point (original use point) of the specified use point information.

In the above-described explanation, in step S208A, the change value is added to the original use point and thus the use point is updated, but, it may also be possible to update the use point by using multiplication processing of the original point and a coefficient (change value) shown below in place of addition processing. At this time, in step S203A, in place of the use parent point, which is the sum of use points to be added, a parent increase rate, which is the total value of increase rates (a value indicative of how much the original use point is increased, and the coefficient is obtained by adding one to this value) is calculated. Then, it is assumed that a distribution rate relating to a base item ib and an item attribute as corresponding to the associated attribute information of a distribution user u included in the distribution information selected in step S206A is rate (u, ib, as), and a parent increase rate is sr, and a coefficient m (u, ib, as) is calculated by formula (7).

$$m(u,ib,as)=1+sr\times\mathrm{rate}(u,ib,as) \qquad \text{Formula (7)}$$

When the initial value of the use point is "0", the use point does not increase even if the coefficient is multiplied a number of times, and therefore, the initial value is set to a value greater than "0" or the initial value is "0" but only when it becomes an object of calculation of the use point for the first time, a fixed point number is added. Further when it is desired to perform multiplication by a fixed coefficient also for a user who has used an item corresponding to the associated attribute information, it is sufficient to specify the use point information corresponding to the user identifier included in the use information acquired in step S201A and multiply point (original use point) of the specified use point information by the coefficient set in advance by the service provider in step S209A.

The above is the explanation of use point calculation processing.

The associated attribute selection section 112A performs item preference information creation processing, attribute preference information creation processing, and associated attribute selection processing in this order at each predetermined timing after deleting all of the pieces of item preference information stored in the item preference information storage section 132A, attribute preference information stored in the attribute preference information storage section 133A, and associated attribute information stored in the associated attribute information storage section 134A. As the predetermined timing, predetermined time intervals (for example, every 24 hours) may be used or the predetermined timing may be each time a use history is received a predetermined number of times. Further, it may also be possible to vary the time intervals, such as that, every three hours from Monday through Friday, every six hours on Saturday, and every 12 hours on Sunday. Furthermore, it may also be possible to vary the time intervals according to seasons, such as that, the time intervals are set short in summer and long in winter.

Figure 49:
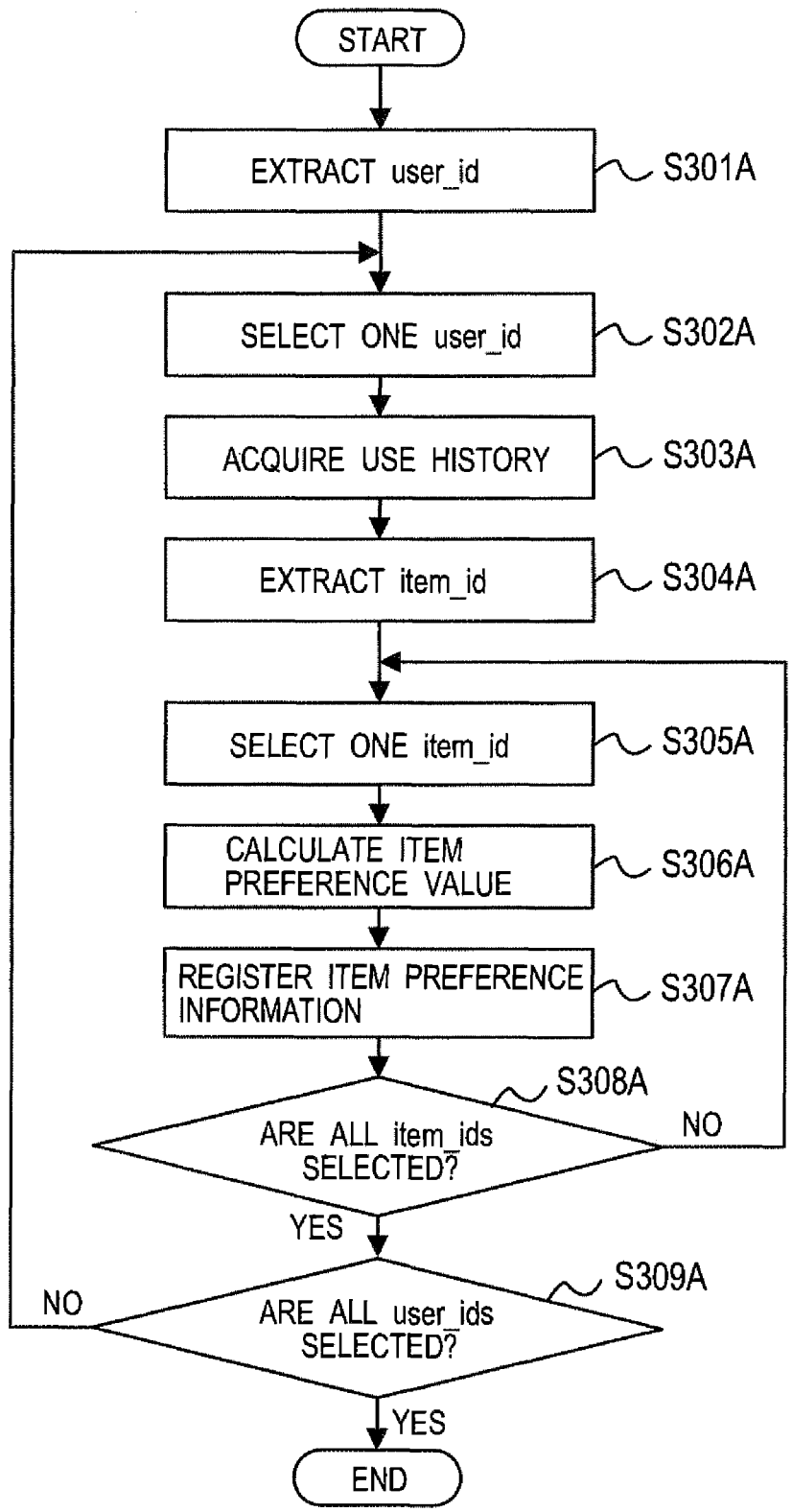
FIG. 49 is a flowchart showing a procedure of item preference information creation processing in the fourth embodiment of the present invention.

First, the procedure of the item preference information creation processing is explained using the flowchart in FIG. 49.

First, the associated attribute selection section 112A extracts all user_ids without duplication from the use history storage section 131A (step S301A). Next, the associated attribute selection section 112A selects one of user_ids extracted in step S301A, for example, in the order of extraction (step S302A). Next, the associated attribute selection section 112A acquires all the use histories including user_id selected in step S302A from the use history storage section 131A (step S303A).

Next, the associated attribute selection section 112A extracts all item_ids without duplication from the use history acquired in step S303A (step S304A). Next, the associated attribute selection section 112A selects one of item_ids extracted in step S304A, for example, in the order of extraction (step S305A). Next, the associated attribute selection section 112A calculates an item preference value using only those (item preference value calculation target use histories) including item_id selected in step S305S of the use histories acquired in step S303A (step S306A). Hereinafter, eight kinds of methods for calculating an item preference value are explained.

A first method for calculating an item preference value is a method for calculating an item preference value as "1". In this method, the influence (weight) of each individual user on the item preference value is assumed to be equal (the same). The amount of calculation of this method is the smallest. A second method for calculating an item preference value is a method for calculating the total number of times of use as an item preference value. As the total number of times of use, the sum of the numbers of times of use included in the item preference value calculation target use history may be used when the number of times of use is stored as in the second storage form of the use history storage section 131A. When the number of times of use is not included, the number of item preference value calculation target use histories may be used as the total number of times of use. In this method, the preference value of each item for the item preference value is varied, and therefore, the larger the total number of times of use of an item, which is an object of item preference value calculation, the higher the preference value is as a result.

A third method for calculating an item preference value is a method that can be used only when the evaluation value is stored as in the third storage form of the use history storage section 131A and is a method for calculating a typical value (sum, average value, maximum value, minimum value, median, or an evaluation value corresponding to the most recent date of evaluation values) of the evaluation values included in the item preference value calculation target use history as the item preference value. In this method, the preference value of each item for the item preference value is varied, and therefore, the higher the evaluation for an item, which is an object of item preference value calculation, the higher the preference value is as a result. A fourth method for calculating an item preference value is a method for calculating an item preference value by using a use date included in the use history and weighting a use history in such a manner that a use history including an older use date is weighted more. For example, it is sufficient to calculate a difference between the date (present) when associated attribute selection processing is performed and the use date thereof and calculate a typical value (sum total, average value, maximum value, or minimum value) of the difference for each item preference value calculation target use history. In this method, the preference value of each item for the item preference value is varied, and therefore, the earlier the use date of an item, which is an object of item preference value calculation, the higher the item preference value is as a result.

A fifth method for calculating an item preference value is a method for calculating an item preference value by using a use date included in the use history and weighting a use history in such a manner that a use history including a more recent use date is weighted more. For example, it is sufficient to calculate a difference between the date (present) when associated attribute selection processing is performed and the use date thereof and calculate a typical value (sum total, average value, maximum value, minimum value, or median) of the inverse of the difference for each item preference value calculation target use history. In this method, the preference value of each item for the item preference value is varied, and therefore, the later the use date of an item, which is an object of item preference value calculation, the higher the item preference value is as a result. Although the inverse is used so that the larger the difference between dates, the smaller the distribution rate is, another method may be used. For example, an exponential function (monotonically decreasing function) having a base of more than 0 and less than 1 may be used.

In the fourth and fifth methods for calculating an item preference value, it is necessary to perform processing to prevent the difference between the date (present) when associated attribute selection processing is performed and the use date from becoming "0". A sixth method for calculating an item preference value is a method that can be used only when an amount of payment is stored as in the fourth storage form of the use history storage section 131A and a method for calculating a typical value (sum total, average value, maximum value, minimum value, or median) of the amount of payment included in the item preference value calculation target use history as the item preference value. In this method, the preference value of each item for the item preference value is varied, and therefore, the larger the amount of payment for an item, which is an object of item preference value calculation, the higher the preference value is as a result.

It may also be possible to calculate an item preference value by combining the first to sixth methods for calculating an item preference value. For example, it may also be possible to calculate the item preference values (item preference value 1 to item preference value N) by the respective methods and use the sum, product, average value, etc., of those degrees of item preference as the total item preference value. Further, it may also be possible to combine the third and sixth methods for calculating an item preference value, calculate the product of the evaluation value and the amount of payment, and calculate the sum total of those products as the preference value. Next, the associated attribute selection section 112A stores item preference information associating user_id selected in step S402A, item_id selected in step S305A, and the item preference value (ip_value) calculated in step S406A in the item preference information storage section 132A (step S307A).

Next, the associated attribute selection section 112A determines whether or not all item_ids extracted in step S304A are selected (step S308A). When all are selected, the procedure proceeds to step S309A and when those not selected yet remain, to step S305A. In step S309A, the associated attribute selection section 112A determines whether or not all user_ids extracted in step S302A are selected. When all are selected, the series of processing from step S301A to step S309A is completed and when those not selected yet remain, the procedure proceeds to step S302A.

The above is the explanation of item preference information creation processing.

Figure 50:
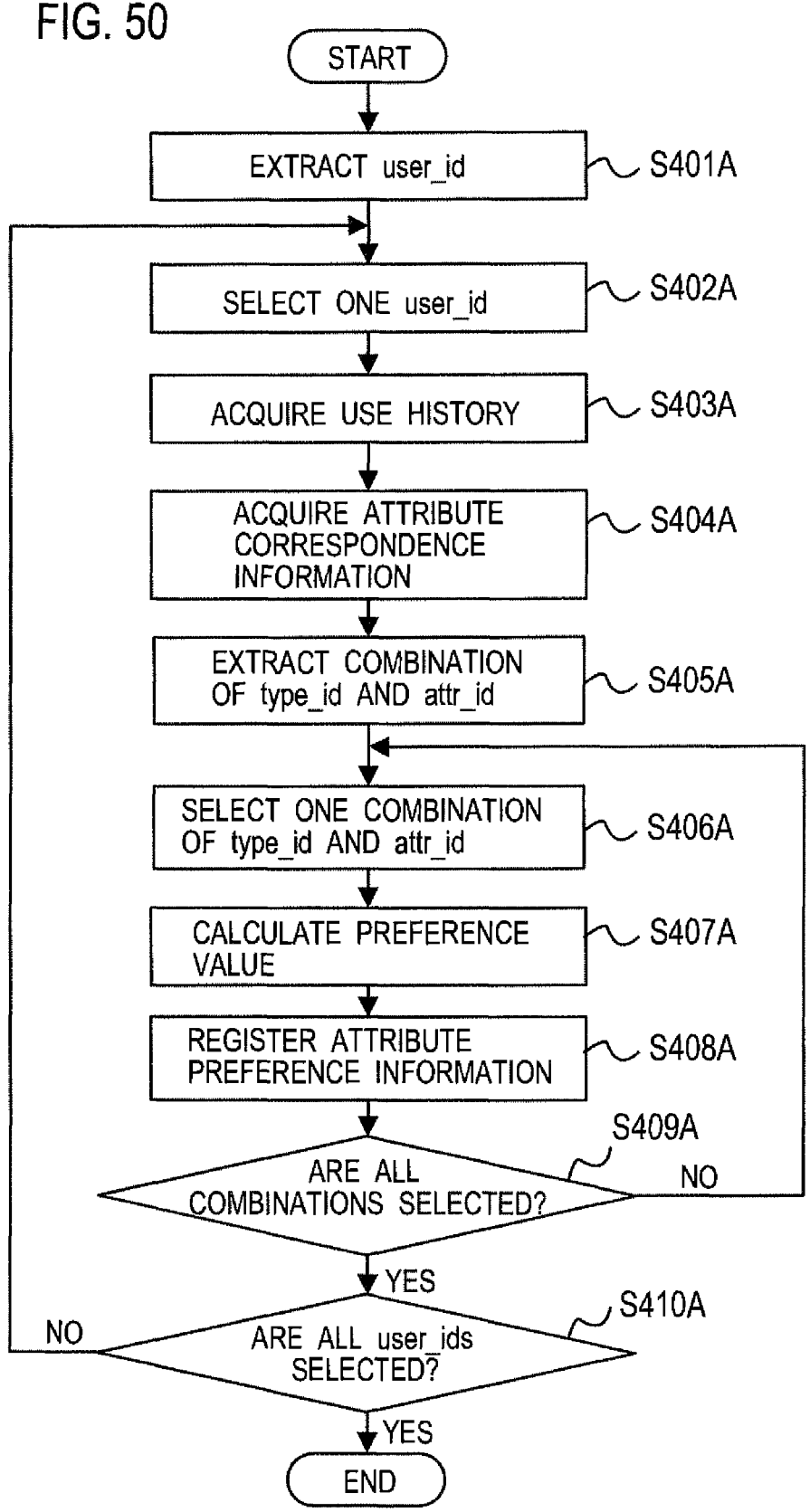
FIG. 50 is a flowchart showing a procedure of attribute preference information creation processing in the fourth embodiment of the present invention.

Next, the procedure of the attribute preference information creation processing is explained using the flowchart in FIG. 50.

First, the associated attribute selection section 112A extracts all user_ids without duplication from the use history storage section 131A (step S401A). Next, the associated attribute selection section 112A selects one of user_ids extracted in step S401A, for example, in the order of extraction (step S402A). Next, the associated attribute selection section 112A acquires all the use histories including user_id selected in step S402A from the use history storage section 131A (step S403A).

Next, the associated attribute selection section 112A extracts all the pieces of attribute correspondence information that agree with any of item_ids included in the use history acquired in step S403A (step S404A). Next, all the combinations of type_id and attr_id are extracted without duplication from the attribute correspondence information acquired in step S403A (step S405A). Next, the associated attribute selection section 112A selects one of the combinations of type_id and attr_id extracted in step S405A, for example, in the order of extraction (step S406A). Next, the associated attribute selection section 112A extracts item_id from those which agree with the combination of type_id and attr_id selected in step S405A of the attribute correspondence information acquired in step SS404A. Then, the associated attribute selection section 112A calculates an attribute preference value using only use histories (attribute preference value calculation target use histories) that agree with any of extracted item_ids of the use histories acquired in step S403A (step S407A).

Hereinafter, six kinds of methods for calculating an attribute preference value are explained. A first method for calculating an attribute preference value is a method for calculating an attribute preference value as "1". In this method, the preference value of each item attribute for the attribute preference value is assumed to be equal (the same). The amount of calculation of this method is the smallest. A second method for calculating an attribute preference value is a method for calculating the total number of times of use as an attribute preference value. As the total number of times of use, the sum of the numbers of times of use included in the attribute preference value calculation target use history may be used when the number of times of use is stored as in the second storage form of the use history storage section 131A. When the number of times of use is not included, the number of attribute preference value calculation target use histories may be used as the total number of times of use. In this method, the preference value of each item attribute for the attribute preference value is varied, and therefore, the larger the total number of times of use of an item having an attribute, which is an object of attribute preference value calculation, the higher the preference value is as a result.

A third method for calculating an attribute preference value is a method that can be used only when the evaluation value is stored as in the third storage form of the use history storage section 131A and is a method for calculating a typical value (sum, average value, maximum value, minimum value, median, or an evaluation value corresponding to the most recent date of evaluation values) of the evaluation values included in the attribute preference value calculation target use history as the attribute preference value. In this method, the preference value of each item attribute for the attribute preference value is varied, and therefore, the higher the evaluation of a user for an item having an attribute, which is an object of attribute preference value calculation, the higher the preference value is as a result. A fourth method for calculating an attribute preference value is a method for calculating an attribute preference value by using a use date included in the use history and weighting a use history in such a manner that a use history including an older use date is weighted more. For example, it is sufficient to calculate a difference between the date (present) when attribute preference information creation processing is performed and the use date thereof and calculate a typical value (sum total, average value, maximum value, or minimum value) of the difference for each attribute preference value calculation target use history. In this method, the preference value of each item attribute for the attribute preference value is varied, and therefore, the earlier a user uses an item having an attribute, which is an object of attribute preference value calculation, the higher the preference value is as a result.

A fifth method for calculating an attribute preference value is a method for calculating an attribute preference value by using a use date included in the use history and weighting a use history in such a manner that a use history including a more recent use date is weighted more. For example, it is sufficient to calculate a difference between the date (present) when attribute preference information creation processing is performed and the use date thereof and calculate a typical value (sum total, average value, maximum value, minimum value, or median) of the inverse of the difference for each attribute preference value calculation target use history. In this method, the preference value of each item attribute for the attribute preference value is varied, and therefore, the later a user uses an item having an attribute, which is an object of attribute preference value calculation, the higher the preference value is as a result. Although the inverse is used so that the larger the difference between dates, the smaller the distribution rate is, another method may be used. For example, an exponential function (monotonically decreasing function) having a base of more than 0 and less than 1 may be used.

In the fourth and fifth methods for calculating an attribute preference value, it is necessary to perform processing to prevent the difference between the date (present) when attribute preference information creation processing is performed and the use date from becoming "0". A sixth method for calculating an attribute preference value is a method that can be used only when an amount of payment is stored as in the fourth storage form of the use history storage section 131A and is a method for calculating a typical value (sum total, average value, maximum value, minimum value, or median) of the amount of payment included in the attribute preference value calculation target use history as the attribute preference value. In this method, the preference value of each item attribute for the attribute preference value is varied, and therefore, the larger the amount of payment by a user for an item having an attribute, which is an object of attribute preference value calculation, the higher the preference value is as a result.

It may also be possible to calculate attribute preference value by combining the first to sixth methods for calculating an attribute preference value. For example, it may also be possible to calculate the attribute preference values (attribute preference value 1 to attribute preference value N) by the respective methods and use the sum, product, average value, etc., of those attribute preference values as the total attribute preference value. Further, it may also be possible to combine the third and sixth methods for calculating an attribute preference value, calculate the product of the evaluation value and the amount of payment, and calculate the sum total of those products as the attribute preference value.

Next, the associated attribute selection section 112A stores attribute preference information associating user_id selected in step S402A, a combination of type_id and attr_id selected in step S406A, and the attribute preference value (p_value) calculated in step S407A in the attribute preference information storage section 133A (step S408A).

Next, the associated attribute selection section 112A determines whether or not all the combinations of type_id and attr_id extracted in step S406A are selected (step S409A). When all are selected, the procedure proceeds to step S410A and when those not selected yet remain, to step S406A. In step S410A, the associated attribute selection section 112A determines whether or not all user_ids extracted in step S402A are selected. When all are selected, the series of processing from step S401A to step S410A is completed and when those not selected yet remain, the procedure proceeds to step S402A.

It may also be possible to limit the use histories used in item preference information creation processing and attribute preference information creation processing only to the use histories relating to the items used during the period from a specific time in the past to the time (present) when the processing is performed. A specific time in the past may be set in advance by the service provider and for example, a time three months, half a year, or one year before the time when the processing is performed may be set. At this time, in the item preference information creation processing, it is sufficient to limit the use histories used in step S301A and step S303A to the use histories from the specific time in the past to the present. Further, in the attribute preference information creation processing, it is sufficient to limit the use histories used in step S401A and step 403A to the use histories from the specific time in the past to the present. By limiting the use histories both in the item preference information creation processing and in the attribute preference information creation processing as described above, it is possible to select an associated attribute using use histories corresponding to a predetermined period of time.

Further, it may also be possible to limit the use histories used in item preference information creation processing and attribute preference information creation processing using the item attribute information stored in the item information storage section 139A. At this time, in the item preference information creation processing, it is sufficient to limit the use histories used in step S301A and step S303A to only the use histories including item_id of an item having an item attribute satisfying a predetermined condition. As a predetermined condition, it is sufficient to use a condition that limits the type of attribute to a specific attribute, such as that the type of attribute includes only "creator". Further, it is sufficient to use a condition that limits the item attribute to a specific item attribute, such as that, only the attribute value "fiction" of the attribute type "genre". It is, of course, possible to prepare a plurality of conditions and form a predetermined condition by combining the plurality of conditions so that a use history that satisfies any of the plurality of conditions is acquired or a use history that satisfies a fixed number of conditions is acquired. Further, it is, of course, possible to specify nothing as a predetermined condition. In the attribute preference information creation processing also, it is sufficient to limit the use histories used in step S401A and step S403A to the use histories corresponding to an item attribute that satisfies a predetermined condition. By limiting the use histories in the item preference information creation processing as described above, it is possible to select an associated attribute only for an item having a predetermined item attribute. Further, by limiting the use histories in the attribute preference information creation processing as described above, only a predetermined item attribute becomes an associated attribute. The above is the explanation of the procedure of the attribute preference information creation processing.

Figure 51:
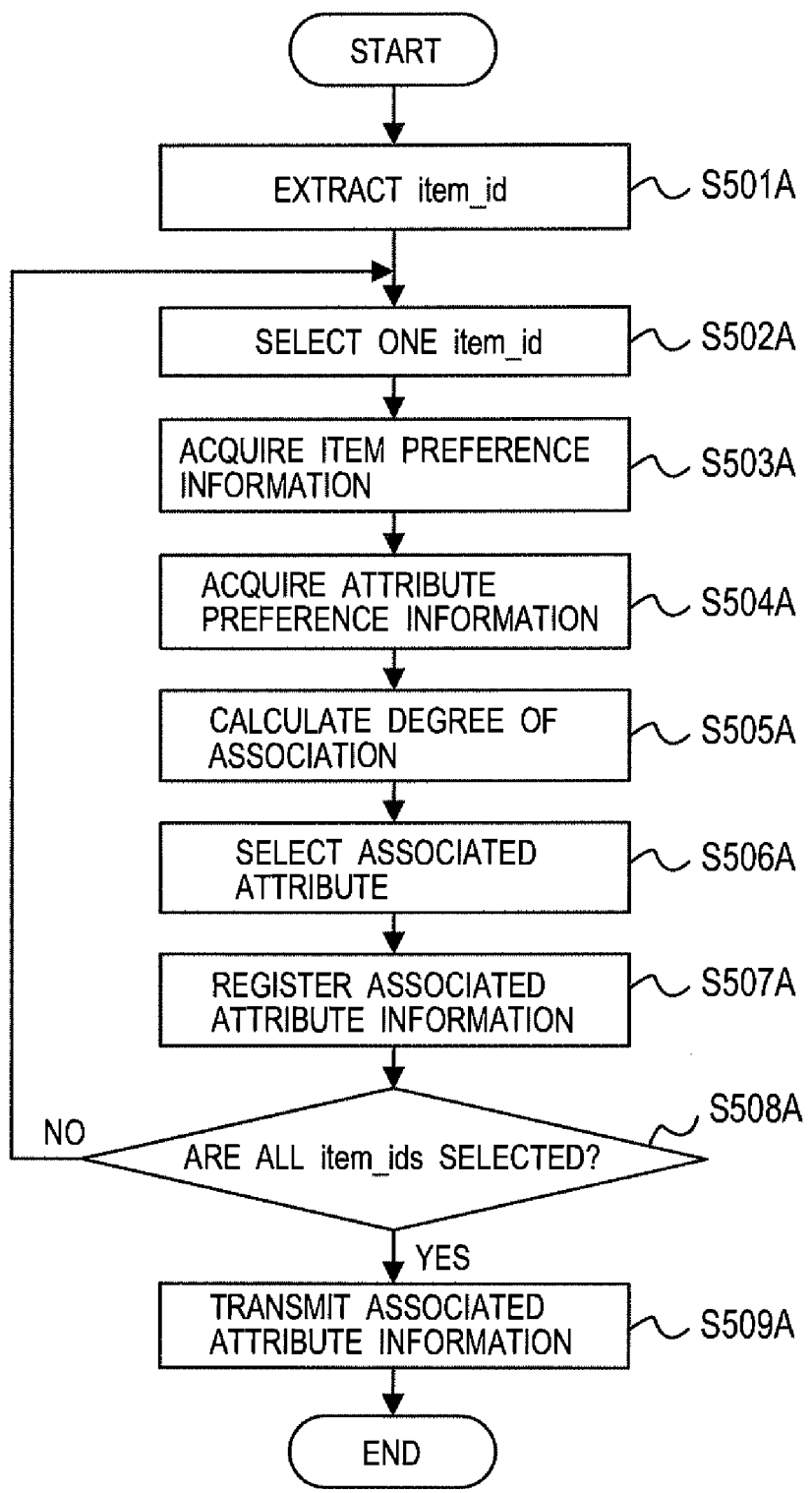
FIG. 51 is a flowchart showing a procedure of associated attribute selection processing in the fourth embodiment of the present invention.

Next, the procedure of the associated attribute selection processing is explained using the flowchart in FIG. 51. First, the associated attribute selection section 112A extracts all item_ids without duplication from the item preference information storage section 132A (step S501A). Next, the associated attribute selection section 112A selects one of item_ids extracted in step S501A, for example, in the order of extraction (step S502A). Next, the associated attribute selection section 112A acquires item preference information including an item identifier of an item (regarded as a base item) corresponding to item_id selected in step S502A from the item preference information storage section 132A (step S503A). Next, the associated attribute selection section 112A acquires attribute preference information of an associated candidate attribute from the attribute preference information storage section 133A (step S504A).

In order to acquire attribute preference information of an associated candidate attribute, it is sufficient to acquire attribute preference information having any of user identifiers included in the item preference information acquired in step S503A.

Next, the associated attribute selection section 112A calculates a degree of association with a base item for each associated candidate attribute using the item preference information acquired in step S503A and the attribute preference information acquired in step S504A (step S505A). As a method for calculating a degree of association, it may be possible to use, for example, a Jaccard coefficient of a set of users who have used the base item and a set of users who have used any of items having an associated candidate attribute.

Further, it may also be possible to use a cosine distance calculated using the item preference value of the user for the base item and the attribute preference value of the associated candidate attribute as the degree of association. Furthermore, it may also be possible to use a Pearson's product-moment correlation coefficient calculated using the item preference value and the attribute preference value of the user who has used both the base item and any of items having the associated candidate attribute as the degree of association. Besides the above, any index may be used as long as it indicates association between a base item and an associated candidate attribute.

Next, the associated attribute selection section 112A selects an associated attribute from among the associated candidate attributes based on the degree of association calculated in step S505A (step S506A). As a selection criterion of an associated attribute, it is sufficient to select associated attributes in the number set in advance by the service provider in the descending order of degree of association. It may also be possible for the service provider to determine a threshold value and thereby associated candidate attributes having a degree of association higher than the threshold value are selected as associated attributes.

Next, the associated attribute selection section 112A stores associated attribute information associating item_id selected in step S502A, a combination of an attribute type identifier (type_id) and an attribute value identifier (attr_id) of an associated attribute, and a degree of association of a base item and an associated attribute (value) in the associated attribute information storage section 134A for each associated attribute selected in step S506A (step S507A). Next, the associated attribute selection section 112A determines whether or not all item_ids extracted in step S502A are selected (step S508A). When all are selected, the procedure proceeds to step S509A and when those not selected yet remain, to step S503A. In step S509A, the associated attribute selection section 112A transmits all the pieces of associated attribute information stored in the associated attribute information storage section 134A to the item providing server device 2A and the series of processing from step S501A to step S509A is completed.

Further, it may also be possible to use a degree of similarity between items (first degree of similarity), which is the similarity between items represented by a numerical value, to calculate a degree of association. In order to calculate a degree of association using a degree of similarity between items, it is sufficient to perform the following processing in place of the processing from step S504A to step S505A. First, the associated attribute selection section 112A acquires item preference information of a similarity degree calculation target item from the item preference information storage section 132A. In order to acquire item preference information of a similarity degree calculation target item, first, all the user identifiers are extracted from the item preference information of the base item acquired in step S503A. Then, all of those which include item identifiers other than the base item identifier are acquired in the item preference information including any of the extracted user identifiers from the item preference information storage section 132A.

Next, the associated attribute selection section 112A calculates a degree of similarity between items. As a method for calculating a degree of similarity between items, it may be possible to use, for example, a Jaccard coefficient of a set of users who have used the base item and a set of users who have used the similarity degree calculation target item. Further, it may also be possible to use a cosine distance between two items calculated using the item preference value of the user for the item as the degree of similarity between items. Furthermore, it may also be possible to use a Pearson's product-moment correlation coefficient calculated using the preference value of the user who has used both the base item and the similarity degree calculation target item as the degree of similarity between items. Besides the above, any index may be used as long as it indicates similarity between a base item and a similarity degree calculation target item. Here, a similarity degree calculation target item having a degree of similarity between items higher than a predetermined value or similarity degree calculation target items selected in the number not exceeding a predetermined number in the descending order of degree of similarity between items are referred to as first associated candidate attribute extraction target items. It may be possible for the service provider to determine in advance the predetermined value and the predetermined number. Of course, all the similarity degree calculation target items for which the degree of similarity between items has been calculated may be referred to as the first associated candidate attribute extraction target items.

Next, the associated attribute selection section 112A extracts an associated candidate attribute. In order to extract an associated candidate attribute, it is sufficient to extract an item attribute, which is a combination of an attribute type identifier and an attribute value identifier corresponding to any of the first associated candidate attribute extraction target items, as an associated candidate attribute from the item information storage section 139A (a set of associated candidate attributes extracted here forms a set of first associated candidate attributes). Next, the associated attribute selection section 112A calculates a degree of association for each associated candidate attribute. In order to calculate a degree of association, it may be possible to use a typical value (sum total, average value, maximum value, minimum value, or median of the degrees of similarity between items) of the degree of similarity between items between the base item and the first associated candidate attribute extraction item having an associated candidate attribute. By the above procedure, it is possible to calculate a degree of association using a degree of similarity between items.

Further, it may also be possible to use a degree of adaptation between items (first degree of adaptation) indicative of a degree of item attribute compatibility between two items to calculate a degree of association. In order to calculate a degree of association using a degree of adaptation between items, it is sufficient to perform the following processing in place of the processing from step S504A to step S505A. First, the associated attribute selection section 112A calculates a degree of adaptation between items between a base item and another item (adaptation degree calculation target item) for each item other than the base item. It may be possible to use the number of the same attributes between two item attributes as a degree of adaptation between items. For example, when the attribute types are genre, creator, and price, if the one attribute value is "genre Y", "creator b", and "1,200 yen" and the other attribute value is "genre Y", "creator t", and "1,200 yen", then, the number of the same item attributes is two, and therefore, the degree of adaptation between items is determined to be "2".

Further, it may also be possible for the service provider to arbitrarily determine the conditions of the same attribute value for each attribute type and for example, as to the price, it may also be possible to determine that the attribute value is the same when a difference between the attribute values is less than "1,000 yen". It may also be possible to perform the same processing as to the other attribute types, such as "genre".

Further, it may also be possible to calculate a degree of adaptation between items by weighting attribute types differently from one another. For example, when "creator" is the same, it may also be possible to calculate a degree of adaptation between items as twice that when "price" is the same. Here, an adaptation degree calculation target item having a degree of adaptation between items higher than a predetermined value or adaptation degree calculation target items selected in the number not exceeding a predetermined number in the descending order of degree of adaptation between items are referred to as second associated candidate attribute extraction target items, which are items for which the associated candidate attribute is extracted. It may be possible for the service provider to determine in advance the predetermined value and the predetermined number. Of course, all the adaptation degree calculation target items for which the degree of adaptation between items has been calculated may be referred to as the second associated candidate attribute extraction target items.

Next, the associated attribute selection section 112A extracts an associated candidate attribute. In order to extract an associated candidate attribute, it is sufficient to extract an item attribute, which is a combination of an attribute type identifier and an attribute value identifier corresponding to any of the second associated candidate attribute extraction target items as an associated candidate attribute from the item information storage section 139A (a set of associated candidate attributes extracted here forms a set of second associated candidate attributes). Next, the associated attribute selection section 112A calculates a degree of association for each associated candidate attribute. In order to calculate a degree of association, it may be possible to use a typical value (sum total, average value, maximum value, minimum value, or median of the degrees of adaptation between items) of the degree of adaptation between items between the base item and the second associated candidate attribute extraction target item having an associated candidate attribute. By the above procedure, it is possible to calculate a degree of association using a degree of adaptation between items.

Further, it may also be possible to use the item attribute of a base item as an associated attribute as it is. At this time, it may also be possible to use the same degree of association, such as that the degree of association of all the associated attributes is "1", or calculate using the attribute preference value of attribute preference information having the item attribute of the base item. The above is the explanation of the procedure of the associated attribute selection processing.

When the associated attribute selection processing by the associated attribute selection section 112A is completed, the distribution user selection section 113A performs distribution user selection processing after deleting all the pieces of data stored in the distribution information storage section 135A.

Figure 52:
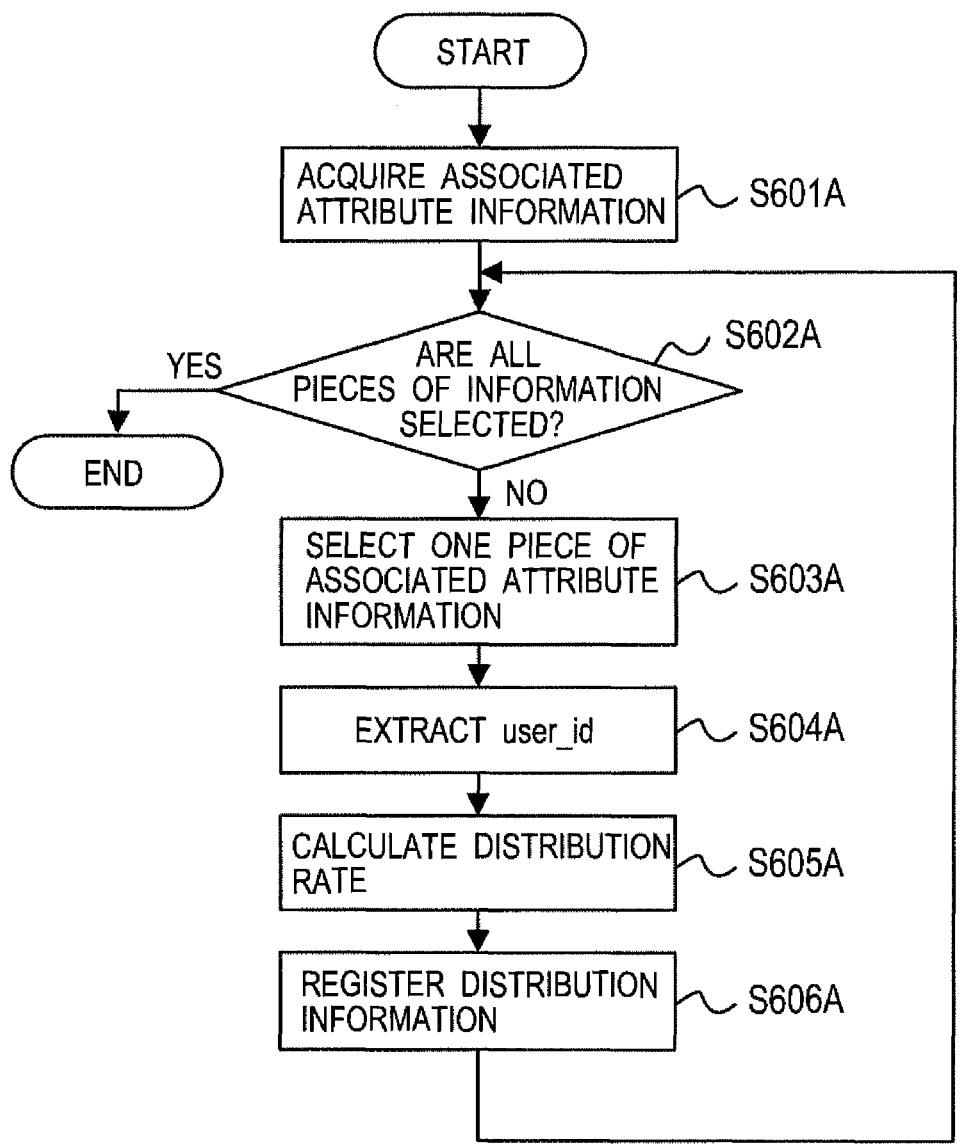
FIG. 52 is a flowchart showing a procedure of distribution user selection processing in the fourth embodiment of the present invention.

The procedure of the distribution user selection processing is explained using the flowchart in FIG. 52. First, the distribution user selection section 113A acquires all the pieces of associated attribute information from the associated attribute information storage section 134A (step S601A). At this time, it may also be possible to limit associated attribute information to that in which the item attribute of the base item satisfies a predetermined condition or to that in which the associated attribute satisfies a predetermined condition. Here, only the acquired association information will be a distribution target of a use point.

Next, the distribution user selection section 113A determines whether or not all the pieces of associated attribute information are selected in step S601A (step S602A). When all are selected, the series of the processing from step S601A to step S606A is completed, and when those not selected yet remain, the procedure proceeds to step S603A. In step S603A, the distribution user selection section 113A selects one piece of the associated attribute information acquired in step S601A. For example, it may be possible to select one by one in the order of acquisition.

Next, the distribution user selection section 113A extracts user_id of a user (distribution target user) who has used both the base item and any of items having an associated attribute in the associated attribute information selected in step S603A from the item preference information storage section 132A and the attribute preference information storage section 133A (step S604A). In order to extract user_id of a distribution target user, first, item preference information (base item preference information) having item_id that agrees with the item identifier included in the associated attribute information is specified. Next, attribute preference information (associated attribute preference information) having a combination (of type_id, attr_id) that agrees with a combination of the attribute type identifier and the attribute value identifier included in the associated attribute information is specified.

Next, all user_ids present both in the specified base item preference information (item preference information created using the first previous use history) and in the specified associated attribute item preference information (attribute preference information created using the second previous use history) are extracted. The distribution rate is calculated only for the distribution target user. If the characteristic that a point is given when both the base item and any of items having an associated attribute are used is disclosed, an incentive is produced in a user who uses only one of the base item and any of items having an associated attribute to "obtain a point by using the item not used", and therefore, the effect to promote the use of the items is further increased.

It may also be possible to select a user who has used the base item as a distribution target user. At this time, the frequency with which a point is given to a user is increased, and therefore, the effect to cause a user to access the site more frequently is obtained. Further, when selecting a user who has used the base item as a distribution target user, it is also possible to give more points to a user who has used both the base item and any of items having an associated attribute than points to a user who has used only the base item. At this time, by disclosing the characteristic, an incentive is produced in a user to "obtain more points by using the item not used", and therefore, the effect to promote the use of the items is further increased although not so much as that in the case where a user who has used both the base item and any of items having an associated attribute is selected as a distribution target user.

Further, it may also be possible to select a user who has used only any of items having an associated attribute as a distribution target user or select a user who has used at least one of the base item and any of items having an associated attribute as a distribution target user. At this time also, the same effect as that when a user who has used only the base item is selected as a distribution target user can be obtained.

Next, the distribution user selection section 113A calculates a distribution rate for each distribution target user (step S605A). As a method for calculating a distribution rate, the following four kinds of methods can be used. In the following explanation of the method for calculating a distribution rate, it is assumed that a base item corresponding to the associated attribute information selected in step S603A is ib, an associated attribute is as, and a set of distribution target users who have used both the base item ib and any of items having the item attribute as is U (ib, as). The sum total of the distribution rates are set to one so that the sum total of the use points for one associated attribute equals the use parent point.

A first method for calculating a distribution rate is a method for calculating a distribution rate so that the rate is the same for the distribution target users. If it is assumed that the number of the set of distribution target users U (ib, as) is |U (ib, as)|, a distribution rate rate (u, ib, as) of a user u (∈U (ib, as)) is expressed by formula (8)

$$\text{rate}(u, ib, as) = \frac{1}{|U(ib, as)|} \quad \text{Formula (8)}$$

The amount of calculation of this method is the smallest. Further, in this method, the distribution rate is calculated based on the consideration that all the distribution target users contribute equally to associated attribute selection. A second method for calculating a distribution rate is a method for calculating a distribution rate using the item preference value and the attribute preference value. It may also be possible to acquire the item preference value used here from the item preference information stored in the item preference information storage section 132A or calculate it using a use history. Further, it may also be possible to acquire the attribute preference value from the attribute preference information stored in the attribute preference information storage section 133A or calculate it using attribute correspondence information and a use history. When the average value, maximum value, minimum value, sum, product, or one of the item preference value of the base item and the attribute preference value of the associated attribute for the distribution target user u (∈U (ib, as)) is assumed to be a total preference value Vt (u), then the distribution rate rate (u, ib, as) of the user u is expressed by formula (9).

$$\text{rate}(u, ib, as) = \frac{Vt(u)}{\sum_{u' \in U(ib,as)} Vt(u')} \quad \text{Formula (9)}$$

In the second method for calculating a distribution rate, the distribution rate is calculated so that the value is larger for the distribution target user having a higher total preference value calculated using the item preference value and the attribute preference value in the distribution target user set U (ib, as). Consequently, in this method, the characteristic changes depending on the method for calculating the item preference value and the attribute preference value.

When the first method is used to calculate an item preference value and an attribute preference value, the characteristic is the same as that in the first method for calculating a distribution rate. When the second method is used to calculate both, the use point obtained increases in proportion to the number of times of use, and therefore, by disclosing the characteristic to users, it is possible to promote the use of an item by the users. When the third method is used to calculate both, the distribution rate is higher for a user having a higher typical value of the evaluation value. When the fourth method is used to calculate both, more points are distributed to a user who has begun to use the base item and any of items having the associated attribute recently (user who has become a member newly etc.), and therefore, it is likely to prevent the user from withdrawing from the item use service. The reason for this is that in the methods other than the fourth method, a user who has used most recently obtains a total value of use points obtained from the associated attribute information corresponding to the base item and the associated attribute considerably smaller than that of a user who has used earlier, however, in this calculation method, it is possible to reduce a difference between the total value of use points of a user who has used the item earlier and the total value of use points of a user who has used later.

When the fifth method is used to calculate both, it is possible for a user who has used earlier to obtain more use points, and therefore, by disclosing the characteristic to users, it is possible to obtain a large number of users when the use of an item starts. When the sixth method is used to calculate both, the distribution rate is higher for a user having a higher typical value of the amount of payment. When the method for calculating an item preference value differs from the method for calculating an attribute preference value, the characteristics of both the calculation methods fuse into one.

When selecting a user who has used the base item as a distribution target user, it is sufficient to calculate the distribution rate using the item preference value for the base item as the total preference value. At this time, it may also be possible to calculate the total preference value by, for example, adding a constant determined in advance by the service provider to the item preference value for the base item so that a distribution target user who has used both the base item and any of item having the associated attribute can obtain more use points than a distribution target user who has used only the base item. Further, it may also be possible to calculate the total preference value by multiplying the item preference value for the base item by a coefficient greater than "1", determined in advance by the service provider. Furthermore, it may also be possible to calculate the sum of the item preference value for the base item and the attribute preference value for the associated attribute as the total preference value.

When selecting a user who has used only any of items having the associated attribute as a distribution target user, it is sufficient to calculate the distribution rate using the attribute preference value for the associated attribute as the total preference value. When selecting a user who has used at least one of the base item and any of items having the associated attribute as a distribution target user, the total preference value is calculated using the item preference value and the attribute preference value for a distribution target user who has used both the base item and any of items belonging to the associated attribute. Further, for a distribution target user who has used only the base item, the item preference value for the base item may be used as the total preference value and for a distribution target user who has used only any of items having the associated attribute, the attribute preference value for the associated attribute may be used as the total preference value.

A third method for calculating a distribution rate is a method for calculating a distribution rate so that when the date when a user became a member is included in the user attribute information included in the user information stored in the user information storage section 138A, the longer the period of time from the date when the user became a member to when distribution user selection processing is performed, the higher the distribution rate is. For example, if it is assumed that a period of time from the date when a user u (∈U (ib, ar)) became a member to when distribution user selection processing is performed is D(u) (≥0), a distribution rate rate (u, ib, ar) of the user u is calculated by formula (10).

$$\text{rate}(u, ib, as) = \frac{(D(u)+1)}{\sum_{u' \in U(ib,as)} (D(u')+1)} \quad \text{Formula (10)}$$

By this method, it is possible for a user who has become a member earlier (user who has been a member for a long time) to obtain more points, and therefore, by disclosing the characteristic to users, the possibility that users determine that "once become a member, it is more advantageous to be a member as long as possible" becomes high, and therefore, it is possible to increase the number of users who continue to be a member without giving up his/her membership halfway. In formula (10), "1" is added to the numerator and denominator, respectively. This is processing to prevent the denominator from becoming "0". A numerical value to be added may be other than "1" and it may also be possible to omit the addition of "1" to the numerator and denominator if the part "ΣD(u)" at the denominator is calculated as a numerical value greater than "0".

A fourth method for calculating a distribution rate is, on the contrary to the third method for calculating a distribution rate, a method for calculating a distribution rate so that the shorter the period of time (in units of seconds, minutes, hours, days, weeks, months, etc.) from the date when a user became a member to when distribution user selection processing is performed, the higher the distribution rate is. For example, if it is assumed that a period of time from the date when the user u (∈U (ib, ar)) became a member to when distribution user selection processing is performed is D (u) (≥0), the distribution rate rate (u, ib, ar) of the user u is expressed by formula (11).

$$\text{rate}(u, ib, as) = \frac{\frac{1}{(D(u)+1)}}{\sum_{u' \in U(ib,as)} \frac{1}{(D(u')+1)}} \quad \text{Formula (11)}$$

By this method, it is likely to prevent a user who has become a member from giving up his/her membership immediately because the use point of the user becomes likely to increase, who has become a member recently. The reason for this is that in the methods other than the fourth method, there is a trend for the use point of a user who has become a member recently to be hard to increase. In particular, when the item use service lasts for a long period of time, the number of users is large accordingly, and further, the number of items used by each user increases, and the number of distribution target users relating to one piece of associated attribute information increases, and therefore, the use point obtained at one time is reduced. In formula (11), "1" is added to the numerator and denominator, respectively, but, a numerical value to be added may be other than "1". It may also be possible to omit the addition of "1" to the numerator and denominator if "D(u)" at the numerator is calculated as a numerical value greater than "0" and "D(u)" at the denominator is calculated as a numerical value greater than "0". Although the inverse of "D(u)" is used in formula (11) so that the larger the D(u) is, the smaller the distribution rate is, another method may be used. For example, an exponential function (monotonically decreasing function) having a base of more than 0 and less than 1 may be used. The above is the explanation of the method for calculating a distribution rate.

The distribution rate calculated by the above-mentioned four kinds of methods for calculating a distribution rate has a value equal to or more than "0". Then, when the distribution rate is "0", the change value is "0", and therefore, a distribution target user whose distribution rate is not "0" is selected as a distribution user to whom a use parent point is distributed (the set formed by distribution users forms the set of users to whom a use point is distributed). Next, the distribution user selection section 113A stores distribution information associating a combination (of item_id, type_id, attr_id) included in the associated attribute information selected in step S502A, user_id of a distribution user, and the distribution rate (rate) of a distribution user calculated in step S605A in the distribution information storage section 135 for each distribution user (step S606A). Next, the procedure proceeds to step S602A.

Further, it may also be possible to limit the number of distribution users to whom the use parent point is distributed for one piece of associated attribute information. To do this, it is sufficient to extract part of users from the distribution target candidate user set as distribution target users rather than selecting all the users (distribution target candidate users) who have used both the base item and any of items having the associated attribute as distribution target users for whom the distribution rate is calculated. As a method for extracting distribution target users from distribution target candidate users, for example, it is sufficient to randomly extract distribution target users in the number not exceeding a predetermined number from the distribution target candidate user set. That is, when the number of distribution target candidate users is larger than the predetermined number, it may be possible to randomly extract the predetermined number of users and when the number of distribution target candidate users is equal to or less than the predetermined number, it is sufficient to extract all the distribution target candidate users as distribution target users. Further, it may also be possible to extract distribution target users in the number not exceeding the predetermined number in the descending order of total preference value.

It may also be possible to extract user identifiers from the use histories in the order from the oldest use date and extract the user identifiers of distribution target users in the number not exceeding the predetermined number in the order of extraction. Further, on the contrary, it may also be possible to extract user identifiers from the use histories in the order from the most recent use date and extract the user identifiers of distribution target users in the number not exceeding the predetermined number in the order of extraction. When the date of membership registration is included in the user information storage section 138A, it may also be possible to extract user identifiers from the use histories in the order from the oldest date of membership registration and extract the user identifiers of distribution target users in the number not exceeding the predetermined number in the order of extraction. Further, on the contrary, it may also be possible to extract user identifiers from the use histories in the order from the most recent date of membership registration and extract the user identifiers of distribution target users in the number not exceeding the predetermined number in the order of extraction.

It may also be possible to select distribution target candidate users as distribution target users, who satisfy conditions determined in advance by the service provider (for example, a condition is set for each of a plurality of attributes, such as, whether or not the sex is "female", whether or not the age is in the range of "20" to "24", and whether or not the area is "Japan", and whether or not the distribution target candidate users satisfy all of these conditions or at least one of these conditions, etc.) based on the user attribute information included in the user information stored in the user information storage section 138A. The above is the explanation of the procedure of distribution user selection processing.

The use point information acquisition section 114A performs use point information transmission processing in response to a request from the item providing server device 2A. The use point information transmission processing is processing to acquire use point information corresponding to a user identifier included in the use point information acquisition request received from the item providing server device 2A from the use point information storage section 137A and transmit the acquired use point information to the item providing server device 2A.

Figure 53:
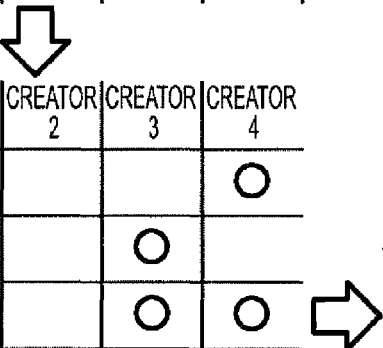
FIG. 53 is a diagram showing an example of associated attribute selection processing in the fourth embodiment of the present invention.

Here, an example is explained, in which an associated creator of "product a" is selected based on the purchase histories of member A to member F and the distribution rate of the use parent point is calculated for each associated creator for the "product a", using the drawings along the present embodiment. First, an example is explained, in which an associated creator for the "product a" is selected, using FIG. 53. In the table on the top-left side in FIG. 53, the purchase status of the product a to product f by each member is indicated by presence/absence of "○". For example, the table indicates that the member A has purchased the "product a" and "product d". Further, in the table on the top-right side in FIG. 53, the creators of the products are shown. For example, the creator of the "product a" is "creator 1". In the table on the bottom-left side in FIG. 53, the purchase status of the "creator 1" to "creator 4" by each member is indicated by presence/absence of "○". For example, the table indicates that the member A has purchased the product of the "creator 1" and the product of the "creator 4". Both the item preference value and the attribute preference value are calculated as "1" and the degree of association between the "product a" and the "creator 2", "creator 3", and "creator 4" except for the "creator 1" who is the creator of the "product a" is calculated by a cosine distance, then, the degree of association is "0.67", "0.29", and "0.52", respectively as shown in the table on the bottom-right side in FIG. 53. When a threshold value is set to "0.4", the associated creators of the "product a" are the "creator 2" and the "creator 4" as shown by "○" in the determination box in the table on the bottom-right side in FIG. 53.

Next, an example is explained, in which the distribution rate of the use parent point is calculated for each associated creator for the "product a", using FIG. 54. By selecting a user who has used the base item and any of items having the associated attribute as a distribution target user and using the first method for calculating a distribution rate as a method for calculating a distribution rate, the users who have used the "product a" and the item of the "creator 2" are the member D and the member F and the use parent point is distributed to these two members equally, and therefore, the distribution rate of the member D and the member F, who are distribution target users relating to the associated creator, that is, the "creator 2" is "0.50", respectively, as shown in the table in FIG. 54. Similarly, the users who have used the "product a" and the item of the "creator 4" are the member A, the member D, and the member F and the use parent point is distributed to these three members equally, and therefore, the distribution rate of the member A, the member D, and the member F, who are distribution target users relating to the associated creator, that is, the "creator 4" is "0.33", respectively.

Then, if the member B purchases the "product b" of the "creator 2" introduced as the associated creator of the "product a", the use point is given to the two members, that is, the member D and the member F, if the member B purchases the "product d" of the "creator 4" introduced as the associated creator of the "product a", the use point is given to the three members, that is, the member A, the member D, and the member F, and so on. In this manner, a plurality of members can obtain points by one-time purchase. In the system according to the prior art in which a point is given to one member who has provided information referred to by a user who has purchased a product, only one member can obtain a point for one-time purchase. When distributing a point to a user who has used the base item as a distribution user, points are distributed to all the members who have purchased the "product a", and therefore, even when the member B purchases either the product of the "creator 2" or the product of the "creator 4", the use point is given to the three members, that is, the member A, the member D, and the member F, and so on. In this manner still more members can obtain points.

Further, in the normal point system in which when the member B purchases all the "product b" of the "creator 2" and the "product d" and the "product e" of the "creator 4" introduced as the associated creator of the "product a" (the number of times of purchase is three), a point is given to the user him/herself who has purchased the products, or in the point system in which a point is given to another user who has provided information to the user who has purchased the product, the number of times a point is given is three in total in both the systems.

On the other hand, in the present invention, when selecting a user who has used the base item and any of items having the associated attribute as a distribution target user, a point is given to the two members, that is, the member D and the member F when the "product b" of the "creator 2" is purchased, a point is given to the three members, that is, the member A, the member D, and the member F when the "product d" of the "creator 4" is purchased, and a point is given to the three members, that is, the member A, the member D, and the member F when the "product e" of the "creator 4" is purchased. As a result of this, a point is given eight times (two members×once time+three members×twice=eight times) in total. Further, if a point is given also to the user him/herself who has purchased the product, a point is given 11 (8+3) times in total.

As described above, according to the present invention, it is possible to increase the frequency with which a point is updated and the number of users to whom a point is given than before. When distributing a point to a user who has used the base item as a distribution user, a point is given nine times in total as a result if all the products, that is, the "product b" of the "creator 2" introduced as the associated creator of the "product a" and the "product d" and the "product e" of the "creator 4" also introduced as the associated creator of the "product a", are purchased. Further, if a point is given to the user him/herself who has purchased the product, a point is given 12 times in total. In this manner, it is possible to further increase the frequency with which a point is updated and the number of users to whom a point is given. Because of this, it is possible to continuously give a feeling of expectation that "my point may have increased today" or an unexpected feeling that "I am surprised that my point has increased suddenly at an unexpected timing", and therefore, it is possible to increase the frequency of accesses to the item providing server. Then, by making users more interested in the items and the item providing server, it is possible to promote the use of items.

Further, in the present embodiment, the users to whom a point is given are limited to the user of purchase and the distribution users, and therefore, it is possible to increase the number of points given to a user comparatively larger without distributing points to many users more than necessary. When giving a point only to a user who has used both the base item and any of items having the associated attribute, if the user is notified in advance of the mechanism of the point distribution, the user to whom a point has been given will know the reason (relationship of cause and effect) that "associated attribute information is formed because I have used a certain item before and a user who saw this has purchased the item, and therefore, my point has increased". That is, it is possible for the user to know that the user's past purchase activity (use activity) had indirectly led to the purchase activity of another user, and therefore, it is likely that satisfaction and reliability for the point system are obtained.

Further, the possibility is raised that the user increases the number of items to use aiming at the induction of the purchase action of another user or the user tends to use items not used frequently by the user before, and therefore, it is possible to promote the use of items. Furthermore, a user who has used the item earlier obtains more points, and therefore, by notifying the user of the characteristic of such a point service, an incentive to "predict an item attribute (associated attribute) associated with the item I have purchased before and use an item having the associated attribute as soon as possible" is produced in each user, and the effect to promote the use of items is obtained.

The use point calculation section 111A of the information processing server device 1A calculates the use parent point and the calculated use parent point is distributed to the use point calculation target user, but, it may also be possible to give a fixed use point to the use point calculation target user without distributing the use parent point. At this time, it is sufficient to add the fixed use point in step S208A without performing processing in step S203A and step S207A in the use point calculation processing of the use point calculation section 111A.

Figure 55:
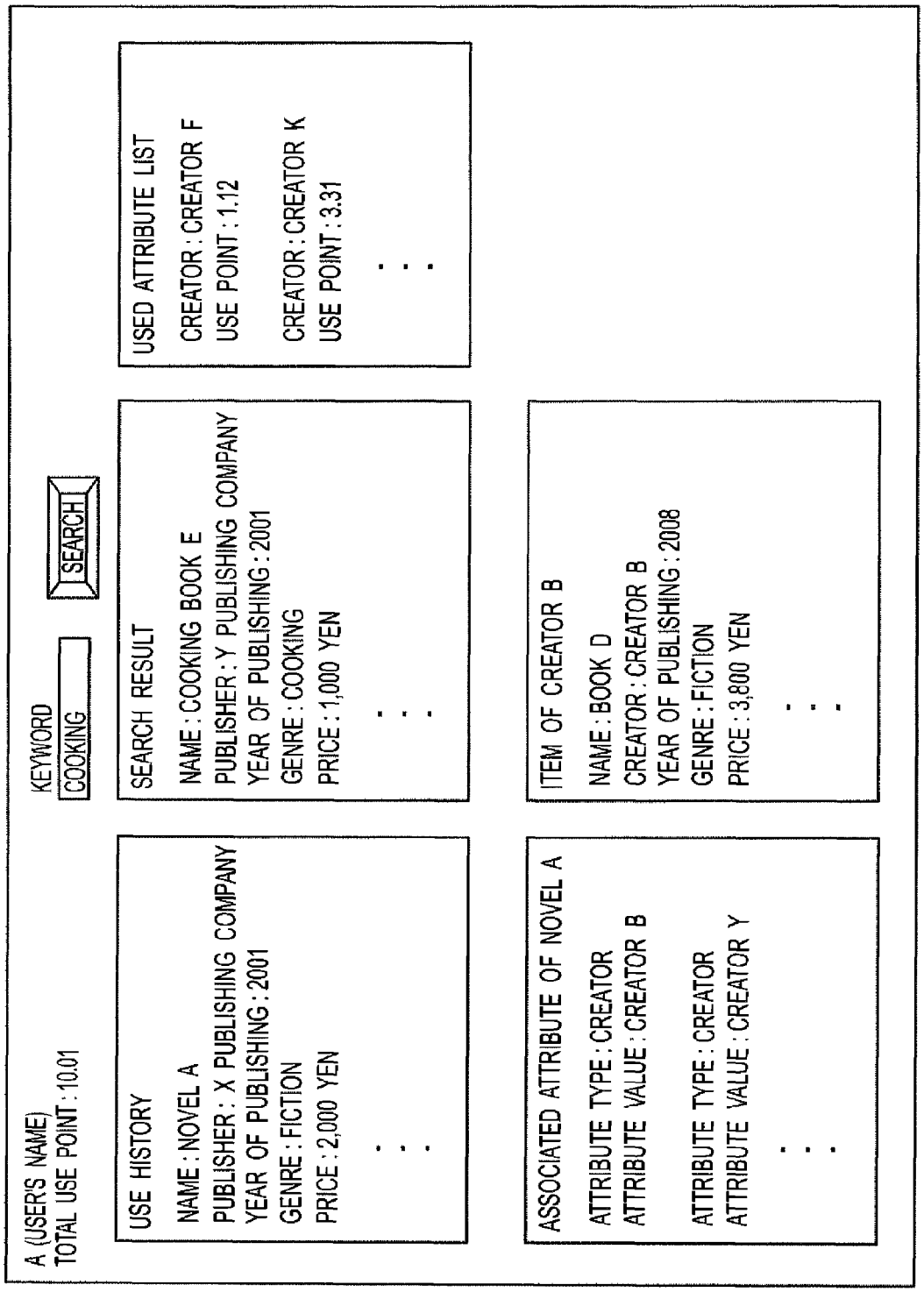
FIG. 55 is a diagram showing a display example of a user page displayed on the display section 34A, in which a use point for each used item attribute is added, in the fourth embodiment of the present invention.

When displaying a user page on the display section 34A of the terminal device 3A, one of the total acquired points of the use point is displayed for each user, but, it may also be possible to display the use point for each item attribute used by a user using the terminal device 3A as shown in the display example of a user page in FIG. 55. In the display example in FIG. 55, the user's name of a user using the terminal device 3A and the total value of the obtained use points are displayed on the left side in the upper row and the use point for each attribute used by the user before is displayed on the right side in the middle row.

At this time, it is necessary to store the use point for each user and for each item attribute in the use point information storage section 137A, and therefore, for example, as in the storage state in FIG. 56, the user identifier (user_id), the attribute type identifier (type_id), the attribute value identifier (attr_id), and the use point (point) are stored in association with one another as use point information. When specifying the use point information to be updated in step S208A of the use point calculation processing in the use point calculation section 111A, the user identifier, the attribute type identifier, and the attribute value identifier included in the distribution information selected in step S206A are used. Further, when the use point information acquisition section 114A performs the use point information transmission processing, it is sufficient to acquire all the pieces of use point information corresponding to the user identifier included in the use point information acquisition request from the use point information storage section 137A and transmit all the acquired pieces of use point information to the item providing server device 2A.

It may also be possible to display information indicative of how many users are given a use point by the use of an item corresponding to associated attribute information for users who have used the item corresponding to associated attribute information. At this time, it is sufficient for the use point calculation section 111A to transmit the number of pieces of distribution information (number of users given a use point) acquired in step S205A to the terminal device 3A when the use point calculation processing is completed. Then, it is sufficient for the terminal device 3A to display the received information for notifying the number of users given a use point in the user page displayed on the display section 34A, for example, as in the display example in the user page in FIG. 57.

The use point calculation section 111A performs the use point calculation processing each time receiving use information from the item providing server device 2A, but, it may also be possible to perform the use point calculation processing at each predetermined timing. At this time, a use information storage section to store use information is provided in the information processing server storage section 13A and when receiving use information from the item providing server device 2A, the use point calculation section 111A stores the received use information in the use information storage section rather than performing the use point calculation processing. By storing the received use information in the use information storage section, the use history included in the stored use information is regarded not to be processed yet. Then, it is sufficient for the use point calculation section 111A to acquire all the pieces of use information stored in the use information storage section at each predetermined timing, select one piece of use information sequentially from a set of acquired use information, perform the use point calculation processing, and delete all the pieces of use information stored in the use information storage section. In this case, all the use histories stored in the use history storage section 131A, which are used in the use point calculation processing, are data used before (older than) the use history included in the use information.

As a predetermined time, various timings can be used as in the associated attribute selection processing. For example, it may be possible to perform processing at predetermined time intervals, such as every 24 hours. It may also be possible to synchronize with the timing at which associated attribute selection processing is performed or not. It is possible to realize the use information storage section by storing use information in place of the use history in the use history storage section 131A rather than providing it. At this time, when receiving use information from the item providing server device 2A, the use point calculation section 111A stores the received use information in the use history storage section 131A as a use history rather than performing the use point calculation processing. Then, it is sufficient for the use point calculation section 111A to acquire all the use histories, for which the use point calculation processing is not performed yet, of the use histories stored in the use history storage section 131A and perform processing from step S201A to step S208A of the use point calculation processing for each acquired use history. In order to determine whether or not the use point calculation processing is performed, that is, whether the use history is processed or not, it is sufficient to add a region to store information for determining whether the use history is processed or not in the use history storage section 131A. Further, it is also possible to determine based on the use date by storing the date when the previous use point calculation processing was performed.

<Fifth Embodiment>

A fifth embodiment of the present invention is explained below in detail using the drawings. In the fifth embodiment of the present invention, the service provider determines the use parent point to be given during a fixed period of time and the use point is calculated based on the use parent point rather than calculating the use parent point for one piece of associated attribute information.

The configuration of the entire system in the fifth embodiment of the present invention is the same as that in the fourth embodiment of the present invention except in that the information processing server device 6A is used in place of the information processing server device 1A. The item providing server device 2A, the terminal device 3A, and the network 4A (and the network 5A) are the same as those in the fourth embodiment of the present invention. The information processing server device 6A is a device to transmit associated attribute information to the item providing server device 2A and transmit a use point in response to a request from the item providing server device 2A. It is also possible to implement the information processing server device 6A as software (program) processing using a computer comprising a CPU, a RAM, a ROM, a hard disk drive (HDD), a network interface, etc.

Figure 58:
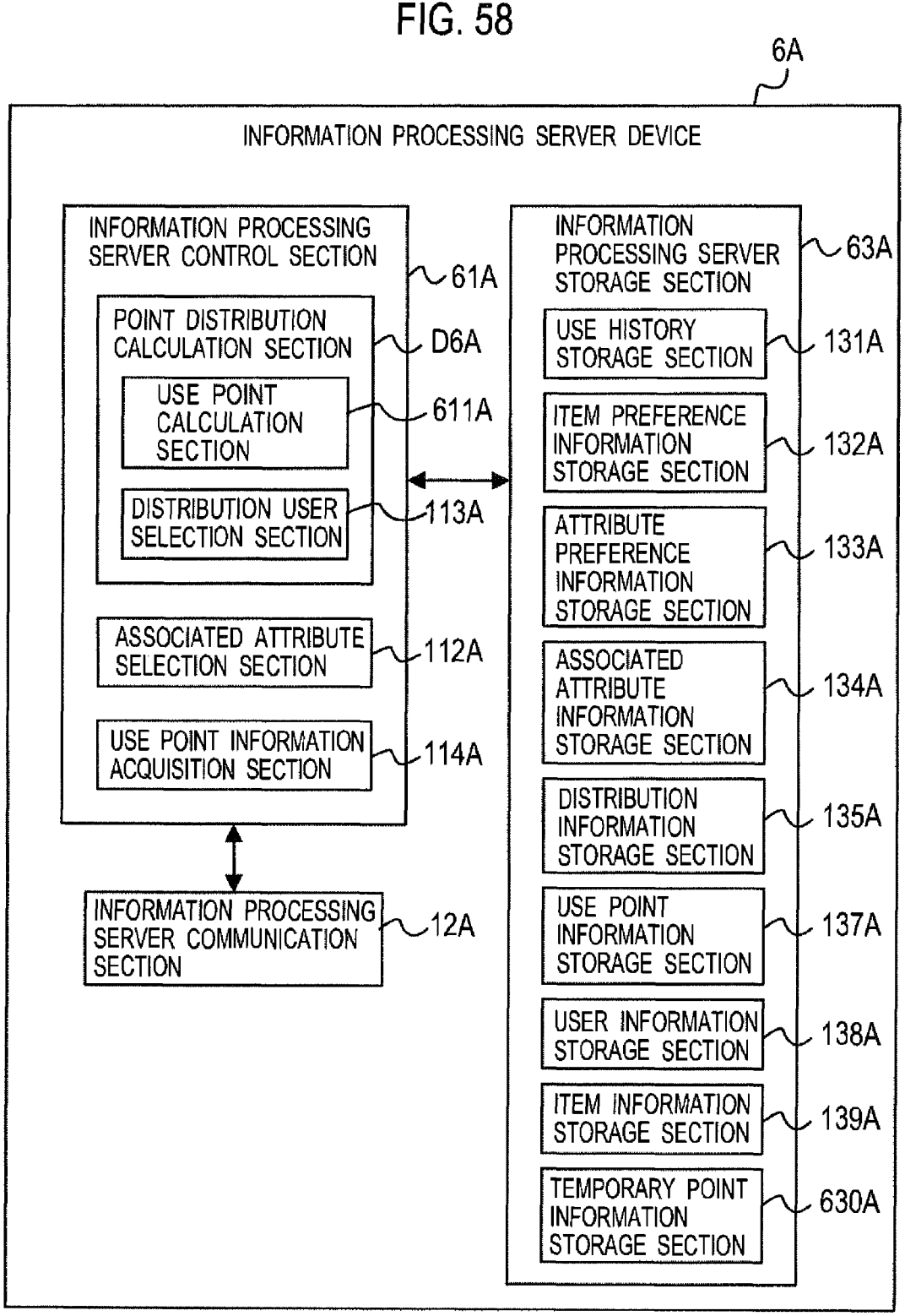
FIG. 58 is a configuration diagram of an information processing server device 6A in a fifth embodiment of the present invention.

FIG. 58 is a configuration diagram of the information processing server device 6A in the present embodiment. The information processing server device 6A in the present embodiment is configured by an information processing server control section 61A, the information processing server communication section 12A, and an information processing server storage section 63A. The information processing server communication section 12A is the same as that in the fourth embodiment of the present invention. The information processing server storage section 63A stores various pieces of data using a storage device, such as HDD. The information processing server storage section 63A is configured by the use history storage section 131A, the item preference information storage section 132A, the attribute preference information storage section 133A, the associated attribute information storage section 134A, the distribution information storage section 135A, the use point information storage section 137A, the user information storage section 138A, the item information storage section 139A, and a temporary point information storage section 630A. The use history storage section 131A, the item preference information storage section 132A, the attribute preference information storage section 133A, the associated attribute information storage section 134A, the distribution information storage section 135A, the use point information storage section 137A, the user information storage section 138A, and the item information storage section 139A are the same as those in the fourth embodiment of the present invention.

The temporary point information storage section 630A stores a plurality of pieces of temporary point information using a storage device, such as HDD. FIG. 59 is a diagram showing a storage state of the temporary point information storage section 630A. The temporary point information is information associating user_id, which is the user identifier, and tmp_point, which is a temporary point of a user corresponding to the user identifier and stored in the form of a table as shown in FIG. 59. The initial value of the stored temporary point is "0".

The information processing server control section 61A totally controls each section configuring the information processing server device 6A. The information processing server control section 61A is configured by a use point calculation section 611A, the associated attribute selection section 112A, the distribution user selection section 113A, and the use point information acquisition section 114A. The associated attribute selection section 112A, the distribution user selection section 113A, and the use point information acquisition section 114A are the same as those in the fourth embodiment of the present invention. The use point calculation section 611A and the distribution user selection section 113A cooperate and function as a point distribution calculation section D6A.

When receiving use information from the item providing server device 2A, the use point calculation section 611A performs temporary point calculation processing. Further, the use point calculation section 611A performs use parent point distribution processing at fixed time intervals. The fixed time intervals may be, for example, every other day, every two weeks, each time after a fixed period of time elapses, etc. It may also be possible for the service provider to arbitrarily change the time intervals.

The procedure of the temporary point calculation processing is explained using the flowchart in FIG. 60. The procedure of the temporary point processing is the procedure of use point calculation processing in the fourth embodiment of the present invention, in which the processing in step S203A is deleted and the processing from step S207A to step S208A is replaced with processing in step S606A, and therefore, only the replaced processing is explained.

In step S707A, the use point calculation section 611A specifies temporary point information corresponding to user_id included in the distribution information selected in step S206A in the temporary point information storage section 630A and adds rate included in the distribution information selected in step S206A to tmp_point of the specified temporary point information. Next, the procedure proceeds to step S205A. The above is the explanation of the temporary point calculation processing.

Figure 61:
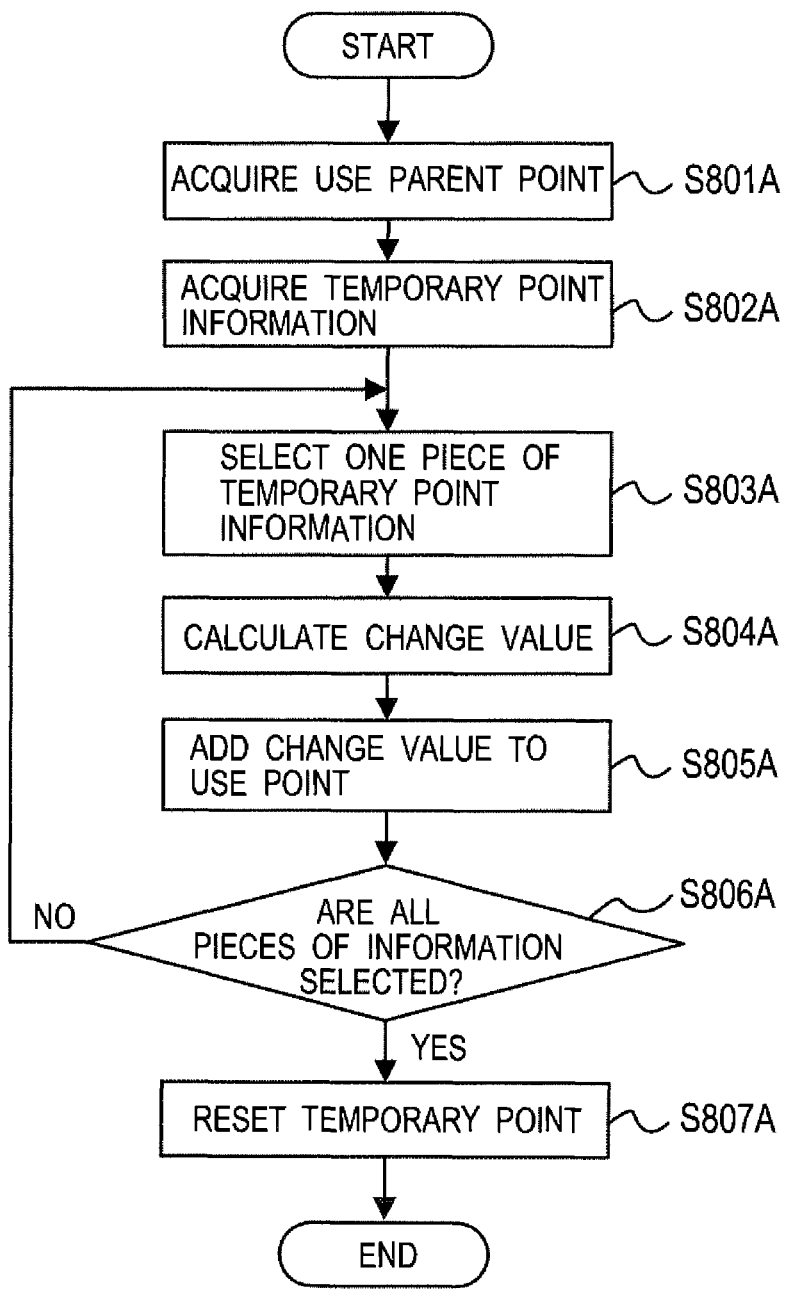
FIG. 61 is a flowchart showing a procedure of use parent point distribution processing in the fifth embodiment of the present invention.

Next, the procedure of use parent point distribution processing performed at fixed time intervals is explained using the flowchart in FIG. 61. First, the use point calculation section 611A acquires the use parent point given during a fixed period of time (step S801A). The method for acquiring a use parent point may be a method in which a value is set in advance by the service provider and the set value is acquired or a method in which a section to input the use parent point, such as a keyboard, not shown schematically, is prepared and each time use parent point distribution processing is performed, the service provider inputs the use parent point and thereby the use parent point is acquired. Next, the use point calculation section 611A acquires all the pieces of temporary point information in which the value of tmp_point exceeds "0" from the temporary point information storage section 630A in order to extract distribution target users of the use parent point (step S802A).

Next, the use point calculation section 611A selects one piece of the temporary point information acquired in step S802A, for example, in the order of acquisition (step S803A). Next, the use point calculation section 611A calculates a change value to change the use point for user_id included in the temporary point information selected in step S803A (step S804A). The change value is calculated by distributing the use parent point acquired in step S801A according to a proportion of tmp_point included in the temporary point information selected in step S803A to the sum total of tmp_points included in all the pieces of temporary point information acquired in step S802A. If it is assumed that a set of all the users to whom a use parent point vp is distributed is Ut, tmp_point of a user ub (ub∈Ut) for whom a use point is calculated is t(ub), and tmp_point of the user u (u∈Ut) is t(u), then, a use point pt(ub) of the user ub is calculated by formula (12).

$$pt(ub) = \frac{t(ub)}{\sum_{u \in Ut} t(u)} \times vp \quad \text{Formula (12)}$$

Next, the use point calculation section 611A specifies use point information corresponding to user_id included in the temporary point information selected in step S803A in the use point information storage section 137A and adds the change value calculated in step S804A to point (original use point) of the specified use point information (step S805A). Next, the use point calculation section 611A determines whether or not all the pieces of temporary point information are selected in step S803 (step S806). When all are selected, the procedure proceeds to step S807 and when those not selected yet remain, to step S703.

In step S807A, the use point calculation section 611A replaces all the values of tmp_points of all the pieces of temporary point information with "0" in the temporary point information storage section 630A and the processing from step S801A to S807A is completed. In step S805A, it may also be possible to update the use point using multiplication processing of the original use point and the coefficient (change value) in place of addition processing as in the fourth embodiment of the present invention. At this time, it is assumed that a set of all the users to whom a parent increase rate sr is distributed is Ut, tmp_point of the user ub (ub∈Ut) for whom a use point is calculated is t (ub), and tmp_point of the user u (u∈Ut) is t (u) and from formula (13), a coefficient m (ub) is calculated for the user ub.

$$m(ub) = 1 + \frac{t(ub)}{\sum_{u \in Ut} t(u)} \times sr \quad \text{Formula (13)}$$

The above is the explanation of the use parent point distribution processing performed at fixed time intervals. According to the method for giving a use point in the present embodiment, it is possible for the service provider to arbitrarily control the sum total of use points to be given during a fixed period of time, and therefore, it is possible to easily give a use point according to the budget relating to the point service of an entrepreneur.

[Sixth Embodiment]

A sixth embodiment of the present invention is explained below in detail using the drawings. In the sixth embodiment of the present invention, the distribution user selection processing at each predetermined timing is not performed and the distribution rate is calculated each time the use point calculation processing is performed. The configuration of the entire system in the sixth embodiment of the present invention is the same as that in the fourth embodiment of the present invention except in that the information processing server device 7A is used in place of the information processing server device 1A. The item providing server device 2A, the terminal device 3A, and the network 4A (and the network 5A) are the same as those in the fourth embodiment of the present invention.

Figure 62:
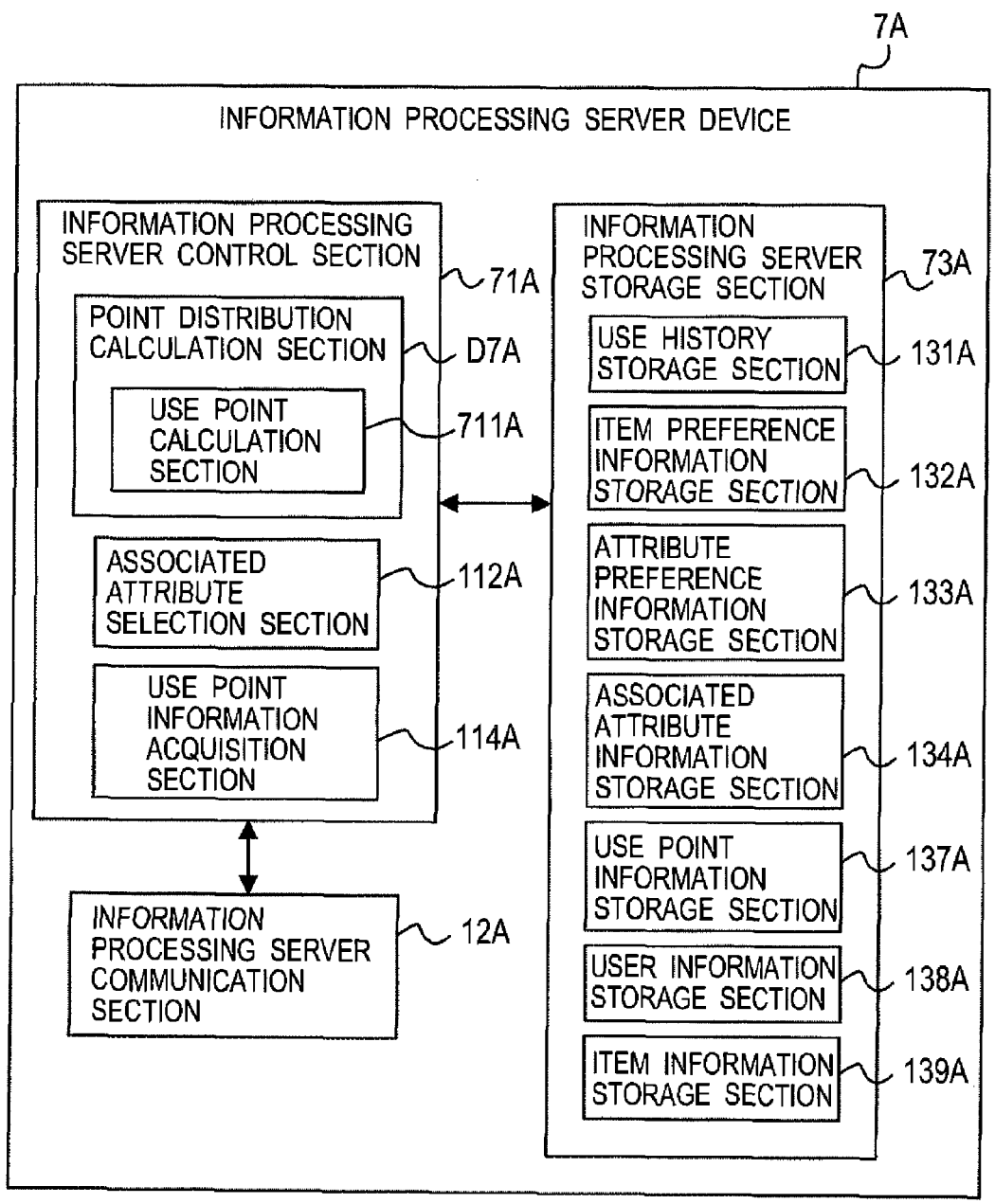
FIG. 62 is a configuration diagram of an information processing server device 7A in a sixth embodiment of the present invention.

The information processing server device 6A is a device to transmit associated attribute information to the item providing server device 2A and transmit a use point in response to a request from the item providing server device 2A. It is also possible to implement the information processing server device 6A as software (program) processing using a computer comprising a CPU, a RAM, a ROM, a hard disk drive (HDD), a network interface, etc. FIG. 62 is a configuration diagram of the information processing server device 7A in the present embodiment. The information processing server device 7A in the present embodiment is configured by an information processing server control section 71A, the information processing server communication section 12A, and an information processing server storage section 73A. The information processing server communication section 12A is the same as that in the fourth embodiment of the present invention.

The information processing server storage section 73A stores various pieces of data using a storage device, such as HDD. The information processing server storage section 73A is configured by the use history storage section 131A, the item preference information storage section 132A, the attribute preference information storage section 133A, the associated attribute information storage section 134A, the use point information storage section 137A, the user information storage section 138A, and the item information storage section 139A. The use history storage section 131A, the item preference information storage section 132A, the attribute preference information storage section 133A, the associated attribute information storage section 134A, the use point information storage section 137A, the user information storage section 138A, and the item information storage section 139A are the same as those in the fourth embodiment of the present invention.

The information processing server control section 71A totally controls each section configuring the information processing server device 7A. The information processing server control section 71A is configured by a use point calculation section 711A, the associated attribute selection section 112A, and the use point information acquisition section 114A. The associated attribute selection section 112A and the use point information acquisition section 114A are the same as those in the fourth embodiment of the present invention. In the present embodiment, the use point calculation section 711A alone functions as a point distribution calculation section D7A. When receiving use information from the item providing server device 2A, the use point calculation section 711A performs use point calculation processing.

Figure 63:
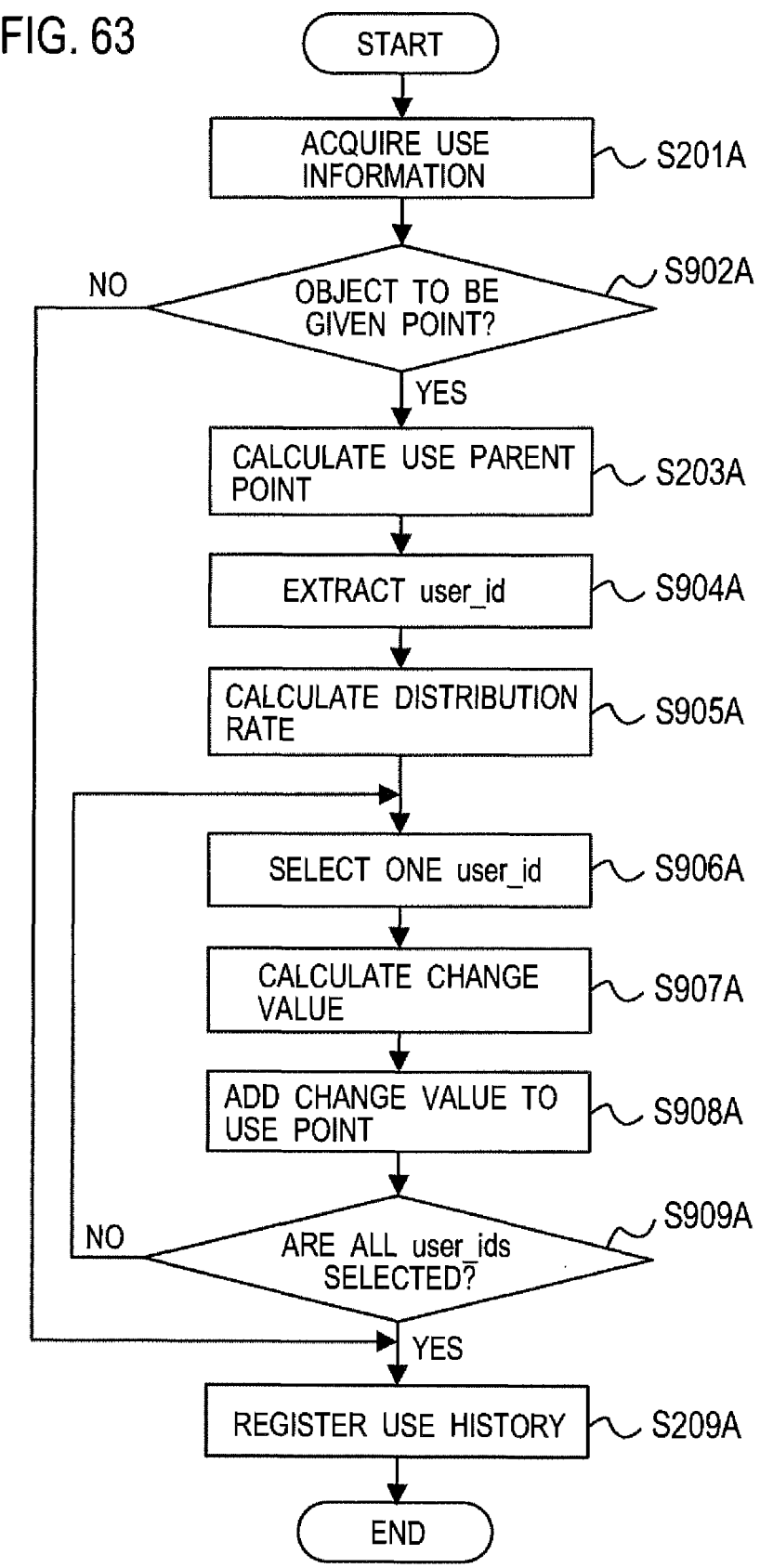
FIG. 63 is a flowchart showing a procedure of use point calculation processing in the sixth embodiment of the present invention.

The use point calculation processing in the present embodiment is explained using the flowchart in FIG. 63. The procedure of the use point processing in the present embodiment is the procedure of the use point calculation processing in the fourth embodiment of the present invention, in which the processing in step S202A is replaced with the processing in step S902A and the processing from step S204A to step S208A with the processing from step S904A to step S909A, and therefore, only the replaced processing is explained. In step 902A, the use point calculation section 711A determines whether or not the use information acquired in step S201A is an object given a use point. When specific information is included in the use information acquired in step S201A, it is determined that the use information is an object given a use point and the procedure proceeds to step S203A. In other cases, it is determined that the use information is not an object given a use point and the procedure proceeds to step S209A.

In step S904A, the use point calculation section 711A extracts user_id of the user (distribution target user) who has used both the item corresponding to the associated attribute information, which is specific information included in the use information acquired in step S201A, and any of items having the associated attribute corresponding to the associated attribute information from the item preference information storage section 132A.

In order to extract user_id of the distribution target user, first, the item preference information (base item preference information) having item_id that agrees with the item identifier of the base item corresponding to the associated attribute information, which is specific information included in the use information acquired in step S201A, is specified from the item preference information storage section 132A. Next, the attribute preference information (associated attribute preference information) having a combination (of type_id, attr_id) that agrees with a combination of the attribute type identifier and the attribute value identifier of the associated attribute information, which is specific information included in the use information acquired in step S201A, is specified. Next, all user_ids present both in the specified base item preference information (item preference information created by the first previous use history) and the associated attribute preference information (attribute preference information created by the second previous use history). In order to extract user_id, it may also be possible to use the use history storage section 131A. In the present embodiment also, it is possible to select a user who has used the base item as a distribution target user as in the fourth embodiment of the present invention. Further, it may also be possible to select a user who has used any of items having the associated attribute as a distribution target user or select a user who has used at least one of the base item and any of items having the associated attribute as a distribution target user.

Next, the use point calculation section 711A calculates the distribution rate for each distribution target user (step S905A). As the method for calculating a distribution rate, it is possible to use the following calculation method in addition to the four kinds of methods for calculating a distribution rate in the fourth embodiment of the present invention.

A fifth method for calculating a distribution rate is a method that uses the degree of similarity between users (second degree of similarity) indicative of the similarity between two users. Specifically, the fifth method for calculating a distribution rate is a method in which the degree of similarity is calculated by using all the use histories of the user (base user) corresponding to the use information acquired in step S201A and all the use histories corresponding to extracted user_id for each user_id extracted in step S904A and a distribution rate is calculated according to the degree of similarity. If it is assumed that a set of distribution target users is U (ib, as) and the degree of similarity between a base user ub and a user u ($\in$U(ib, as)) is sim (u, ub), a distribution rate rate (u, ub, ib, as) of the user u is expressed by formula (14).

$$\text{rate}(u, ub, ib, as) = \frac{sim(u, ub)}{\sum_{u' \in U(ib, as)} sim(u', ub)} \quad \text{Formula (14)}$$

In the fifth method for calculating a distribution rate, the distribution rate is higher for a distribution target user of which the degree of similarity between users is higher. As a method for calculating a degree of similarity between users, it may be possible to use, for example, a Jaccard coefficient of a set of items the base user has used and a set of items the distribution target user has used. It may also be possible to use a cosine distance between two users calculated using the item preference value of the user for the item as the degree of similarity between users. Further, it may also be possible to use a Pearson's product-moment correlation coefficient, which is a method for calculating a degree of similarity between users in the cooperative filtering scheme on the assumption that the item preference value of an item both the base user and the distribution target user have used is the evaluation given to the item by the users. Further as the degree of similarity between users, it is also possible to use a degree of adaptation between users (second degree of adaptation) indicative of a degree of compatibility between two users. The degree of adaptation between users is the number of the same attribute values between two pieces of user attribute information and for example, when attributes included in attribute information is the sex, age, and area and the attribute values of one piece of user attribution information are "male", "24", and "Tokyo" and the other attribute values are "female", "24", and "Tokyo", the number of the same attributes is two, and therefore, the degree of adaptation between users is determined to be "2". It may also be possible for the service provider to arbitrarily determine the condition of the same attribute value for each attribute and for example, as to the age, it may also be possible to determine that the attribute value is the same when a difference between attribute values is less than "5" or it may also be possible to convert the attribute values from "20" to "29" into "twenties" and "30" to "39" into "thirties" and determine whether or not the attribute values are the same using the converted values. As to the other attributes, such as "area", it may be possible to perform the same processing. Further, it may also be possible to calculate the degree of adaptation between users by weighting attributes differently from one another. For example, when the age is the same, it may also be possible to calculate the degree of adaptation between users as twice the degree of adaptation between users when "area" is the same. It is, of course, possible to use other methods as long as they are methods for calculating a value indicative of the similarity between two users.

Next, the use point calculation section 711A selects one of user_ids extracted in step S904A, for example, in the order of extraction (step S906A). Next, the use point calculation section 711A selects the distribution rate corresponding to user_id selected in step S906A from among the distribution rates calculated in step S905A and calculates a change value to change a use point by multiplying the use parent point calculated in step S203A and the selected distribution rate (step S907A).

Next, the use point calculation section 711A specifies the use point information corresponding to user_id selected in step S906A in the use point information storage section 137A and adds the change value calculated in step S907A to point (original use point) of the specified use point information (step S908A). Next, the use point calculation section 711A determines whether or not all user_ids are selected in step S906A (step S909A). When all are selected, the procedure proceeds to step S209A and when those not selected yet remain, to step S906. The above is the explanation of the procedure of use point calculation processing in the present embodiment.

According to the method for giving a use point in the present embodiment, a distribution target user is selected each time the use point calculation processing is performed, and therefore, for example, when selecting a user who has used the base item as a distribution target user, it is possible to distribute the use parent point also to a user who has used the base item after the predetermined timing at which the distribution user selection processing was performed in the fourth embodiment of the present invention. Because of this, it is possible to distribute a point to more users. It is possible to utilize the fifth method for calculating a distribution rate in the sixth embodiment of the present invention in the other embodiments. At this time, it is necessary to prepare in advance distribution information for associated attribute information for each base user because the distribution rate differs depending on the user (base user) who has used the item even if the associated attribute information is the same.

Because of this, it is necessary to store information associating the user identifier (base_user_id) of the base user, the item identifier (item_id), the attribute type identifier (type_id), the attribute value identifier (attr_id), the user identifier (user_id) of the distribution user, and the distribution rate (rate) of the use parent point as distribution information in the distribution information storage section 135A as shown in FIG. 64.

Further, it is necessary to calculate all the degrees of similarity between users or all the degrees of adaptation between users before performing the distribution user selection processing and perform the distribution user selection processing for each base user. That is, it is necessary to select one as a user identifier of a base user from among all the user identifiers and repeatedly perform the distribution user selection processing for each selected user identifier of the base user. Then, in step S606, it is necessary to store distribution information associating the user identifier (base_user_id) of the selected base user, a combination (of item_id, type_id, attr_id) included in the associated attribute information selected in step S603A, user_id of the distribution target user, and the distribution rate (rate) of the distribution user calculated in step S605A in the distribution information storage section 135A for each distribution user.

Furthermore, in step S204A of the use point calculation processing, it is necessary to acquire all the pieces of distribution information in which the combination of the user identifier of the use history included in the use information acquired in step S201A and the item identifier, the attribute type identifier, and the attribute value identifier of the associated attribute information, which is specific information, agrees with the combination (of base_user_id, item_id, type_id, attr_id). By satisfying the above conditions, also in the embodiments other than the sixth embodiment of the present invention, it is possible to use the fifth method for calculating a distribution rate.

As described above, according to the information processing method, the display method, the information processing device, the terminal device, and the information processing program in each of the first to third embodiments, the use history (the first previous use history) having the same used item identifier as the base item identifier of the specific information included in the use information and being older than the use information is specified. Then, the points of a plurality of users associated with the first previous use history are updated, and therefore, it is possible to give a point to a plurality of users based on one-time use action of a certain user. That is, compared to the conventional method, it is possible to increase the frequency with which a point increases and the number of users given a point. Because of this, users tend to frequently access the item providing server to check for his/her point and the chances for users to view information about items increase, and therefore, it is possible to promote the use of items by users.

Further, the more kinds of items a user uses, the greater is the possibility that another user uses the same items later, and therefore, the possibility that a point is given later accompanying that is raised. Because of this, motivation to "use more kinds of items" increases in each user and the use of items is promoted.

Further, there is a trend for the point to increase for a user who has used an item earlier which a number of users use later, and therefore, an incentive is produced in each user to "predict an item that will become popular in the future and use it earlier than other users", and therefore, the effect to further promote the use of items is obtained.

The program to which the present invention is applied causes a computer to function as each component or each part of the item providing server device 2, the information processing server devices 1, 6, 7 and/or the terminal device 3. Another program to which the present invention is applied causes a computer to execute each step of the methods applied to the item providing server device 2, the information processing server devices 1, 6, 7 and/or the terminal device 3.

Further, as described above, according to the information processing method, the display method, the information processing device, the terminal device, and the information processing program in each of the fourth to sixth embodiments, the use history (the first previous use history) having the same used item identifier as the item identifier of the base item of the associated attribute information, which is the specific information included in the use information, and being older than the use information is specified. Then, the points of a plurality of users associated with the first previous use history are updated, and therefore, it is possible to give a point to a plurality of users based on one-time use action of a certain user. That is, compared to the conventional method, it is possible to increase the frequency with which a point increases and the number of users given a point. Because of this, users tend to frequently access the item providing server to check for his/her point and the chances for users to view information about items increase, and therefore, it is possible to promote the use of items by users.

Further, the more kinds of items a user uses, the greater is the possibility that another user uses the same items later, and therefore, the possibility that a point is given later accompanying that is raised. Because of this, motivation to "use more kinds of items" increases in each user and the use of items is promoted.

Further, there is a trend for the point to increase for a user who has used an item earlier which a number of users use later, and therefore, an incentive is produced in each user to "predict an item that will become popular in the future and use it earlier than other users", and therefore, the effect to further promote the use of items is obtained.

The program to which the present invention is applied causes a computer to function as each component or each part of the item providing server device 2A, the information processing server devices 1A, 6A, 7A and/or the terminal device 3A. Another program to which the present invention is applied causes a computer to execute each step of the methods applied to the item providing server device 2A, the information processing server devices 1A, 6A, 7A and/or the terminal device 3A.

The present invention is not limited only to the embodiments or examples described above and it is needless to say that there can be various modifications (including addition and deletion) in the scope not deviating from the gist of the present invention. For example, it may also be possible to share the processing performed by the information processing server device 1 or 1A with a plurality of information processing devices.

The present specification discloses the inventions in a variety of scopes and at a variety of levels. These inventions include, not only each device and each method in a variety of technical scopes and at a variety of specific levels explained in the present specification, those which are one or a plurality of components that achieves independent action, effect extracted from each device or each method in an extended or generalized scope, those which are one or more components modified in an extended or generalized scope, and those which are combinations in which one or a plurality of components is exchanged between each device or each method.

CROSS REFERENCE TO RELATED APPLICATION

This application claims benefit of priority under 35 U.S.C. §119 to Japanese Patent Application Nos. 2010-236299, filed on Oct. 21, 2010 and 2011-035615 filed on Feb. 22, 2011, the entire contents of which are incorporated by reference herein.

What is claimed is:

1. An information processing method in an information processing device to receive usage information relating to an item which has been used in another device, the method comprising:
 a usage history storage step of storing, in a usage history storage section, a usage history that at least associates a use subject identifier for identifying a user or a terminal device a user has used, with a used item identifier, which is an item identifier for identifying an item used by a user, based on the usage information;
 an associated data creation step of calculating a degree of similarity between two item identifiers based on usage histories stored in the usage history storage section and creating associated data to be provided to the other device, wherein the associated data causes a base item identifier and an associated item identifier to correspond to each other using the degree of similarity, the base item identifier is an item identifier of a base item, and the associated item identifier is an item identifier of an associated item similar to the base item; and
 a point distribution calculation step of calculating a change value to change a point value managed for each of the use subject identifiers,
 wherein the usage information corresponding to usage of the associated item based on the associated data in the other device is information including specific information capable of specifying a base item identifier corresponding to the associated item identifier of the used item,
 in the usage history storage step, a usage history causing the use subject identifier, the used item identifier, and the specific information at least to correspond to one another is stored in the usage history storage section, and
 the point distribution calculation step includes:
 a previous usage history set formation step of selecting one usage history having the specific information from the usage history storage section, and forming a first previous usage history set which is a set of other usage histories having the same used item identifier as the base item identifier specified by the specific information of the one usage history and being older than the one usage history; and
 a change value calculation step of calculating a change value to change the point value for a plurality of use subject identifiers which is at least a part of a user set, wherein the user set is a set of use subject identifiers included in the first previous usage history set.

2. The information processing method according to claim 1, wherein
 in the point distribution calculation step, a first previous usage history set is formed, which is a set of other usage histories having the same used item identifier as the base item identifier specified by the specific information of the one usage history and being older than the one usage history, the one usage history having the specific information is selected from the usage history storage section, a second previous usage history set is formed, which is a set of other usage histories having the same used item identifier as the used item identifier of the one usage history and being older than the one usage history, and a change value to change the point value is calculated for a plurality of use subject identifiers which is at least a part of a user set, wherein the user set is a set of use subject identifiers included both in the first previous usage history set and in the second previous usage history set.

3. The information processing method according to claim 1, further comprising a user attribute storage step of storing the use subject identifier and user attribute information in association with each other, wherein
 in the point distribution calculation step, the change value is calculated for the use subject identifier, the user attribute information of which satisfies a predetermined condition, of the use subject identifiers included in the user set.

4. The information processing method according to claim 1, further comprising an item attribute storage step of storing the item identifier and item attribute information in association with each other, wherein
 in the associated data creation step, the associated data is created based on usage histories including an item identifier, the item attribute information of which satisfies a predetermined condition, of the usage histories stored in the usage history storage section.

5. The information processing method according to claim 1, wherein
 in the point distribution calculation step, in order to change a point value managed for each combination of the use subject identifier and the item identifier, a change value is calculated for each combination corresponding to a use subject identifier, which is at least a part of the user set, and a used item identifier of the one usage history.

6. The information processing method according to claim 1, wherein
 in the point distribution calculation step, the number of users for which the change value has been calculated is calculated.

7. The information processing method according to claim 1, wherein
 in the point distribution calculation step, the change value is calculated so that the sum total of change values during a predetermined period of time equals a predetermined value.

8. The information processing method according to claim 5, further comprising:
 a control step of causing a display device to display item information which is managed in association with one use subject identifier, and a point value of the item information.

9. The, information processing method according to claim 6, further comprising:
 a control step of causing a display device to display the number of users for which a change value of a point has been calculated based on the one usage history.

10. An information processing device comprising:
 a receiver configured to receive usage information relating to an item which has been used in another device;
 a usage history storage section configured to store a usage history that at least associates a use subject identifier for identifying a user or a terminal device a user has used, with a used item identifier, which is an item identifier for identifying an item used by a user, based on the usage information received by the receiver;

an associated data creation section configured to calculate a degree of similarity between two item identifiers based on usage histories stored in the usage history storage section and create associated data to be provided to the other device, wherein the associated data causes a base item identifier and an associated item identifier to correspond to each other using the degree of similarity, the base item identifier is an item identifier of a base item, and the associated item identifier is an item identifier of an associated item similar to the base item; and a point distribution calculator configured to calculate a change value to change a point value managed for each of the use subject identifiers, wherein the usage information corresponding to usage of the associated item based on the associated data in the other device is information including specific information capable of specifying a base item identifier corresponding to the associated item identifier of the used item, the usage history storage section stores therein a usage history causing the use subject identifier, the used item identifier, and the specific information at least to correspond to one another, and the point distribution calculator includes:

a previous usage history set formation section configured to select one usage history having the specific information from the usage history storage section, and form a first previous usage history set which is a set of other usage histories having the same used item identifier as the base item identifier specified by the specific information of the one usage history and being older than the one usage history; and a change value calculation section configured to calculate a change value to change the point value for a plurality of use subject identifiers which is at least a part of a user set, wherein the user set is a set of use subject identifiers included in the first previous usage history set.

11. The information processing device according to claim 10, further comprising:

a controller configured to cause a display device to display item information which is managed in association with one use subject identifier, and a point value of the item information, wherein in order to change a point value managed for each combination of the use subject identifier and the item identifier, the point distribution calculator calculates a change value for each combination corresponding to a use subject identifier, which is at least a part of the user set, and a used item identifier of the one usage history.

12. The information processing device according to claim 10, further comprising:

a controller configured to cause a display device to display the number of users for which a change value of a point has been calculated based on the one usage history, wherein the point distribution calculator calculates the number of users for which the change value has been calculated.

13. A non-transitory computer usable medium having a computer readable information processing program embodied therein, the information processing program causing a computer of an information processing device for receiving usage information relating to an item which has been used in another device to execute:

a usage history storage step of storing, in a usage history storage section, a usage history that at least associates a use subject identifier for identifying a user or a terminal device a user has used, with a used item identifier, which is an item identifier for identifying an item used by a user, based on the usage information;

an associated data creation step of calculating a degree of similarity between two item identifiers based on usage histories stored in the usage history storage section and creating associated data to be provided to the other device, wherein the associated data causes a base item identifier and an associated item identifier to correspond to each other using the degree of similarity, the base item identifier is an item identifier of a base item, and the associated item identifier is an item identifier of an associated item similar to the base item; and a point distribution calculation step of calculating a change value to change a point value managed for each of the use subject identifiers, wherein the usage information corresponding to usage of the associated item based on the associated data in the other device is information including specific information capable of specifying a base item identifier corresponding to the associated item identifier of the used item, in the usage history storage step, a usage history causing the use subject identifier, the used item identifier, and the specific information at least to correspond to one another is stored in the usage history storage section, and the point distribution calculation step includes:

a previous usage history set formation step of selecting one usage history having the specific information from the usage history storage section, and forming a first previous usage history set which is a set of other usage histories having the same used item identifier as the base item identifier specified by the specific information of the one usage history and being older than the one usage history; and a change value calculation step of calculating a change value to change the point value for a plurality of use subject identifiers which is at least a part of a user set, wherein the user set is a set of use subject identifiers included in the first previous usage history set.

14. The non-transitory computer usable medium according to claim 13, wherein the information processing program further causes the computer to execute a control step of causing a display device to display item information which is manage in association with one use subject identifier, and a point value of the item information, and wherein in the point distribution calculation step, in order to change a point value managed for each combination of the use subject identifier and the item identifier, a change value is calculated for each combination corresponding to a user subject identifier, which is at least a part of the user set, and a used item identifier of the one usage history.

15. The non transitory computer usable medium according to claim 13, wherein the information processing program further causes the computer to execute a control step of causing a display device to display the number of users for which a change value of a point has been calculated based on the one usage history, and wherein in the point distribution calculation step, the number of users for which the change value has been calculated is calculated.

16. An information processing method in an information processing device which receives usage information relating to an item which has been used in another device, the method comprising:

a usage history storage step of storing, in a usage history storage section, a usage history that at least associates a use subject identifier for identifying a user or a terminal device a user has used, with a used item identifier, which is an item identifier for identifying an item used by a user, based on the usage information;

an item attribute information storage step of storing, in an item attribute information storage section, item attribute information that at least associates an item identifier with an item attribute identifier for identifying an item attribute;

an associated data creation step of calculating a degree of association between an item identifier and an item attribute identifier based on usage histories stored in the usage history storage section and item attribute information stored in the item attribute information storage section and creating associated data to be provided to the other device, wherein the associated data causes a base item identifier and an associated item attribute identifier to correspond to each other, the base item identifier is an item identifier of a base item, the associated item attribute identifier is an item attribute identifier corresponding to an associated attribute, and the associated attribute is an item attribute associated with the base item; and a point distribution calculation step of calculating a change value for changing a point value managed for each of the use subject identifiers, wherein the usage information corresponding to a usage of the item having the associated attribute based on the associated data in the other device is information including specific information capable of specifying a base item identifier corresponding to the associated item attribute identifier of the used item, in the usage history storage step, a usage history causing the use subject identifier, the used item identifier, and the specific information at least to correspond to one another is stored in the usage history storage section, and the point distribution calculation step includes:

a previous usage history set formation step of selecting one usage history having the specific information from the usage history storage section, and forming a first previous usage history set, which is a set of other usage histories having the same used item identifier as the base item identifier specified by the specific information of the one usage history and being older than the one usage history; and a change value calculation step of forming a user set, which is a set of use subject identifiers included in the first previous usage history set, and calculating a change value to change the point value for a plurality of use subject identifiers, which is at least a part of the user set.

17. The information processing method according to claim 16, wherein the specific information is information including the associated item attribute identifier of a used item and a base item identifier corresponding to the associated item attribute identifier, in the point distribution calculation step, a first previous usage history set is formed, which is a set of other usage histories having the same used item identifier as the base item identifier specified by the specific information of the one usage history and being older than the one usage history, an associated item set is formed, which is a set of item identifiers corresponding to the same item attribute identifier as the associated item attribute identifier specified by the specific information of the one usage history from the item attribute information storage section, a second previous usage history set is formed, which is a set of other usage histories having any of item identifiers included in the associated item set and being older than the one usage history from the usage history storage section, a user set is formed, which is a set of use subject identifiers included both in the first previous usage history set and in the second previous usage history set, and a change value for changing the point value is calculated for a plurality of use subject identifiers, which is at least a part of the user set.

18. The information processing method according to claim 16, further comprising a user attribute storage step of storing the use subject identifier and user attribute information in association with each other, wherein in the point distribution calculation step, the change value is calculated for the use subject identifier, the user attribute information of which satisfies a predetermined condition, of the use subject identifiers included in the user set.

19. The information processing method according to claim 16, wherein in the associated data creation step, a set of usage histories including the base item identifier of the usage histories stored in the usage history storage section is formed as a base item usage history, a set of usage histories including any of item identifiers corresponding to an associated attribute is formed as an associated attribute usage history, the number of use subject identifiers present both in the set of use subject identifiers included in the base item usage history and in the set of use subject identifiers included in the associated attribute usage history is calculated as the number of common use subjects, and the degree of association is calculated using the number of common use subjects.

20. The information processing method according to claim 16, further comprising a first similarity degree calculation step of calculating a first degree of similarity, which is a degree of similarity between two item identifiers, based on usage histories stored in the usage history storage section, wherein in the associated data creation step, a first associated candidate attribute set is formed, which is a set of item attribute identifiers corresponding to similar item identifiers, which are other item identifiers whose the first degree of similarity to a base item identifier is greater than a predetermined value, or other item identifiers selected in a number not exceeding a predetermined number in order of decreasing a degree of similarity between two item identifiers from the greatest first degree of similarity to the base item identifier, and for each item attribute identifier included in the first associated candidate attribute set, one or more of the similar item identifiers corresponding to the item attribute identifier are specified based on the item attribute information, a degree of association is calculated using the first degree of similarity between the specified similar item identifier and the base item identifier, and the associated attribute is selected from among the first associated candidate attribute set using the degree of association.

21. The information processing method according to claim 16, wherein:

the specific information is information including the associated item attribute identifier of a used item and a base item identifier corresponding to the associated item attribute identifier, and in the point distribution calculation step, a change value is calculated for each combination corresponding to a use subject identifier, which is at least a part of the user set, and the associated item attribute identifier specified by the specific information of the one usage history in order to change a point value managed for each combination of the use subject identifier and the item attribute identifier.

22. The information processing method according to claim 16, wherein in the point distribution calculation step, the number of use subject identifiers for which the change value has been calculated is calculated.

23. The information processing method according to claim 16, wherein in the point distribution calculation step, the change value is calculated so that the sum total of change values during a predetermined period of time equals a predetermined value.

24. The information processing method according to claim 16, further comprising a first control step of causing a display device to display the associated item attribute.

25. The information processing method according to claim 16, further comprising:
- a control step of causing a display device to display an item attribute corresponding to an item attribute identifier which is managed in association with one use subject identifier, and a point value of the item attribute, wherein:
- the specific information is information including the associated item attribute identifier of a used item and a base item identifier corresponding to the associated item attribute identifier, and
- in the point distribution calculation step, a change value is calculated for each combination corresponding to a use subject identifier, which is at least a part of the user set, and the associated item attribute identifier specified by the specific information of the one usage history in order to change a point value managed for each combination of the use subject identifier and the item attribute identifier.

26. The information processing method according to claim 16, further comprising:
- a control step of causing a display device to display the number of users for which a change value of a point has been calculated based on the one usage history,
- wherein in the point distribution calculation step, the number of users for which the change value has been calculated is determined.

27. An information processing device comprising:
a receiver configured to receive usage information relating to an item which has been used in another device, the information processing device comprising:
- a usage history storage section configured to store usage history that at least associates a use subject identifier for identifying a user or a terminal device a user has used, with a used item identifier, which is an item identifier for identifying an item used by a user, based on the usage information received by the receiver;
- an item attribute information storage section configured to store item attribute information that at least associates an item identifier with an item attribute identifier for identifying an item attribute;
- an associated data creation section configured to calculate a degree of association between an item identifier and an item attribute identifier based on usage histories stored in the usage history storage section and item attribute information stored in the item attribute information storage section and create associated data to be provided to the other device, wherein the associated data causes a base item identifier and an associated item attribute identifier to correspond to each other using the degree of association, the base item identifier is an item identifier of a base item, the associated item attribute identifier is an item attribute identifier corresponding to an associated attribute, and the associated attribute is an item attribute associated with the base item; and
- a point distribution calculator configured to calculate a change value to change a point value managed for each of the use subject identifiers,
- wherein the usage information corresponding to usage of an item having the associated attribute based on the associated data in the other device is information including specific information capable of specifying a base item identifier corresponding to the associated item attribute identifier of a used item,
- the usage history storage section stores, in a usage history storage section, a usage history causing the use subject identifier, the used item identifier, and the specific information at least to correspond to one another, and
- the point distribution calculator selects includes:
- a previous usage history set formation section configured to select one usage history having the specific information from the usage history storage section, and form a first previous usage history set which is a set of other usage histories having the same used item identifier as the base item identifier specified by the specific information of the one usage history and being older than the one usage history ; and
- a change value calculation section configured to form a user set which is a set of use subject identifiers included in the first previous usage history set, and calculate a change value to change the point value for a plurality of use subject identifiers which is at least a part of the user set.

28. The information processing device according to claim 27, further comprising a Controller configured to cause a display device to display the associated item attribute.

29. The information processing device according to claim 27, further comprising:
- a controller configured to cause a display device to display an item attribute corresponding to an item attribute identifier which is managed in association with one use subject identifier, and a point value of the item attribute;
- wherein the specific information is information including the associated item attribute identifier of a used item and abase item identifier corresponding to the associated item attribute identifier, and
- wherein the point distribution calculator calculates a change value for each combination corresponding to a use subject identifier, which is at least a part of the user set, and the associated item attribute identifier specified by the specific information of the one usage history in order to change a point value managed for each combination of the use subject identifier and the item attribute identifier.

30. The information processing device according to claim 27, further comprising:
- a controller configured to cause a display device to display the number of users for which a change value of a point has been calculated based on one usage history,
- wherein the point distribution calculator calculates the number of users for which the change value has been calculated.

31. A non-transitory computer usable medium having a computer readable information processing program embodied therein, the information processing program causing a computer of an information processing device for receiving usage information relating to an item which has been used in another device, to execute:

a usage history storage step of storing, in a usage history storage section, a usage history that at least associates a use subject identifier for identifying a user or a terminal device a user has used, with a used item identifier, which is an item identifier for identifying an item used by a user, based on the usage information;

an item attribute storage step of storing, in an item attribute information storage section, item attribute information that at least associates an item identifier with an item attribute identifier for identifying an item attribute;

an associated data creation step of calculating a degree of association between an item identifier and an item attribute identifier based on usage histories stored in the usage history storage section and item attribute information stored in the item attribute information storage section and creating associated data to be provided to the other device, wherein the associated data causes a base item identifier and an associated item attribute identifier to correspond to each other using the degree of association, the base item identifier is an item identifier of a base item, the associated item attribute identifier is an item attribute identifier corresponding to an associated attribute, and the associated attribute is an item attribute associated with the base item; and a point distribution calculation step of calculating a change value to change a point value managed for each of the use subject identifiers, wherein the usage information corresponding to usage of an item having the associated attribute based on the associated data in the other device is information including specific information capable of specifying a base item identifier corresponding to the associated item attribute identifier of a used item, in the usage history storage step, a usage history causing the use subject identifier, the used item identifier, and the specific information at least to correspond to one another is stored in a usage history storage section, and the point distribution calculation step includes:

a previous usage history set formation step of selecting one usage history having the specific information from the usage history storage section, and forming a first previous usage history set which is a set of other usage histories having the same used item identifier as the base item identifier specified by the specific information of the one usage history and being older than the one usage history; and a change value calculation step of forming a user set which is a set of use subject identifiers included in the first previous usage history set; and calculating a change value to change the point value for a plurality of use subject identifiers, which is at least a part of the user set.

32. The non-transitory computer usable medium according to claim 31, wherein the information processing program further causes the computer to execute a first control step of causing a display device to display the associated item attribute.

33. The non-transitory computer usable medium according to claim 31, wherein the information processing program further causes the computer to execute a control step of causing a display device to display an item attribute corresponding to the item attribute identifier and a point value of the item attribute, wherein the specific information is information including the associated item attribute identifier of a used item and a base item identifier corresponding to the associated item attribute identifier, and in the point distribution calculation step, a change value is calculated for each combination corresponding to a use subject identifier, which is at least a part of the user set, and the associated item attribute identifier specified by the specific information of the one usage history in order to change a point value managed for each combination of the use subject identifier and the item attribute identifier.

34. The non-transitory computer usable medium according to claim 31, wherein the information processing program further causes the computer to execute a control step of causing a display device to display the number of users for which a change value of a point has been calculated based on the one usage history, wherein in the point distribution calculation step, the number of users for which the change value has been calculated is determined.

* * * * *

UNITED STATES PATENT AND TRADEMARK OFFICE
CERTIFICATE OF CORRECTION

PATENT NO. : 8,639,569 B2
APPLICATION NO. : 13/277824
DATED : January 28, 2014
INVENTOR(S) : Konosuke Matsushita and Ichiro Shishido Page 1 of 1

It is certified that error appears in the above-identified patent and that said Letters Patent is hereby corrected as shown below:

In the Claims:

- Claim 27, Column 86, Line 20, after "calculator" and before "includes"

Please delete "selects"

- Claim 27, Column 86, Line 37, after "comprising a" and before "configured"

Please replace "Controller" with "controller"

Signed and Sealed this
Twenty-fourth Day of June, 2014

Michelle K. Lee
*Deputy Director of the United States Patent and Trademark Office*